(12) United States Patent
Enis et al.

(10) Patent No.: US 9,453,399 B2
(45) Date of Patent: *Sep. 27, 2016

(54) METHOD AND APPARATUS FOR USING PRESSURE CYCLING AND COLD LIQUID $CO_2$ FOR RELEASING NATURAL GAS FROM COAL AND SHALE FORMATIONS

(71) Applicants: Ben M. Enis, Henderson, NV (US); Paul Lieberman, Torrance, CA (US)

(72) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/458,432

(22) Filed: Aug. 13, 2014

(65) Prior Publication Data

US 2014/0352984 A1     Dec. 4, 2014

Related U.S. Application Data

(63) Continuation of application No. 13/462,105, filed on May 2, 2012, now Pat. No. 8,833,474, and a continuation-in-part of application No. 12/930,117, filed on Dec. 28, 2010, now Pat. No. 8,839,875.

(60) Provisional application No. 61/553,166, filed on Oct. 29, 2011, provisional application No. 61/284,960, filed on Dec. 28, 2009.

(51) Int. Cl.
| | |
|---|---|
| *E21B 43/26* | (2006.01) |
| *E21B 43/16* | (2006.01) |
| *E21B 41/00* | (2006.01) |
| *E21B 43/00* | (2006.01) |

(52) U.S. Cl.
CPC ......... *E21B 43/164* (2013.01); *E21B 41/0064* (2013.01); *E21B 43/006* (2013.01); *E21B 43/26* (2013.01); *Y02C 10/14* (2013.01)

(58) Field of Classification Search
None
See application file for complete search history.

(56) References Cited

U.S. PATENT DOCUMENTS

| | | |
|---|---|---|
| 2,016,815 A | 10/1935 | Gilmore et al. |
| 2,645,291 A | 7/1953 | Voorhees |
| 3,108,636 A | 10/1963 | Peterson |

(Continued)

OTHER PUBLICATIONS

Hamelinck et al., Potential for CO2 sequestration and enhanced coalbed methane production in the Netherlands, Mar. 2001, retrived by the PTO on Feb. 8, 2011.

(Continued)

*Primary Examiner* — Angela M DiTrani
(74) *Attorney, Agent, or Firm* — MU Patents; Timothy Marc Shropshire; Garrett James O'Sullivan

(57) ABSTRACT

A method and apparatus for sequestering carbon dioxide ($CO_2$) gas and releasing natural gas from underground coal and/or gas shale formations using $CO_2$ gas captured from the flue gas of a coal burning power plant, and processing it to produce cold liquid pressurized $CO_2$, and injecting the cold liquid $CO_2$ under pressure to create fractures within the formation and causing the $CO_2$ to be adsorbed into the coal or gas shale and natural gas ($CH_4$) to be desorbed, released and recovered. A special pressure cycling process is used to enable the pressure within the formation to be increased and decreased, including allowing the liquid $CO_2$ to change phase to a gaseous $CO_2$, and injecting the liquid $CO_2$ under pressure repeatedly, which causes greater expansion of the proliferation zone within the formation, and more efficiently releases $CH_4$.

17 Claims, 29 Drawing Sheets

(56) References Cited

U.S. PATENT DOCUMENTS

| | | |
|---|---|---|
| 3,205,944 A | 9/1965 | Walton |
| 3,310,112 A | 3/1967 | Nielson et al. |
| 3,368,627 A | 2/1968 | Hurst et al. |
| 3,384,416 A | 5/1968 | Ruehl et al. |
| 3,396,107 A | 8/1968 | Hill |
| 3,623,552 A | 11/1971 | Vairogs |
| 3,664,422 A | 5/1972 | Bullen |
| 3,765,488 A | 10/1973 | Pence, Jr. |
| 3,842,910 A | 10/1974 | Zingg et al. |
| 3,954,626 A | 5/1976 | Greminger, Jr. et al. |
| 4,043,395 A | 8/1977 | Every et al. |
| 4,374,545 A | 2/1983 | Bullen et al. |
| 4,513,821 A | 4/1985 | Shu |
| 4,701,270 A | 10/1987 | Bullen et al. |
| 5,147,111 A | 9/1992 | Montgomery |
| 5,417,286 A | 5/1995 | Palmer et al. |
| 5,464,061 A | 11/1995 | Wilson et al. |
| 5,724,805 A | 3/1998 | Golomb et al. |
| 5,861,051 A | 1/1999 | Critchfield et al. |
| 6,412,559 B1 | 7/2002 | Gunter et al. |
| 6,572,680 B2 | 6/2003 | Baker et al. |
| 7,264,049 B2 | 9/2007 | Maguire |
| 8,833,474 B2 * | 9/2014 | Enis .................... E21B 41/0064 166/308.1 |
| 8,839,875 B2 * | 9/2014 | Enis ..................... E21B 43/006 166/263 |
| 2005/0045325 A1 | 3/2005 | Yu |
| 2005/0120878 A1 | 6/2005 | Leppin et al. |
| 2005/0247447 A1 | 11/2005 | Spring et al. |
| 2007/0144415 A1 | 6/2007 | Varagani et al. |
| 2007/0182160 A1 | 8/2007 | Enis et al. |
| 2009/0301704 A1 | 12/2009 | Dillett et al. |

OTHER PUBLICATIONS

Kris De Decker, Carbon Sequestration: Bury the idea, not the CO2, Loch Tech Magazine, Jun. 29, 2008.

Robertson, Analysis of CO2 separation from flue gas, pipeline transportation and sequestration in coal, published by INL in Sep. 2007.

* cited by examiner

| | PSIA | deg F | #/CU FT | BTU/# | BTU/# DIFF |
|---|---|---|---|---|---|
| 1 | 90 | 70 | 0.45949 | 126.18 | |
| TURBOCOMPRESSOR #1 | | | | | 15.64 |
| 2 | 123 | 135.2 | 0.55827 | 141.82 | |
| HEAT EXCHANGER | | | | | |
| 3 | 123 | 70 | 0.62843 | 125.95 | |
| TURBOCOMPRESSOR #2 | | | | | 29.44 |
| 4 | 221 | 192.7 | 0.91283 | 155.39 | |
| HEAT EXCHANGER | | | | | |
| 5 | 221 | 70 | 1.1314 | 125.28 | |
| TURBOEXPANDER #2 | | | | | -35.216 |
| 6 | 55 | -80.2 | 0.39398 | 90.064 | |
| TURBOEXPANDER #1 | | | | | -19.31 |
| 7 | 20 | -162.1 | 0.18251 | 70.754 | |

PRESSURE TEMPERATURE CHARTS FOR CARBON DIOXIDE

CARBON DIOXIDE

| P atm | P psia | T F | rho #/cu ft | h BTU/# | |
|---|---|---|---|---|---|
| 7.5 | 110 | -50 | 1.2 | 317.41 | GASEOUS CO$_2$ |
| 7.5 | 110 | -60 | 72.3 | 169.31 | LIQUID CO$_2$ |
| 317.7 | 4,660 | -39.315 | 73.9 | 182.70 | LIQUID CO$_2$ |

PRESSURE  TEMPERATURE  DENSITY  ENTHALPY

DENSITIES AT 40 DEG F

| PSIA | $CH_4$ #/CU FT | $CO_2$ #/CU FT |
|---|---|---|
| 4,000 | 14.04 | 64.39 |
| 800 | 2.72 | 57.24 |
| 400 | 1.27 | 4.14 |

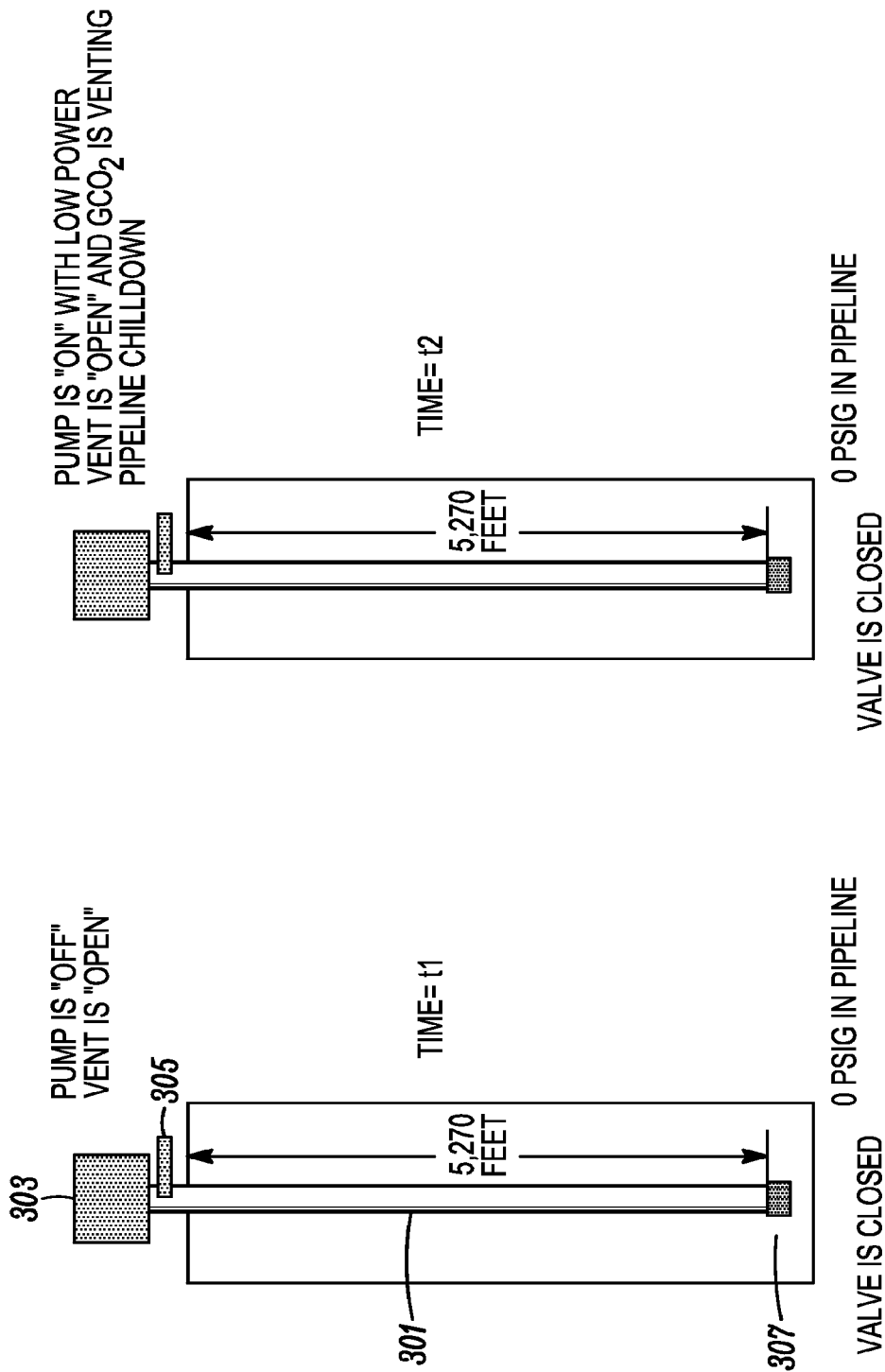

PRESSURE DROPS DOWN TO 200 PSIG AS THE $CH_4$ EXPANDS INTO LARGER PLUME. AS PRESSURE DROPS FROM 7,500 PSIG TO 200 PSIG IN THE FRACTURE VOLUMES OF THE LARGER PLUME, MORE $GCH_4$ IS RELEASED AND MORE $GCO_2$ IS ADSORBED. PRESSURE GRADIENT BETWEEN THE INJECTION BOREHOLE AND RECEIVER BOREHOLE STARTS THE $CH_4$ DIFFUSION TOWARD THE RECEIVER BOREHOLE

METHOD AND APPARATUS FOR USING PRESSURE CYCLING AND COLD LIQUID CO₂ FOR RELEASING NATURAL GAS FROM COAL AND SHALE FORMATIONS

RELATED APPLICATIONS

This application is a continuation of U.S. application Ser. No. 13/462,105, filed May 2, 2012, which claims the benefit of U.S. Provisional Application Ser. No. 61/553,166, filed Oct. 29, 2011, and which is a continuation in part of U.S. application Ser. No. 12/930,117, filed Dec. 28, 2010, which claims the benefit of U.S. Provisional Application Ser. No. 61/284,960, filed Dec. 28, 2009.

FIELD OF THE INVENTION

The invention relates to a method and apparatus for using pressure cycling and liquid $CO_2$ (also referred to as $LCO_2$) to release methane from coal and shale formations, and in particular, to using cold liquid $CO_2$ and injecting it under pressure above the fracture gradient to create fractures within the formation and then to reduce the pressure to allow cleats to form within the formation and then to repeat the cycle using cold liquid $CO_2$ again, to cause $CO_2$ to be adsorbed and $CH_4$ to be desorbed, wherein methane can be released and recovered from the formation.

BACKGROUND OF THE INVENTION

Hydraulic fracturing is a process that creates fractures in rock formations (or reservoirs), which has the effect of increasing the output of a well. The most important industrial use of this process is for stimulating oil and gas wells. Natural fracturing includes volcanic dikes and sills and frost weathering. Man-made fractures are commonly extended into targeted rock formations and are typically created using wellbores drilled into the formations to enhance oil and natural gas recovery, such as from coal beds and shale rock, etc.

Hydraulic fractures are typically extended by creating internal fluid pressure into the formations which opens the fractures and causes them to extend through the formations. The fracture width is typically maintained by introducing a proppant, such as sand, ceramic, or other particulates, wherein the imposition of the proppant into the openings helps to prevent the fractures from closing when the injection is stopped.

Hydraulic fracturing helps remove natural gas and oil from rock formations deep within the earth's crust where there are insufficient porosity and permeability levels to allow these resources to flow from the reservoir to the wellbore at economic rates. In such case, the fractures preferably provide a conduit or path that connects the reservoir to the well, thereby increasing the area from which natural gas and liquids can be recovered.

The process used includes pumping the fracturing fluid into the wellbore at a rate sufficient to increase its pressure to above the fracture strength of the rock formation. This pressure causes the rock formation to crack, allowing the fracturing fluid to enter and extend through the formations. To keep this fracture open after the injection stops, a proppant, such as sand, is often added to the fracture fluid. The propped hydraulic fracture then becomes a permeable conduit through which the fluid can flow.

Because drilling a borehole typically involves using a rotating drill bit, chips and particles of rock are often produced that can adversely affect the passage of fluid through the wellbore, resulting in reduced permeability and flow of fluid into the borehole. The borehole can also be sealed by the surrounding rock, wherein hydraulic fracturing can be used to increase the flow of fluid through the rock.

Various types of proppant, including sand, resin-coated sand, and man-made ceramics are typically used depending on the desired permeability or grain strength. The injected fluid mixture is typically about 99% water and sand, although the fracture fluid can also be gel, foam, nitrogen, or even air, etc.

In addition to the fluid, certain chemicals are often added to enhance the effectiveness of the fracturing i.e., the flow of natural gas to the surface. Thus, considerable environmental concerns have arisen, including the possibility that chemicals and other waste fluids might bleed into water aquifers, as well as the possible erosion and deformation that can result once fractures have been created and resources have been removed.

Environmental and health concerns associated with hydraulic fracturing include contamination of ground water, risks to air quality, the migration of gases and chemicals to the surface, the creation of seismic events, and the potential mishandling of waste. The potential costs associated with environmental clean-up, loss of land value, and human and animal health concerns are still being investigated and evaluated.

Hydraulic fracturing has favorably increased the production of natural gas from coal beds and shale rock formations in recent years. In the past, methane gas has been released during mining and post-mining activities, including various methane emissions which can be divided into the following categories:

Underground Mining: Methane gas can be removed from underground mines before and during mining by using degasification systems. The gas can be vented, flared (not currently done in the U.S.), or recovered for its energy content. Indeed, up to 50 to 60 percent of methane can typically be recovered from mines using degasification, wherein the remainder is released into the atmosphere. In underground mining, methane gas is often released into the mine shafts wherein methane is diluted into the ventilation air and then vented to the atmosphere.

Surface Mining: During surface mining, methane is typically released into the atmosphere as the overlying rock strata are removed, although for this type of release, no emissions mitigation options are currently being used. In theory, some pre-mining degasification and recovery could occur in certain surface mines. However, the low gas content of most surface mines relative to that of underground mines makes it unlikely that significant recovery would be technically feasible, let alone cost-effective.

Abandoned Mines: There are several thousand abandoned coal mines in the United States today. Of these, the EPA has identified some 400 that are considered "gassy." Even though active mining no longer occurs, these mines can still produce significant methane emissions from diffuse vents, fissures, or boreholes, etc., which can be extracted and used to generate power, etc., although these emissions are not quantified or included in U.S. inventory estimates.

Coal mines already employ a range of technologies for recovering methane gas. These methods have been developed primarily for safety reasons, as a supplement to ventilation systems, to circulate dangerous methane gas from the mines. The major degasification technologies currently used in the U.S. include vertical wells, long-hole and short-hole horizontal boreholes, and gob wells which are excavated mine areas that have been allowed to collapse. The quality of the gas extracted by these methods determines how they may be used. Vertical wells and in-mine horizontal boreholes produce nearly pure methane, while gob wells, which recover post-mining methane, typically recover methane mixed with air.

Even when degasification systems are used, mines still emit significant quantities of methane via ventilation systems. Technologies are in development that would catalytically oxidize the low concentrations of methane in ventilation air, producing usable thermal heat as a by-product. Methane recovered by degasification can be used for pipeline injection, power generation, on-site use in thermal coal drying facilities, or sold to nearby commercial or industrial facilities, etc. At present, most recovered coal mine methane is sold through natural gas pipelines.

Mines that are already recovering methane represent opportunities for utilities to work with mine operators to develop a use strategy. Utilities may also be able to participate in projects that are not currently recovering methane by implementing projects that include both gas recovery and utilization.

Coal bed gas formations or reservoirs often contain an orthogonal fracture set called cleats that are often oriented perpendicular to the bedding (which is nearly horizontal), which provide the primary conduit for upward fluid flow. Gas typically diffuses from the matrix into these cleats and flows up to the well bore. In coal bed gas reservoirs, the key parameters for controlling the amount of gas in place include coal bed thickness, coal composition, gas content, and gas composition. Coal composition refers to the amount and type of organic constituents found in the coal, which has a significant effect on the amount of gas that can be adsorbed and/or desorbed. Gas contents in coal seams vary widely (<1 to >25 $sm^3$/tonne) and are a function of coal composition, thermal maturity, burial and uplift history, and the addition of migrated thermal or biogenic gas. Note that 1 ton is 2,000 pounds and 1 tonne is 2,406.2 pounds. Gas composition is generally greater than 90% methane, with minor amounts of liquid hydrocarbons, carbon dioxide, and/or nitrogen.

Gas productivity from coal bed reservoirs is controlled primarily by the coal's permeability and the gas-saturation state. Permeability in producing areas typically ranges from a few millidarcies to a few tens of millidarcies, although permeabilities exceeding 1 Darcy have been reported. Absolute permeability increases with time as gas desorbs from the coal, causing the matrix to shrink and the cleats to widen, although this may be offset by a reduction in cleat aperture because of increased net stress caused by reservoir-pressure depletion.

Permeability is a key factor for coal bed methane (CBM) recovery. Coal beds are typically low in permeability, and almost all the permeability is usually due to fractures, which in coal beds are typically in the form of cleats and joints. Coal cleats are of two types: butt cleats and face cleats, which occur at nearly right angles. The face cleats are normally continuous and provide paths of higher permeability while butt cleats are usually non-continuous and end at face cleats.

Gas contained in coal beds are mainly methane and trace quantities of ethane, nitrogen, carbon dioxide and some other gases. Intrinsic properties of coal found in nature determine the amount of gas that can be recovered. The porosity of coal bed reservoirs is usually very small, ranging from 0.1 to 10%. The adsorption capacity of coal is defined as the volume of gas adsorbed per unit mass of coal usually expressed in SCF (standard cubic feet, the volume at standard pressure and temperature conditions) gas/ton of coal. The capacity to adsorb depends on the rank and quality of the coal. The adsorption ranges from 100 to 800 SCF/ton for most coal seams found in the United States. Most of the gas in coal beds is in the adsorbed form.

The permeability that is produced from fractures acts as the major channel for gas to flow—the higher the permeability the higher the gas production. For most coal bed seams found in the United States, the permeability lies in the range of 0.1 to 50 millidarcies. The permeability changes with the stress applied to the formation. Coal displays a stress-sensitive permeability and this process plays an important role during stimulation and production operations.

Hydraulic fracturing can be used to enhance gas recovery from coal beds by increasing their permeability. Since methane is stored (adsorbed) over time on the micropores of the coal itself, and this storage capacity is a function of the amount of pressure that has been exerted on the coal surfaces, i.e., the higher the pressure the greater the storage potential, production or release of gas from the coal normally requires the reduction of pressure within the formation. This pressure reduction frees the methane molecules from the coal bed and allows upward gas migration.

Water/gas separators used for conventional gas production are often modified to accommodate copious amounts of "produced" water and associated coal fines (small particles of coal that can pollute the water). After hydrostatic pressure is reduced, methane gas is desorbed from the coal and is then free to migrate through the permeable strata and fractures to an area of lower pressure, i.e., ideally into well bores that created the pressure reduction. Since water must be withdrawn to reduce the pressure and allow gas migration, the volume of gas produced tends to build from a low initial rate to a maximum rate several years after the onset of production. When reservoir pressure drops below 150 psi, the well is no longer considered economic. It is estimated that less than 50% of the coal bed methane in place can be economically recovered by reservoir pressure depletion strategy. Thus, in areas like the San Juan Basin, enhanced production techniques have been used.

Another enhancement technique available introduces nitrogen under high pressure through injector wells into individual coal beds. Nitrogen sorption displaces the methane on the coal molecules and reduces the partial pressure of the methane. Beginning in the 1980's, some companies have experimented with this technique and found that up to 80% of the methane can be recovered with this strategy.

Gas bearing shale and tight sands are also making an emergence due to the application of newer technologies such as horizontal drilling and advanced stimulation methods including hydraulic fracturing. In this application we are not considering oil shale; we are considering gas shale. Oil shale is a term used to cover a wide range of fine-grained, organic-rich sedimentary rocks. Oil shale does not contain liquid hydrocarbons or petroleum as such but organic matter derived mainly from aquatic organisms. This organic matter, kerogen, may be converted to oil through destructive distillation or exposure to heat. The recovered organic fraction is then distilled, or pyrolyzed to produce the following products: crude shale oil, flammable hydrogen gas, and char.

Gas shale is productive in releasing natural gas when the surface area is exposed to other elements such as carbon dioxide. The greater the exposed surface area, the greater the efficiency and speed at which the gas is desorbed and released from the surface. Indeed, when gas shale is exposed to carbon dioxide, and carbon dioxide is adsorbed, methane gas (that has been adsorbed into the shale over time) will be desorbed and released.

Coals are sedimentary rocks containing more than 50 wt % organic matter, whereas gas shale contains less than 50 wt % organic matter. Methane is generated from the transformation of organic matter by bacterial (biogenic gas) and geochemical (thermogenic gas) processes during burial. The gas is stored by multiple mechanisms including free gas in the micropores and joints, and adsorbed gas on the internal surfaces of the organic matter. Nearly all coal bed gas is considered to be adsorbed gas, whereas gas shale is a combination of adsorbed gas and free gas. Free gas is the methane that is trapped within the pores or joints of the shale or coal structure.

True gas shale has adsorbed gas on the surfaces of the organic content, just like coal, as well as some free gas in the pore spaces and joints, unlike coal, which has virtually no macro-porosity. In such case, adsorbed gas is proportional to the total organic carbon (TOC) of the gas shale, and free gas is proportional to the effective porosity and gas saturation in the pores of the formation.

Gas shale has become an increasingly important source of natural gas in the United States, and interest has spread to Canada and Europe. This is because gas shale is found in significant abundance in many areas of the world and can be processed to produce natural gas using the above described hydraulic fracturing methods.

Typically, gas shale is a solid of low permeability, and therefore, gas production in commercial quantities requires fracturing to provide increased permeability. While some formations may contain natural fractures, for profitable production of natural gas from gas shale, modern technology is required, such as hydraulic fracturing and horizontal drilling, etc.

Shale that hosts economic quantities of natural gas has a number of common properties. They are rich in organic material, and are usually mature petroleum source rock in a thermogenic gas window. They are sufficiently brittle and rigid enough to maintain open fractures and some of the gas produced can be held in natural fractures, some in pore spaces, and some adsorbed onto the surface of the organic material. The gas in the fractures can be released immediately, whereas, the gas adsorbed onto organic material is typically released as the formation pressure declines.

Because gas shale normally has insufficient permeability to allow significant fluid flow from the formation to the well bore, for gas shale to become a profitable source of natural gas, it is important that new technologies be developed to improve its permeability. In fact, with the advent of these new technologies, one analyst expects gas shale to supply as much as half the natural gas production in North America by 2020.

In gas shale formations, natural gas can sometimes be produced through more-permeable sand or silt layers inter-bedded with the shale, through natural fractures, or from the shale matrix itself. But in other cases, natural fractures are healed by a mineral filling and must be forced open by stimulation. It is also possible to have both shale and coal inter-bedded within a single reservoir, resulting in gas contributions from both lithologies.

In U.S. Pat. No. 7,264,049, issued to Maguire, entitled "In situ method of coal gasification," an in-situ process for coal gasification using liquefied gases and combustion of coal for heat release is provided. Maguire provides an in-situ process for coal gasification and the production of gas hydrates wherein a network of fractures is formed by injecting liquefied gases such as nitrogen into a horizontally disposed fracturing borehole and allowing it to vaporize. The coal is thereafter ignited and heated and the released pressurized gases are recovered from the fractured formations. One disadvantage of Maguire is that it teaches igniting coal and using combustion and heat to release pressurized gas from its fractures. Rather than using cold temperatures, as in the present invention, or pressure cycling with gas adsorption, Maguire uses heated temperatures to pressurize and release the gas from the underground formation.

U.S. Pat. No. 4,374,545, issued to Bullen, et al., entitled, "Carbon Dioxide Fracturing Process and Apparatus," describes a method of fracturing in an underground stratigraphic formation that is penetrated by a borehole. Liquefied gas and a proppant are pumped into the formation via the borehole pipe to induce fractures in the formation and these fracture spaces are kept open by the proppant. Once injected, the liquid pressurized carbon dioxide is exposed to warmer temperatures, which causes the liquid to convert to a gas to induce further fracturing. The disadvantage of Bullen is that it uses proppants and chemicals that can raise environmental concerns.

One of the main contributors to global warming is believed to be the increase in carbon dioxide gas emitted into the earth's atmosphere by various man-made activities and technologies such as coal burning power plants. The main contributors to carbon dioxide emissions that can affect the earth's atmosphere and therefore increase global warming include solid fuels, such as coal, liquid fuels, such as gasoline, and gaseous fuels, such as natural gas. While there is strong motivation to use coal for the generation of energy due to its efficiency and abundance, there is also a strong interest in eliminating the undesired emission of carbon dioxide gas into the atmosphere which is caused by the combustion of coal in standard coal combustion power plants.

One of the existing technologies used to eliminate excess carbon dioxide emissions involves "capturing" the $CO_2$ gas as it is being emitted from smokestacks and storing it. The idea of carbon capture and storage (CCS)—first introduced in the 1970's—began by making use of existing underground reservoirs in which to store the $CO_2$ gas. The available storage space in underground reservoirs is probably large enough to store all the carbon dioxide gas contained in all the remaining fossil fuel reserves throughout the world.

Recently, leading science and energy institutes advocated strongly for the further development of carbon capture and storage technology. For example, capturing $CO_2$ from smokestacks is a practice that has existed for years. Moreover, injection and storage of carbon dioxide gas is already occurring in the North Sea, Algeria, and Texas.

While some of these technologies have gained credibility in recent years, many experts still believe that because of the rapid use of the world's remaining fossil fuel supplies, it is necessary to further lower the environmental impact caused by these technologies in an effort to prevent catastrophic climate changes in the future. The problem at hand is that the process of capturing, transporting and storing carbon dioxide gas from coal combustion power plants can dramatically raise energy consumption costs and cause serious health and environmental issues and concerns. For example, if the energy used to capture $CO_2$ emissions is derived directly from the fossil fuels themselves, the benefits of capturing and storing the $CO_2$ will be offset by the very same energy intensive process. And, if the energy comes from renewable sources, the technology would be rendered unnecessary as it would be much more efficient to generate electricity directly from the renewable source.

Indeed, it has been discovered that capturing $CO_2$ from smokestacks and compressing it for transport can be one of the most energy-intensive aspects of the process. According to the International Panel of Climate Change (IPCC), which prepared a comprehensive study, capturing technology (including compression of the gas for further transport and storage) can raise the energy consumption of a coal combustion power plant by an average of 32 percent.

Capturing carbon dioxide in rocks also requires a significant infrastructure that is comparable to today's coal industry, which can also lead to significant amounts of industrial wastes and mining tailings—for example, fuel ash from coal plants. The process also generates large amounts of waste materials (apart from the carbonised rocks themselves), and for every ton of carbon dioxide stored in rock, 2.87 to 45.18 tons of disposable materials would be created.

For all of the above reasons, a new and improved method and apparatus is needed for the capture and storage of $CO_2$ gases emitted from coal combustion power plants, which can offset the high costs and disadvantages associated with current carbon dioxide extraction and removal methods, such that the world's coal reserves can be used without the consequences of adding to man-made global climate changes, and the high cost of producing energy.

Moreover, for the above reasons, there is also a need to develop new and improved technologies for increasing the permeability of coal and gas shale formations to make better use of the world's supply of natural gas, including the gas stored in the pores and joints of the underground strata and adsorbed onto the surface of rock formations, etc.

Nevertheless, there is also a need to develop improved technologies that will avoid the use of chemicals and the production of waste materials, etc., that can be harmful to the environment.

SUMMARY OF THE INVENTION

The present invention relates to a method and apparatus for capturing the flue gas of a coal fired power plant, incinerator or chemical processing plant, and separating the $CO_2$ gas therefrom, and converting the $CO_2$ gas captured from the power plant into a cold pressurized liquid $CO_2$, and injecting it under pressure into an underground stratum or layer of coal and/or gas shale, and in particular, releasing the pressurized liquid $CO_2$ through perforations, and using it to create narrow elongated fractures and openings within the layers, to increase the formation's permeability, thereby increasing the flow of natural gas found in the pores and joints therein, as well as increasing the adsorption of $CO_2$ and simultaneous desorption of $CH_4$, such that the natural gases normally found within the formations can be released, recovered and sold to offset the overall cost of capturing and sequestering the $CO_2$.

$CO_2$ gas is preferably captured and separated from the flue gases of a coal burning power plant, incinerator, or chemical processing plant, using a standard process, such as one of the following: 1) Chemical and physical absorption, 2) Solid physical adsorption-pressure swing and temperature swing adsorption, 3) Low temperature distillation (cryogenic separation); and 4) Membrane separation. In one method, an MEA chemical absorber is used to separate the $CO_2$ gas from the flue gases wherein the system comprises an absorber, a regenerating unit, a condenser, storage tank, and heat exchanger, etc. This chemical absorption system comprises amine based processes for the removal of acid gas impurities ($CO_2$ and $H_2S$), wherein alkanolamines (MEA, DEA, and MDEA) are used to remove $CO_2$ from the flue gas stream by the exothermic reaction of $CO_2$ with the amine functionality of the alkanolamine.

In another aspect, $CO_2$ gas can be separated and sequestered either before the coal is burned or afterwards, depending on the type of equipment used. Technologies that can be used for this purpose are disclosed in Applicants' related application Ser. No. 12/321,689, entitled "METHOD AND APPARATUS FOR REMOVING CARBON DIOXIDE GAS FROM COAL COMBUSTION POWER PLANTS," which is incorporated herein by reference, and can be used to separate gaseous carbon dioxide (also referred to as $GCO_2$) from the other elements, although any other method or apparatus for $CO_2$ capture can be used.

The captured $CO_2$ gas is then pressurized, chilled and liquefied, although, if the $CO_2$ gas is chilled first, the $CO_2$ gas could form dry ice. Thus, for optimal results, the $CO_2$ gas is preferably pressurized first, prior to being chilled. For example, in the first step, the $CO_2$ gas is preferably pressurized using a conventional compressor, but because the compression process heats the $CO_2$ gas, it must be cooled. Preferably, a first heat exchanger uses cold water circulated to cool the pressurized $CO_2$ gas, and then, a second heat exchanger uses super chilled air produced by an associated turbo compressor and turbo expander set. Once the pressurized $CO_2$ gas (>100 psig) has been sufficiently chilled, such as down to minus 60 degrees F., it is converted into a liquid (FIG. 7), and then preferably, the cold liquid $CO_2$ is fed into a cryogenic pump, to increase the pressure thereof, such as up to 5,000 psia, depending on the conditions into which the liquid $CO_2$ will be injected.

The next step involves injecting the pressurized liquid $CO_2$ into the underground coal or shale reservoir or formation using an array of injection pipes that extend down through the geological layers of rock until the targeted coal or gas shale layer is reached. The pipes are preferably made of steel or other strong material and extended down into the targeted layer where there are perforations for releasing and injecting the liquid $CO_2$ directly into the rock formation. The perforated portion of the pipe (preferably with small diameter substantially horizontal holes) can extend vertically into a thick stratum or horizontally into a thin stratum of coal or shale that contain the adsorbed natural gas.

For any given site, the injection pipes are preferably spaced apart a predetermined distance from each other depending on the expected reach and effectiveness of the fracturing process to increase the permeability of the formation and therefore the efficiency of the process. To allow for proper recovery of gas produced within the formation, similar arrays of recovery pipes are preferably extended into the geological layers to enable the gases to be released and recovered. Preferably, there are more recovery pipes than injection pipes and recovery pipes substantially surround the injection pipes. The specific pattern of recovery pipes can be predetermined to make efficient use of the equipment and geographic location.

Once the $LCO_2$ has been pressurized and chilled, it is ready to be injected into the injection pipes and released into the strata. However, to avoid premature warming of the liquid $CO_2$, it is desirable to inject liquid nitrogen into the injection pipe first, which helps to pre-chill the pipe, so that when the $LCO_2$ is injected, it will not change phase (to a gas) prematurely. Nevertheless, it is not expected that the injection pipe will stay at the same temperature, and therefore, a thermocouple is preferably provided to measure the temperature of the pipe and thus the extent to which the pipe is pre-chilled can be controlled.

Initially, the $LCO_2$ is allowed to flow into the injection pipe and flash to $GCO_2$ until a steady state operation temperature can be reached, and then, the cryogenic pump can be turned on to pressurize the $LCO_2$ down into the formation which will continue until the predetermined pressure is reached, which can be up to 5,000 psia or more, depending on the circumstances, measured at the bottom. Then, as the $LCO_2$ is released through the substantially horizontal perforations, the coal or shale within the formation will begin to break up and form fractures therein—it will become rubblized—wherein long narrow substantially horizontal passages are preferably created within the formation to increase its permeability. As more liquid $CO_2$ is injected, and as pressure is increased, additional web-like fractures and patterns can be created that can extend great distances, such as more than 1,000 feet, through the formation. Preferably, a shut off valve on each injection pipe is provided, at the bottom, so that when the injection is completed, the injection pipes can be sealed.

By forcing the high pressure liquid $CO_2$ into the stratum via a pre-chilled vertical pipe with an end extension of perforations, the pressurized $LCO_2$ is preferably vented through the perforations at above the fracture strength of the rock, thereby effectively creating holes and fractures in the formation and creating a long cavity of small diameter (pencil-like) openings extending substantially horizontally, in radial directions, from the perforated pipe. When the pressure exceeds the fracture strength of the rock formation, the pressurized liquid $CO_2$ is allowed to penetrate the shale or coal stratum with sufficient force and speed to break up the formation. Not only does this help release natural gas trapped within the formation's pores and joints, but the broken fragments can then be made more susceptible to adsorption of $GCO_2$, and desorption of $CH_4$, such that more adsorption can take place, which means that more $CO_2$ can be sequestered, which also means that more natural gas can be released and recovered from the site.

Because the underground formations tend to be warmer the deeper they are, the newly exposed surfaces within the newly created openings and cracks of the formation will eventually cause the $LCO_2$ to warm. Likewise, pressurizing the $LCO_2$ can increase the temperature thereof, and when the cryogenic pump is shut down, the liquid pressure can decrease. Then, when the conditions are right, such as when the pressure in the matrix decreases to 400 psi, and the temperature increases to plus 40° F. (or any other point on the curve), the liquid $LCO_2$ suddenly changes phase to a gas explosively, wherein the expansion of the $GCO_2$ extends the reach of the cracks and creates more exposed surface area for adsorption within the stratum. This process of rubblization exposes the material in the product zone further by forming a multitude of smaller particles and a huge sum of exposed surfaces for the capture of $CO_2$ and release of $CH_4$.

While it is preferable that this phase change occur after the pump is turned off, there is a possibility that the phase change could occur before the valves at the bottom of the pipes are sealed. This can depend on the depth of the formation, wherein, at greater depths, the pressure is greater, and therefore, the phase change will be less likely to occur prematurely, whereas, at shallower depths, the pressure will be less, and therefore, the phase change is more likely to occur as the $LCO_2$ is warmed by its surroundings. In such case, a safety valve can be provided at the bottom to prevent the effects of the expansion to spread back into the pipe. But regardless of where the expansion takes place, this sudden phase change occurs explosively and radiates fractures in all directions, thereby increasing the volumes of fractures for further adsorption of $CO_2$ and desorption of $CH_4$.

Unlike previous hydraulic fracturing methods, there is no need for a proppant to maintain the width and openings of the fractures created within the formation. This is because, normally a liquid is used, such as water mixed with sand and other particulates and chemicals, and the proppants are needed to keep the fractures open while the liquid is allowed to pass. But in the present invention, no water is used, and because all of the $LCO_2$ is eventually converted into a gas, proppants that allow water to pass are not necessary. Also, one of the main goals of the invention is for the $CO_2$ to be adsorbed onto the coal or gas shale fragments, wherein the $CO_2$ will be stored and sequestered within the formation once the fractures are opened. Indeed, portions of the $LCO_2$ within the cracks act as the proppants before the $CO_2$ is adsorbed onto the surfaces they are propping. Accordingly, for the time that the fractures remain open, natural gas preferably continues to be released and flow from the rock formation to the recovery well bores, such that a sufficient amount of natural gas can be recovered to offset the cost of capturing and separating the $CO_2$ gas. The sequence of pressurization and depressurization also enhances the migration of previously released low density $GCH_4$ to pass through and/or over the high density $GCO_2$ and move toward the recovery well bores during the subsequent pressurization and depressurization cycle. In this respect, since the goal of sequestering $CO_2$ is as important as the goal of collecting natural gas, the present method is useful even if some of the natural gas released from the coal or shale remains trapped within the formation and remains unused. There is also no high volume of water and sand and no toxic additives used during the fracturing process, unlike previous methods.

With all bottom valves closed, penetration of the pressurized liquid $CO_2$ through the formation is allowed to continue, and thus, further fracturing can occur, in which case, $CH_4$ can continue to be desorbed, and $CO_2$ can continue to be adsorbed, into the surfaces made free by the desorption of $CH_4$. This containment is preferably sustained for a residence period of time to permit the $GCO_2$ to be completely adsorbed and the lower density natural gas to migrate through the formation and into the perforated recovery pipes through which the $CH_4$ can flow upward to be extracted and collected.

After the appropriate waiting period, which can be about two weeks or more, the valves at the bottom of the recovery pipes are preferably opened slowly to allow pressure to remain in the formation as the gases are released. If the pipes are opened too quickly, pressurized methane will begin rising to the top, but large amounts of $CO_2$ may remain underground within the formation without being adsorbed. By slowly opening the valves, and slowly reducing the pressure again, low density $CH_4$ is allowed to buoy past the heavy $GCO_2$ and allow the $CH_4$ to migrate to the recovery pipes, while at the same time, $CO_2$ continues to be adsorbed, and $CH_4$ to continues to be desorbed.

A preferred methodology for pressure cycling using the above described processes, including the injection of cold liquid $CO_2$ into a coal or shale formation, involves using an injection well bore that is located at the center of several recovery well bores, such as those located at four corners of a square. This 5-Point field entity is then repeated in all directions until the available acreage above the rock formation is filled.

Each well bore preferably consists of an inner pipe surrounded by an outer pipe with a perforated section at the bottom extended down into the matrix. There are preferably one or more valves at the bottom of each injection and recovery well bore which can be opened and closed during the pressurized liquid $CO_2$ injection cycles.

The well bores preferably have three operational modes. 1) In the first mode they can be used to dewater the formation in its nearby contact area while the valves at the bottom of the well bores are open. 2) When the dewatering is complete, liquid nitrogen and super-cold gaseous nitrogen are preferably used to chill the injection well bore (such as via the inner pipe) while the valve at the bottom is closed. 3) The liquid $CO_2$ is then introduced into the injection well bore (such as via the inner pipe) while the valve at the bottom of the injection well bore is closed, such that pressure within the injection well bore can be increased before it is released into the matrix.

In the first mode, the well bores can be used to dewater the underground matrix, and after the formation has been pumped clear of water (such as over several months), methane may appear at the top such as via the annulus between the inner pipe and outer pipes. Pumping the water out strongly reduces the local pressure in the matrix near the well bores, and weakly reduces the pressure in the matrix at further distances from the well bores. This reduction in pressure will create a pressure gradient, which in turn, causes the methane in the matrix to desorb and migrate toward the well bores, wherein water and methane may appear at the top. The water can then be processed and used or pumped to a pool and the methane can be collected or burned off. When the dewatering is completed, the water pumps are turned off and the well bores no longer pump water to the surface. The same process can be used to dewater both the recovery and injection well bores.

When the injection well bores have been dewatered the next step involves using Liquid Nitrogen and/or Gaseous Nitrogen to chill the injection pipes. The cryogenically cold liquid $N_2$ is preferably pumped down inside the injection pipe with the bottom valve closed to chill the injection pipe, but until a steady state temperature is reached, a change of phase may initially occur, turning the liquid $N_2$ into cold gaseous $N_2$, which will need to be vented at the top. Note that using pipes with multiple layers advantageously permits the air space within the annulus around the inner pipe along the length of the outer pipe to interrupt the radially inward heat transfer flow.

After the inner pipe of the injection pipe is chilled in this manner, the flow of $LCO_2$ is preferably initiated within the injection pipe, such as in the inner pipe. For example, the $LCO_2$ can be stored at 375 psig and minus 20° F. in a container above ground and can be sent down through the $LN_2/LCO_2$ heat exchanger to bring the $LCO_2$ (at >100 psig) to minus 60° F.

Initially, each vertical injection well bore is gravity-filled with $LCO_2$ without using the cryogenic pump. At this point, the valve at the bottom of the injection well bore is preferably closed and the top vent is open. Then, when $GCO_2$ bubbles stop coming to the surface, the cryogenic pump is preferably turned on and the top vent is closed to begin pressurizing the injection pipe with $LCO_2$. For example, to obtain a fracture pressure of at least 4,000 psig, when using a 2,600 psig cryogenic pump, because the hydrostatic pressure associated with the 5,000 feet depth of the injection pipe can contribute about 2,500 psig of pressure at the bottom, and the pump can contribute the remainder of the 2,600 psig, the total underground pressure can be brought to about 5,000 psig or slighter more. Then, due to friction created by the length of the pipe, the actual pressure that releases the $LCO_2$ into the matrix can be somewhere below 5,000 psig, but somewhere above 4,000 psig, to achieve the desired fracture strength.

Then, at the appropriate time, the valve at the bottom of the injection well bore is preferably opened and the pressurized liquid $CO_2$ is allowed to flow through the perforations and into the matrix, in which case, the pressurized liquid $CO_2$ begins to fracture and break up the matrix, such as along the pipe perforation center line, which is preferably substantially horizontal due to the substantially horizontal orientation of the perforations. The pressure of the injected liquid $CO_2$ is preferably far above the fracture strength of the matrix at the formation depth so that the jets create a penetrating flow of liquid $CO_2$ (such as at close to 5,000 psig) within the matrix. The high speed and stresses of $LCO_2$ that exist preferably create rubble around the formed cavity, and fractures surrounding the solid bed. The valve at the bottom of the injection well bore is preferably opened slowly to avoid abrupt pressure changes and to allow the jet streams of $LCO_2$ to gradually break away the matrix around the openings before full pressure is applied.

In this respect, it should be noted that the total release pressure will include, for example, 2,600 psig from the cryogenic pump, and 2,500 psig from the hydrostatic pressure head of the liquid $CO_2$ column at a depth of 5,000 feet, for a total of over 5,000 psig, i.e., the 2,600+2,500=5,100 psig. Then, in this example, after taking into account the friction that exists along the length of the pipe, the actual pressure that drives the $LCO_2$ into the matrix will be an amount that is greater than the fracture strength of the matrix, or 4,000 psig, but less than 5,000 psig. The length of the penetration of the $LCO_2$ is determined by the pressure gradient along the $LCO_2$ front and will extend far into the formation until the tip of the perforation is no longer able to perforate the matrix.

The pressure is preferably maintained for a duration that is designed to have the $LCO_2$ penetration crater extended radially toward the recovery well bores but not completely reach the recovery well bores. Liquid $CO_2$ is preferably injected at a rate such that the liquid $CO_2$ injected into the cavity will cause the matrix to break up, and create penetrating holes or openings, which will fill the fractures in the bed matrix. After this round of releasing $LCO_2$ into the matrix, the valve at the bottom of the injection well bore is preferably closed. This is also done slowly to avoid creating too much pressure within the pipe that could result in a water hammer.

Then, preferably, with the bottom valve closed, no more liquid $CO_2$ will be injected into the cavity until the pressure in the matrix decays to about 200 psig. In this respect, it can be seen that as the $LCO_2$ is injected into the matrix, and as new cleats are formed, the newly created cavities and openings within the formation creates a larger free volume of space for the same mass of $GCO_2$ so that the matrix pressure drops, such as to 200 psig, after a sufficient residence time. After the 200 psig is attained, the next pressurization and depressurization cycle is preferably started. During this time, the relatively high temperature of the matrix will eventually cause the extremely cold temperature of the liquid $CO_2$ to increase, wherein the $LCO_2$ will change phase explosively to a gaseous state which further breaks up the matrix.

With the bottom valve closed, the $LCO_2$ pressure within the injection pipe can be increased again, and then, at the appropriate time, such as when the pressure within the matrix has dropped to below 200 psig, and sufficient $LCO_2$ pressure has built up inside the injection pipe, the valve at the bottom of the injection well bore can be opened again and $LCO_2$ under pressure can be released into the matrix, thereby repeating the process. Then, when the matrix is suddenly exposed to the high pressure liquid $CO_2$ again, such as above the matrix compressive strength, the crushing and fracturing caused thereby can overcome the induced hoop stresses in the matrix, thereby creating additional penetrating holes and cracks which extend further into the matrix. The high applied pressure preferably creates jets of liquid $LCO_2$ that can be driven through the substantially horizontal cavities and openings that were previously formed by the earlier cycles, thereby creating longer narrow openings further and further toward the recovery well bores. The liquid $CO_2$ also preferably spreads through the formation such as against the distal ends of the cavities, creating a plume of crushed material in its wake, wherein the liquid $CO_2$ preferably expands the proliferation zone which can then extend radially outward therefrom.

The specific pressure cycling steps involved are preferably as follows:

First, before the operation begins, the pump is turned off, and the top vent above the injection pipe is opened, and the valve at the bottom where the perforations are located is closed, which results in zero pressure being exerted into the well bore and therefore the matrix.

Second, liquid nitrogen is preferably injected into the well bore to pre-chill the pipe which helps to regulate the temperature of the liquid $CO_2$ as it is being injected into the pipe, to avoid premature vaporization and phase change of the liquid to a gas.

Third, a small amount of liquid $CO_2$ is preferably initially released into the well bore to allow the pipe to reach a steady state temperature, and then, the cryogenic pump is preferably turned on, leaving the top vent opened and the bottom valve closed. At this point, the pressure inside the well bore begins to increase, both from the column of liquid $CO_2$ filling the pipe, and the pressure of the $CO_2$ being injected into the pipe.

Fourth, when liquid $CO_2$ begins overflowing from the top vent, and the gas bubbles stop rising to the top, the top vent above the injection well bore is preferably closed, and the pump is turned to full power to inject more liquid $CO_2$ into the pipe, with the bottom valve closed. This preferably continues to increase the pressure inside the injection well bore until the desired maximum pressure is reached, which is determined by the combination of the pressure head created by the liquid $CO_2$ column inside the pipe, and the pressure of the $CO_2$ created by the pump.

Fifth, once the desired maximum pressure inside the injection pipe is reached, with the pump on and the top vent closed, the system is ready to release the pressurized liquid $CO_2$ into the matrix, wherein the valve at the bottom is preferably opened, thus causing pressurized jet streams of liquid $CO_2$ to be released through the perforations and into the matrix. Preferably, the valve is opened slowly to avoid sudden pressure changes in the pipe, and to gradually induce fracturing at a substantially steady pace, and once the valve is opened fully, the speed and pressure created by the jet streams help break up the formation and create fractures, openings and holes extending substantially horizontally through it. The preferred typical speed of flow through the perforations is 100 ft/sec and up to 500 ft./sec. or higher.

Sixth, as the liquid $CO_2$ is released, the pressure inside the pipe begins to drop gradually, but with the pump on and the liquid $CO_2$ continuing to be injected into the well bore, the pressurized flow through the perforations can be substantially maintained, such that the force and pressure of the liquid $CO_2$ jet streams can continue to break up the matrix.

Seventh, as the liquid $CO_2$ continues to flow through the perforations, and the pressure continues to drop, at a predetermined time, the pump is preferably stopped and the bottom valve is preferably closed. The top vent is also preferably opened. At the same time, as the liquid $CO_2$ continues to proliferate into the matrix, the $LCO_2$ becomes exposed to the warmer temperature of the rock formation, wherein, at some point, the liquid $CO_2$ changes phase and vaporizes explosively, creating up to 20,000 psig or more of pressure, thereby breaking up the formation further and forming greater fractures and openings, further downstream from the injection well bores, toward the recovery well bores. The relatively high temperature of the matrix raises the temperature of the extremely cold liquid $CO_2$, wherein the $LCO_2$ will eventually change phase to a gas, such as when the pressure drops a sufficient degree.

Eighth, with the pump off, and the bottom valve closed, the gaseous $CO_2$ will continue to proliferate into the matrix, and the process of adsorption of $CO_2$ and desorption of $CH_4$ will continue. Then, preferably, with the bottom valve closed, and with no more liquid $CO_2$ being injected into the matrix, the pressure within the matrix will decay, and will do so quickly at first, because of the additional cleats and spaces that have been formed in the matrices, and then, more slowly as the $GCO_2$ migrates through the available pores in the matrix between the cavity and the recovery well bores, and eventually, the pressure is preferably allowed to drop to about 200 psig.

With the bottom valve closed, the pressure within the well bore can then be increased again by turning on the pump and closing the top vent, as discussed above, and the cycle can be repeated. Then, at the appropriate time, such as when the pressure within the matrix has dropped to below 200 psig, and sufficient $LCO_2$ pressure has built up inside the injection pipe, the valve at the bottom can be opened again and pressurized $LCO_2$ can be released back into the matrix, and the cycle can be repeated again. Then, at the appropriate time, the valve at the bottom of the injection pipe can be closed again, and the pressure of the liquid $CO_2$ in the matrix can be allowed to drop again. At that point, the matrix temperature can be anywhere between $-20°$ F. and $+10°$ F., and when the pressure within the matrix drops to about 200 to 300 psig, the liquid $CO_2$ may flash explosively again into gaseous $CO_2$ causing further penetration into the more distal portions of the matrix.

Through these repeated cycles, the matrix can continue to be broken up, the $CO_2$ gas can continue to be adsorbed, the $CH_4$ gas can continue to be desorbed, and the released $CH_4$ can continue to be pushed ahead of the advancing $CO_2$ front and toward the recovery well bores. In this respect, the relatively high pressure field created near the injection well bores by the emission of pressurized $LCO_2$ will tend to cause the released $CH_4$ to travel toward the relatively low pressure field that exists near the recovery well bores. And as the pressure drops further away from the injection well bores, more $CO_2$ will tend to be adsorbed, and more $CH_4$ will tend to be desorbed, consistent with Langmuir's isotherm. Thus, allowing the pressure to drop further, as well as allowing the temperatures created by the liquid $CO_2$ to drop, enables more adsorption to occur. Eventually, the leading edge of the released $CH_4$ cloud will reach the recovery well bores and the $CH_4$ gas can then be pumped up through the recovery pipes and extracted and collected at the surface. By its very nature, $CH_4$ is lighter in molecular weight than $GCO_2$, so between the two, $CH_4$ will tend to rise and $GCO_2$ will tend to drop. This process may continue until much of the released $CH_4$ from the formation is recovered, which can take several years.

In latter cycles, or after the final cycle, the bottom valves can be opened and closed again and configured to release high speed liquid slugs of $LCO_2$ that can fly through the $GCO_2$ vapor, such as within the substantially horizontal cavities and spaces that were previously formed by the earlier cycles, to impact the distal ends of the cavities and create over 20,000 psig of impact pressure, which further helps create a longer fracture zone that can be expanded over time. In this respect, the repeated injection of liquid $CO_2$ as jet streams and/or high speed slugs helps to break down the structure of the matrix, creating long narrow proliferation zones, which in the past had to be accomplished by more expensive methods such as extending long horizontal pipes through the formation.

This pressure cycling process can be repeated multiple times, such as over the course of multiple years, to further enhance the break-up of the formation and further enhance the ability of the formation to release its methane gas. This way, more of the matrix can be exposed to $CO_2$ due to higher permeability, which in turn, enables greater adsorption of $CO_2$ and desorption of $CH_4$. This induced pressure cycling method advantageously compresses the cleats and cleat spaces under relatively high pressure, but then when the pressure is reduced, the cleats are relieved and then expanded, wherein, switching between high and low pressures can help to enhance the ability of the formation to break up and release the $CH_4$. This pressure cycling method has the advantage of using relatively high pressure to fracture the formation to create new cleats, and of using relatively low pressure to allow the cleats to expand, which also enhances the ability of the gases to be adsorbed and desorbed through the use of lower pressure.

In addition to the existence of lower pressure phases during cycling, the cold temperature of the $CO_2$ (preferably kept to below +10° F.) also enhances the rate at which the $CO_2$ is adsorbed onto the exposed surfaces that simultaneously desorbs $CH_4$ into the volume within the cleats and pores. The molecular adsorption and desorption exchange within the matrix takes place more efficiently at lower temperatures, and lower pressures, wherein adsorption/desorption becomes accelerated.

Once the cycles are completed, the recovered $CH_4$ can be extracted and collected from the recovery pipes and transported via pipe or truck, etc., and used, such as injected in natural gas pipelines for resale, used as an industrial feedstock, or used for heating and electricity generation, etc. Then, the same process can be repeated, or the pump can be connected to another injection pipe at another location, so that the process can be performed in a new site.

When this process is used in connection with a coal bed, one option is to leave the formation in place after the $CH_4$ has been removed, and the $CO_2$ has been sequestered and stored underground. This has the advantage of using $CH_4$ while helping to sequester the $CO_2$ underground to protect the environment. Another option is to mine the coal after the $CH_4$ has been removed, in which case, because explosive $CH_4$ has been removed from the site, the risk of dangerous explosions occurring is significantly reduced. At the same time, mining will eventually expose the adsorbed $CO_2$ to atmospheric pressure, in which case, the $GCO_2$ that was previously adsorbed into the formation will be released back into the atmosphere. Thus, the method described above can be used for sequestering $CO_2$ and producing useful $CH_4$, or it can also be used for producing $CH_4$ and preparing underground coal formations for safe mining purposes.

One of the objectives of the present method and apparatus is to enable the coal or gas shale formation to be exposed to $CO_2$ within the joints, cracks, fissures and fractures of the rock formation, so that the $CO_2$ molecules will be adsorbed onto the fragments, whereas, the $CH_4$ molecules will be desorbed and released, such that the released natural gas can be made available by migrating toward the nearby recovery well bores and buoy itself upward through the pipe to the surface. As a consequence, the $CO_2$ can be sequestered and stored in the formation, whereas, the $CH_4$ can be released and used. The methodologies and apparatuses described herein can be altered without departing from the present invention.

BRIEF DESCRIPTION OF THE DRAWINGS

FIG. 33 is a schematic side elevation view showing an embodiment of an injection pipe extending down to a depth of 5,270 feet, with a pump and vent at the top, and a valve at the bottom, with the pump off, the vent open and the valve closed, showing zero pressure inside the pipe, which represents the status of the system at time T1;

FIG. 34 is a schematic side elevation view showing an embodiment of an injection pipe extending down to a depth of 5,270 feet, with a pump and vent at the top, and a valve at the bottom, with the pump on, the vent open and the valve closed, showing zero pressure inside the pipe, which represents the status of the system at time T2;

DETAILED DESCRIPTION OF THE INVENTION

The proposed approach preferably comprises capturing, pressurizing, chilling and liquefying the $CO_2$ effluent from a coal fired power plant, incinerator or chemical processing plant and then introducing the pressurized $CO_2$ in liquid form ($LCO_2$) into a coal stratum or a gas shale stratum that will sequester the $LCO_2$. There will also be natural gas recovered from the site including after the $CO_2$ has been adsorbed into the coal or shale and natural gas has been released therefrom, which can be sold to offset the cost of sequestering the $CO_2$. If these strata are located adjacent to the power plant, the $LCO_2$ is preferably directly inserted into the strata. If these strata are located a distance from the power plant, the captured $CO_2$ is preferably collected onto a truck trailer or into a pipeline, etc., for transport to the strata site. In either case, natural gas can be recovered for sale.

Separation of carbon dioxide gas ($CO_2$) from the flue gases of a power plant, incinerator or chemical processing plant can be accomplished in a variety of ways. For example, the MEA chemical absorber technique for separating $CO_2$ from flue gases can be performed efficiently by the use of high mass flow of super chilled air wherein the flue gases are pressurized and then passed through the tubes of a heat exchanger within a shell of super chilled air. For post combustion $CO_2$ separation there are several approaches available, including: 1) Chemical and physical absorption, 2) Solid physical adsorption-pressure swing and temperature swing adsorption, 3) Low temperature distillation (cryogenic separation); and 4) Membrane separation.

The chemical absorption process for separating $CO_2$ from flue gas comprises amine based processes that have been used commercially for the removal of acid gas impurities ($CO_2$ and $H_2S$) from process gas streams. Alkanolamines can remove $CO_2$ from the flue gas stream by the exothermic reaction of $CO_2$ with the amine functionality of the alkanolamine. Different amines have different reaction rates with respect to the various acid gases. In addition, different amines vary in their equilibrium absorption characteristics for the various acid gases and have different sensitivities with respect to solvent stability and corrosion factors.

Alkanolamines can be divided into three groups: (1) primary amines whose members include monoethanol amine (MEA), diglycolamine (DGA); (2) secondary amines whose members include diethanolamine (DEA), di-isopropylamine (DIPA); and (3) tertiary amines whose members include triethanolamine (TEA) and methyl-diethanolamine (MDEA).

Figure 1:
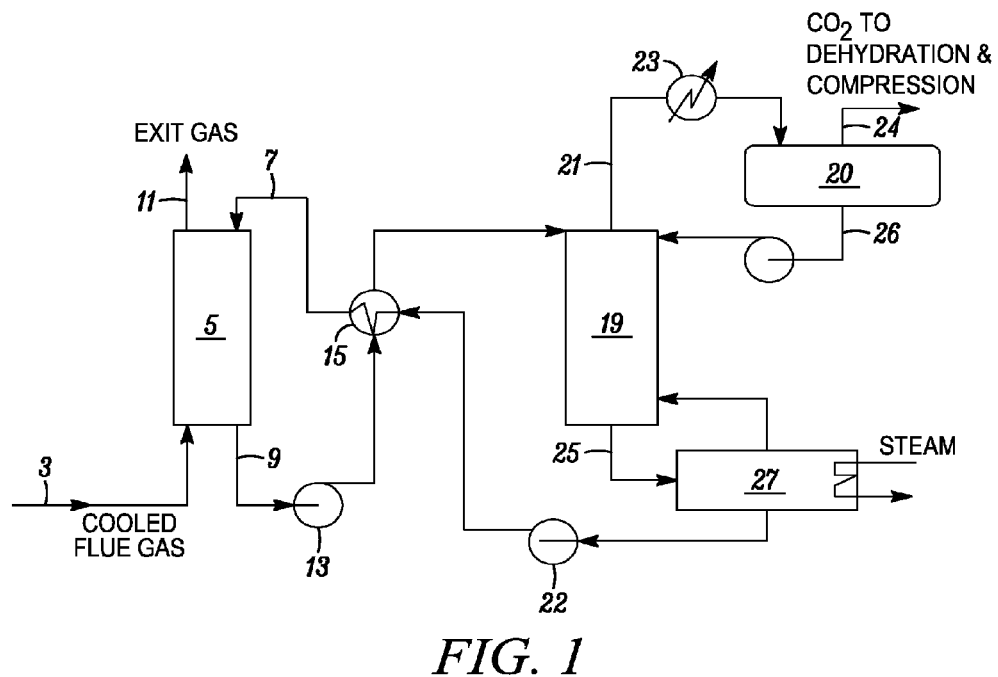
FIG. 1 is a schematic drawing showing a system for capturing and separating $CO_2$ gas from the flue gas of a coal burning power plant.

FIG. 1 shows a gas amine absorption system that can be used in connection with the process described herein. In the amine gas processing operation, the cooled flue gas flow 3 is preferably introduced into the absorber 5 (absorption tower), wherein the gas stream and liquid amine solution are preferably mixed by a countercurrent flow within absorber 5. Preferably, the gas 3 to be scrubbed enters the absorber 5 at the bottom, flows up, and leaves absorber 5 as an exit gas 11 (rich in $N_2$ and $O_2$) at the top, whereas, the solvent 7 enters the top of the absorber 5, flows down (contacting the gas), and emerges at the bottom 9. Dilution of the circulating amine with water is preferably accomplished to reduce the viscosity of the circulating fluid. The liquid amine solution 9 containing the absorbed gas is then pumped (using a $CO_2$ rich amine pump 13) through a lean/rich heat exchanger 15, where it is heated, and then the solution is fed into a stripper or regeneration unit 19 where the acid gases are liberated. Solvent regeneration can be carried out at low pressures to enhance desorption of $CO_2$ from the liquid.

The acid gas stream 21 containing the $CO_2$ preferably leaves the regeneration unit 19, wherein some amine solution is typically carried over from the regeneration step, wherein the amine solution is preferably recovered using a condenser 23. After passing through a reflux drum 20, the separated $CO_2$ gas 24 is then recovered and captured, such as for dehydration and compression, etc., wherein the remaining amine solution 26 is returned to regeneration unit 19. The expelled hot lean amine solution 25 is then passed through a reboiler 27, and pumped by lean amine pump 22 back to heat exchanger 15, where it is contacted with the rich amine solution from absorber 5, and from there the lean amine solution is returned back to absorber 5.

Among the primary amines, MEA has been the traditional solvent of choice for carbon dioxide absorption and acid gas removal. MEA is the least expensive of the alkanolamines and has the lowest molecular weight, so it possesses the highest theoretical absorption capacity for carbon dioxide, although this theoretical upper absorption capacity of MEA is not realized in practice due to corrosion problems. In addition, MEA has the highest vapor pressure of any of the alkanolamines and high solvent carryover can occur during carbon dioxide removal from the gas stream and regeneration step. To reduce solvent losses, a water wash of purified gas stream is usually required. In addition, MEA reacts irreversibly with minor impurities such as COS and $CS_2$ resulting in solvent degradation. Foaming of the absorbing liquid MEA due to the build-up of impurities can also be a concern.

There is considerable industrial experience with MEA and most systems at present use an aqueous solution with 15-25-wt % MEA, mainly due to corrosion issues, although corrosion inhibitors may be added which results in an increase in solution strength. In a commercial process, concentrations of MEA up to 30-wt % have been employed successfully to remove 80% to 90% of the carbon dioxide from the feed gas. The process has been used to treat flue gas, although some cooling and compression of the gas is required to operate the system. Another commercial process, which uses 20% MEA with inhibitors, is also offered for flue gas treatment.

For the current MEA absorber systems, the adsorption and desorption rates are reasonably high. However, the column packing represents a significant cost, and its energy consumption is also significant for flue gas treatment. In addition, the stripping temperature should not be too high. Otherwise, dimerization of carbamate may take place, deteriorating the sorption capability of MEA.

To date, commercial $CO_2$ capture plants typically use processes based on chemical absorption. The typical size of a commercial plant is relatively small (with a maximum of 800 tons/day) compared to that required for processing power plant flue gases (more than 5,000 tons/day).

The greatest limitation for $CO_2$ recovery from flue gas is its low pressure. $CO_2$ is absorbed much more easily into solvents at high pressure. The only commercially available solvents that can absorb a reasonable amount of $CO_2$ from dilute atmospheric pressure gas are primary and sterically hindered amines, such as MEA, DGA and KS-1, KS-2 and KS-3 series of solvents. These solvents can absorb $CO_2$ at low pressures because they have high reaction energies. This results in high-energy requirements to regenerate the rich solvent. However, energy costs may be reduced if the process can be fully integrated with a power plant where significant amount of low-grade heat may be available.

Flue gas entering the absorber at high temperatures can lead to solvent degradation and decreased absorption efficiency. Thus, the flue gas should be cooled to a water dew point of 50 degrees C., which can be accomplished in the desulfurization unit or with a direct contact water cooler.

Figure 2:
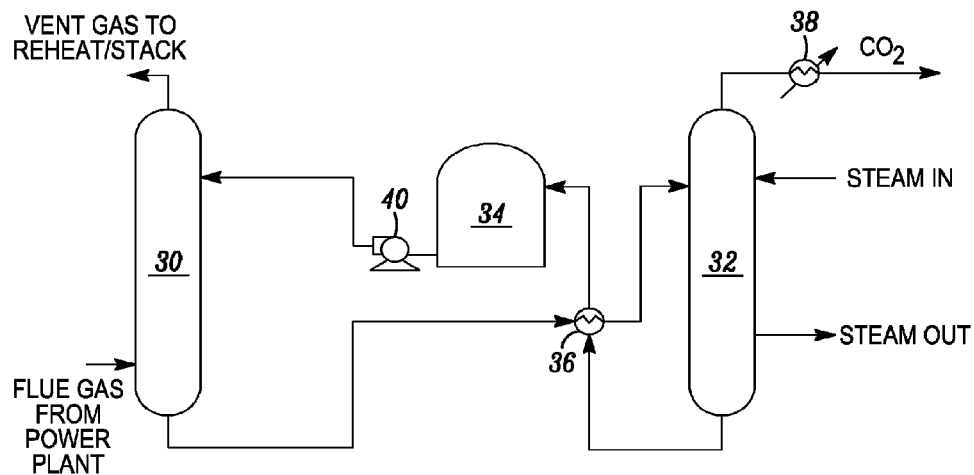
FIG. 2 is a schematic drawing showing an alternate system for capturing and separating $CO_2$ gas from the flue gas of a coal burning power plant.

Another system that can be used is shown in FIG. 2, which is based upon the use of amine solvents, principally monoethanolamine (MEA), developed originally to treat sour gas containing hydrogen sulfide. In this system, the MEA contacts the flue gas in an absorber 30 and takes up the $CO_2$, which is then subsequently steam-stripped in stripper 32 to release relatively pure carbon dioxide. The major components of this system include an absorber 30, regenerator (stripper) 32, solvent storage tank 34, heat exchanger 36, $CO_2$ condenser 38, and booster pump 40.

In use, the flue gas stream enters at the left side of FIG. 2. The chemical solvent and $CO_2$ are exposed to one another in absorber 30 where they react chemically to form the loosely bonded intermediate compound. This compound, in liquid form, is then isolated and transferred to heat exchanger 36 and regenerator (also called stripper) 32 where it is heated, causing it to break down into separate streams of $CO_2$ and solvent. The $CO_2$ is then condensed in the condenser 38 and sent for further processing, such as dehydration and compression, before it is ready for storage or commercial use. The solvent stream produced in the regenerator 32 is then recycled back to the absorber 30 and the process repeats.

Note that storage tank 34 is installed in the solvent return line to allow for constant $CO_2$ removal under varying solvent recycling rates. Booster pump 40 also provides the pressure gradient required to transport the solvent. The heat exchanger 36 captures waste heat by transferring heat from the relatively hot fluid returning from the regenerator 32 to the relatively cool fluid flowing to the regenerator 32.

The chemical absorption process produces a relatively pure carbon dioxide stream, although one disadvantage of the process is that it consumes a significant amount of energy which is typically produced by the power plant.

Figure 3:
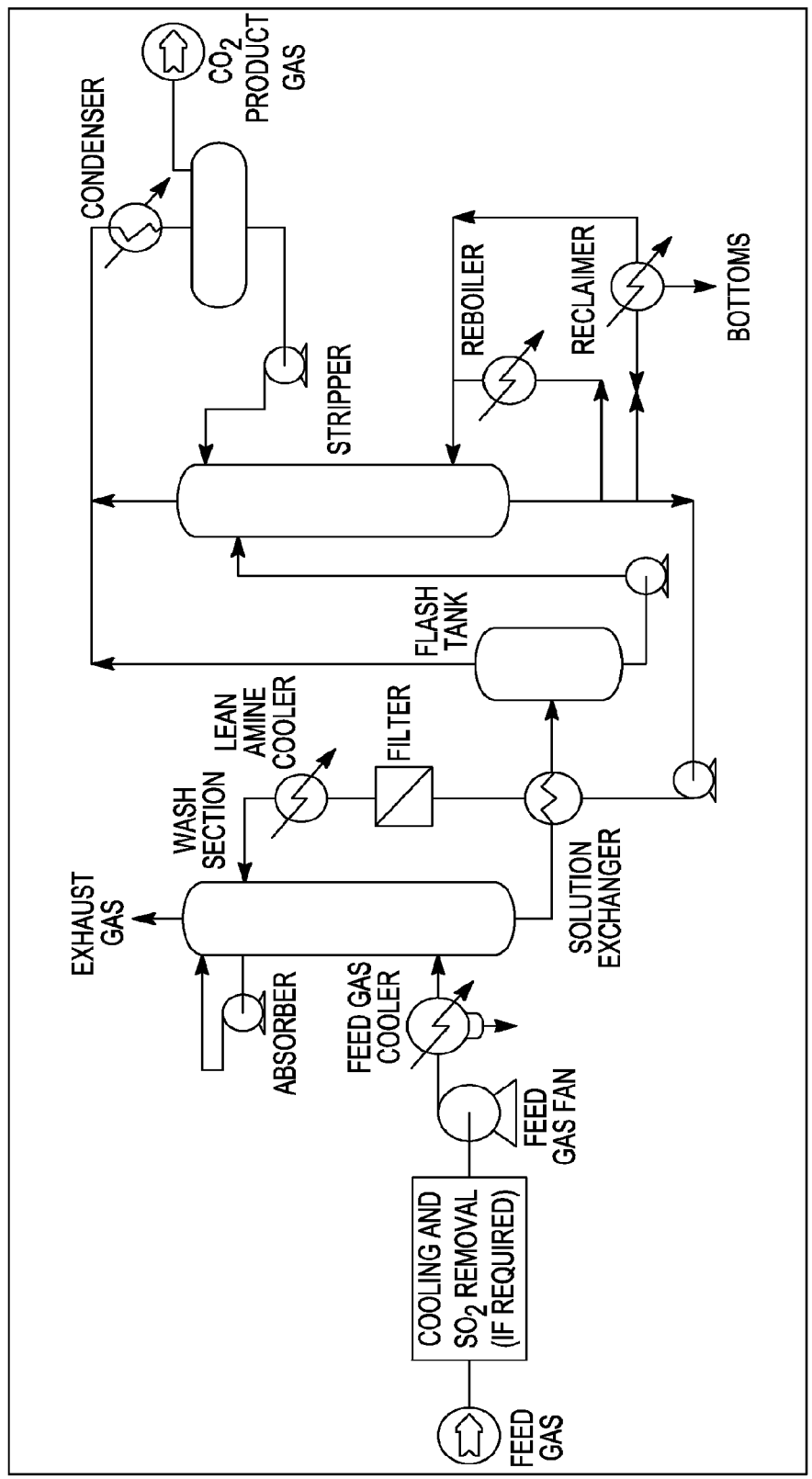
FIG. 3 is a schematic drawing showing another system for capturing and separating $CO_2$ gas from the flue gas of a coal burning power plant.

The chemical absorption process preferably uses pressure vessels, storage tanks, pumps, and heat exchangers similar to those used in many other industrial processes. The absorber module is preferably a gas/liquid contactor located within a carbon steel vessel or duct. This component can be similar to the wet scrubber modules retrofitted onto many coal-fired power plants to reduce sulfur emissions. During operation the absorber module pressure and temperature are approximately equal to those of the exhaust entering the module. Unlike the wet scrubber, there is no significant waste product generated in the absorber module. Another similar but more complicated system is shown in FIG. 3.

Another method of capturing $CO_2$ gas involves low temperature distillation (cryogenic separation) which is a process commonly used to liquefy and purify $CO_2$ from relatively high purity (>90%) sources. It typically involves cooling the gases to a very low temperature so that the $CO_2$ can be liquefied and separated.

Distillation generally has good economies of scale and is worth considering where there is a high concentration of $CO_2$ in the waste gas. The advantage of this method is that it produces a liquid $CO_2$ ready for transportation by pipeline or storage or other use as specified herein. The major disadvantages of this process are the amount of energy required to provide the refrigeration and the necessary removal of components that have freezing points above normal operating temperatures to avoid freezing and eventual blockage of the process equipment.

For post combustion flue gases, the waste streams typically contain water and other trace combustion by-products such as NOx and SOx several of which must be removed before the stream is reduced to a low temperature. Moreover, these by-products are usually generated near atmospheric pressure and tend to make cryogenic processes less economical than others in separating $CO_2$.

Figures 4, 5:
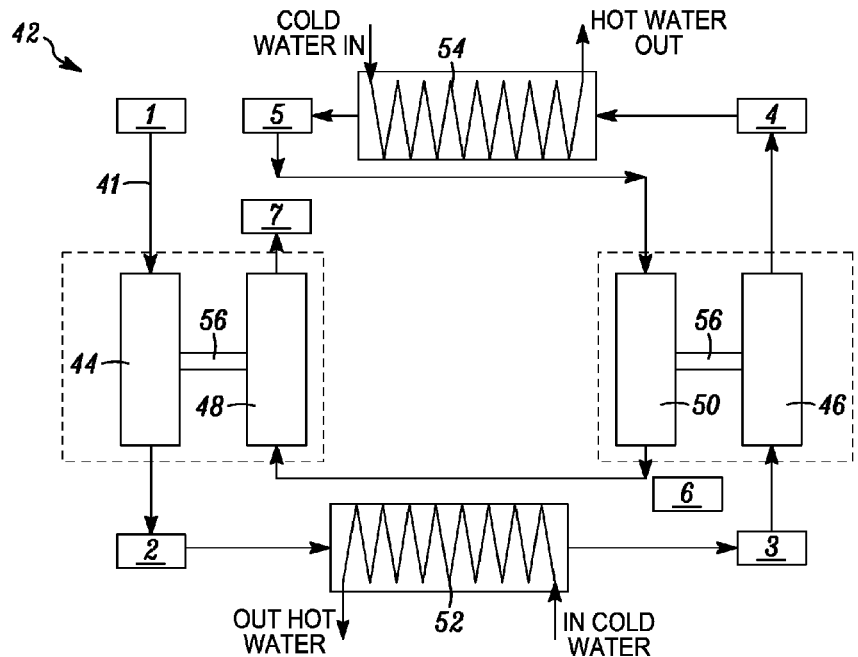
FIG. 4 is a schematic drawing showing a system for producing super chilled air using a turbo compressor and turbo expander set.
FIG. 5 is a chart showing the various pressure and temperature levels that occur using the apparatus shown in FIG. 4 to produce super chilled air.

FIG. 4 shows an example of a system 42 that can be used to produce super chilled air which in turn can be used to reduce the temperature of the $CO_2$ gas recovered through the previously described $CO_2$ capture processes. FIG. 4 is a schematic drawing showing an embodiment that utilizes a two stage turbo compressor and two stage turbo expander set, wherein the turbo compressor and turbo expander are located on a common shaft, and multiple heat exchangers are provided.

As seen in FIG. 4, system 42 has a two stage turbo compressor 44, 46, and a two stage turbo expander 48, 50, along with two heat exchangers, 52, 54. It can be seen that the ambient air 41 (or previously compressed air) is introduced and first acted upon by first turbo compressor 44 which compresses the air, wherein a first heat exchanger 52 reduces the temperature thereof. The air that has been compressed is then acted upon by second turbo compressor 46 which compresses the air again, wherein a second heat exchanger 54 reduces the temperature again. These are followed by first and second turbo expanders 48, 50, which expand and release the compressed air to produce super chilled air.

In use, the input air 41 is preferably introduced at step one (shown in boxes) into first stage turbo compressor 44, wherein the air is initially compressed. At this point, the air can be compressed, such as to about 90 to 125 psia, which also increases the temperature of the air, such as from 70 degrees F. to about 135 degrees F., or more, as shown in FIG. 5. However, because first turbo compressor 44 is not fully efficient, the compressed air does not achieve a maximum temperature. For example, there may be losses (as shown in FIG. 5), wherein the output temperature may be less.

The compressed air that exits turbo compressor 44 at step two is then preferably passed through first heat exchanger 52, wherein the temperature of the compressed air is reduced. First heat exchanger 52 can be any conventional type that draws heat away from the compressed air. Preferably, the temperature of the compressed air can be substantially reduced such as down to room temperature before it is passed onto second stage turbo compressor 46 at step three. Although the pressure of the compressed air preferably remains about the same, some minimal pressure drop may be caused by the flow of air through the interior of heat exchanger 52.

Next, the compressed air that exits first heat exchanger 52 is preferably introduced at step three into second stage turbo compressor 46, wherein the air is compressed further. For example, at this point, the air is preferably compressed to an even higher pressure, i.e., about 220 psia or more, which also increases the temperature of the air, as shown in FIG. 5. However, because second turbo compressor 46 is not fully efficient, the compressed air does not achieve maximum temperature.

The compressed air that exits second stage turbo compressor 46 at step four is then preferably passed through second heat exchanger 54, wherein the temperature of the compressed heated air is reduced again. Second heat exchanger 54 can be any conventional type that draws heat away from the air. The compressed air that exits second heat exchanger 54 at step five is then introduced into first stage turbo expander 48, wherein the compressed air is released and expanded. For example, at this point, the air which has been compressed to about 220 psia can be released until the pressure is reduced to about 55 psia, wherein the temperature can be significantly reduced, such as down to minus 80 degrees F., as shown in FIG. 5. The air that exits first stage turbo expander 48 at step six is then introduced into second stage turbo expander 50, wherein the air is released and expanded again, to step seven. For example, at this point, the air which was at 55 psia can be released until the pressure is reduced down to ambient pressure, and the temperature can be reduced further, such as down to minus 170 degrees F. to minus 185 degrees F., although due to losses, the actual output temperature may not be as low.

It should be noted that as air is passed through system 42, as described above, and as turbo expanders 48 and 50 begin to spin and operate to release the compressed air, additional work is performed which eventually results in the system reaching a steady state condition of operation. The basic operation of device 42 starts with air being introduced into first stage turbo compressor 44, and then, into second stage turbo compressor 46, and by the time the compressed air is released, because turbo expander 48 and turbo compressor 44, and turbo expander 50 and turbo compressor 46 are located on the same shaft, when turbo expanders 48, 50 begin to rotate, turbo compressors 44, 46 also begin to rotate. As this occurs, all four begin rotating in unison. A common shaft 56 ("free spindle") that extends between turbo compressors 44, 46 and turbo expanders 48, 50, respectively, enables the torque (mechanical work) generated by turbo expanders 48, 50 to drive turbo compressors 44, 46, until a steady state condition of operation is achieved. In this system, electricity is not generated, although it can be. This is only one system that can be used to produce chilled air in connection with the invention contemplated—others can be used as well.

Figure 6:
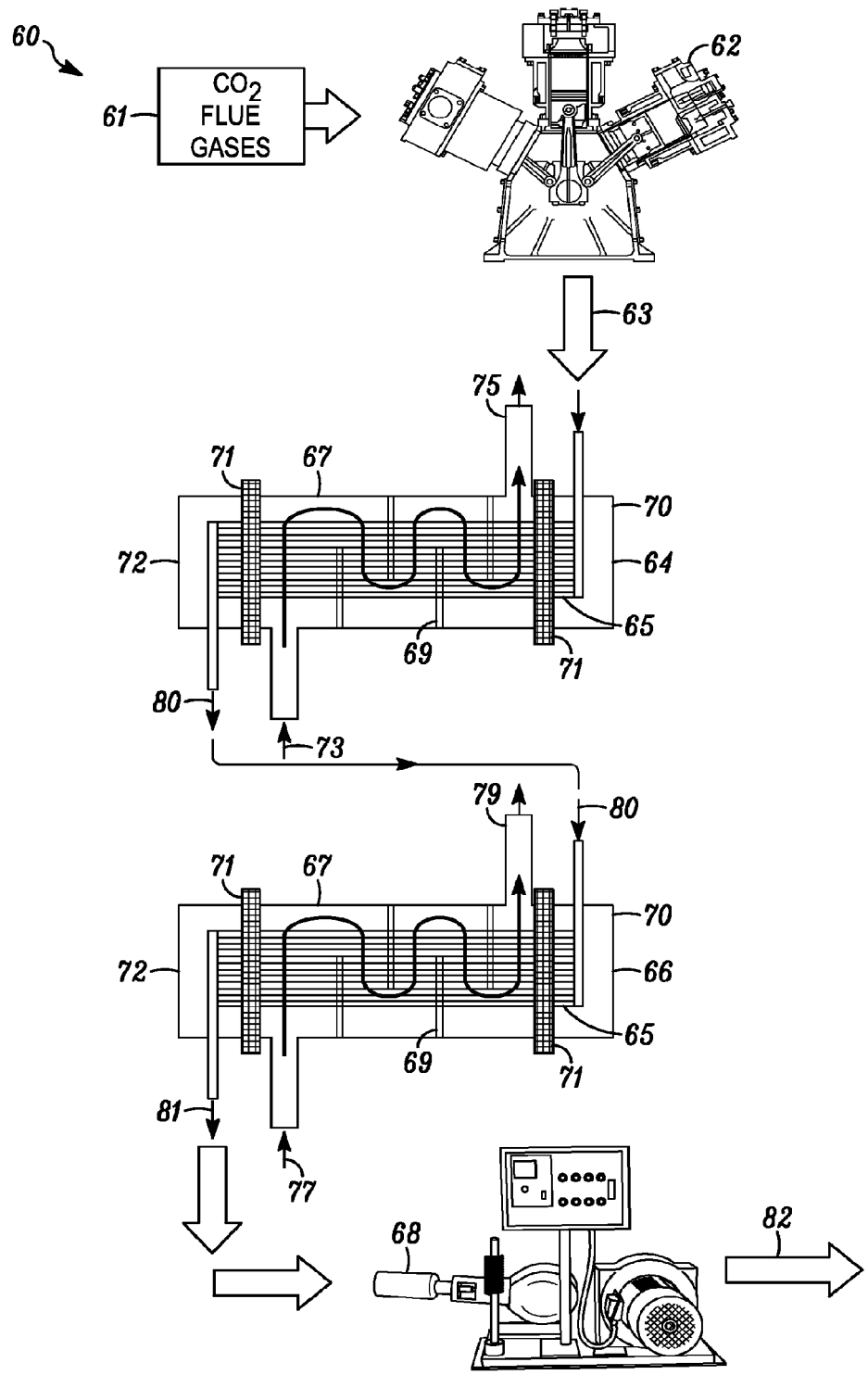
FIG. 6 is a schematic drawing showing a system for pressurizing and chilling the $CO_2$ gas captured from the flue gas of a coal burning power plant, wherein two heat exchangers are shown, one using cold water, and the other using chilled air produced by the system shown in FIG. 4, along with a cryogenic pump.

FIG. 6 shows a cryogenic pump system 60 used to pressurize, chill and liquefy the $GCO_2$ captured from the flue gas to form a pressurized cold liquid $CO_2$, using cold water and the super-chilled air produced by device 42. System 60 preferably comprises a compressor 62, a first heat exchanger 64, second heat exchanger 66, and cryogenic pump 68. The present method involves exposing the gaseous $CO_2$ to the high mass flow of super chilled air to form liquid carbon dioxide using system 60.

If the $GCO_2$ is fed directly to a heat exchanger and chilled at atmospheric pressure, the $GCO_2$ could form "dry ice". Thus, it is first desirable to pressurize the $GCO_2$ prior to chilling it. For example, in the first step, the room temperature $GCO_2$ at ambient 1 atmospheric pressure is preferably pressurized, such as to $GCO_2$ at 17 atmospheres (250 psia), using compressor 62. But because the compression process warms the compressor body, the compression process also produces heated $GCO_2$ that must be cooled, which can be accomplished by using heat exchanger 64—slightly pressurized water is passed through the shell 67 of the heat exchanger 64 and the highly pressurized $GCO_2$ is passed through the multitude of small diameter tubes 65. The small diameter of tubes 65 permits containment of the high pressure $GCO_2$, and the large quantity of tubes provides the necessary surface area for the heat transfer to occur between the water and $GCO_2$. Baffles 69 help increase the path length of the coolant water in the fixed length of the heat exchanger shell 67. Through this process, there is a pressure drop in the $GCO_2$ caused by the flow of the $GCO_2$ through the tubes over a long path length.

The $GCO_2$ is next passed through the second heat exchanger 66 wherein the super-chilled air is preferably passed through the shell 67 of heat exchanger 66, while the high pressure $GCO_2$ is passed through the small diameter tubes 65 over a long path length. It is in these heat exchanger tubes 65 that the $GCO_2$ forms $LCO_2$. The air exiting shell 67 is at sufficiently low temperature to be used elsewhere in a nearby facility, i.e., the cold air can be used, for example, in an HVAC system or in a more complex configuration to generate more electricity from a turbine-driven GenSet during hot summer months. The air exiting the shell is preferably at sufficiently low temperature to alternatively be used elsewhere in a nearby facility. For example, it can replace the cryogenic device in the PETROGAS fractionation and pressurization device for natural gas prior to its further transmission in a pipeline or refrigeration truck. This process preferably occurs after the $LCO_2$ sequestration has already been completed.

Compressor 62 can be any conventional type such as made by Ingersoll Rand to compress the $CO_2$ gas 61 to a predetermined pressure, such as 100 to 250 psia, which in turn, causes the $CO_2$ gas to heat up. The heated and pressurized $CO_2$ gas 63 is then preferably fed into first heat exchanger 64, which preferably comprises a straight tube, counter-flow type, with straight tubes 65 supported by tube sheets 71, wherein gas 63 can be introduced into tubes 65. Tubes 65 are preferably in a bundle and extended from one end 70, through shell 67 and across baffles 69, such that they exit at or near the opposite end 72. In this heat exchanger 64, cold water 73 is preferably introduced into shell 67 and circulated, such that the contact between the cold water and outer surface of tubes 65 draws heat away from the $CO_2$ gas passing through the inside of tubes 65. Cold water 73 preferably flows into shell 67 at or near end 72 and exits as hot water 75 at or near end 70. This way, it travels in a direction opposite the flow of $CO_2$ gas 63 through tubes 65, i.e., heated gas 63 enters at or near end 70 and exits at or near end 72 as relatively cool $CO_2$ gas 80. The pressure of $CO_2$ gas, both at 63 and 80, preferably remains substantially the same, although there is a slight pressure drop due to the passage of the air through tubes 65.

The cooled and pressurized $CO_2$ gas 80 is then fed into second heat exchanger 66, which, like heat exchanger 64, preferably comprises a straight tube, counter-flow type, with straight tubes 65 supported by tube sheets 71. Tubes 65 are preferably in a bundle and extended from or near one end 70, and through shell 67 and across baffles 69, such that they exit at or near opposite end 72. In this heat exchanger, super chilled air 77 from system 42, rather than cold water, is preferably introduced into shell 67 and circulated through the inside of heat exchanger 66, such that the contact between the cold air and the outer surface of tubes 65 helps to draw heat away from the $CO_2$ gas 80 passing through the inside of tubes 65. Super chilled air 77 preferably flows into shell 67 at or near end 72 and after heat is exchanged exits as warm air 79 at or near opposite end 70, such that it travels in a direction opposite the flow of the $CO_2$ gas 80, which enters tubes 65 at or near end 70 and exits as cryogenic liquid $CO_2$ 81 at or near end 72.

The temperature of the cold liquid $CO_2$ 81 that is discharged for purposes of the present invention is preferably about minus 60 degrees F. or below, although various temperatures are permissible, as will be discussed. And because there is a phase change from a gas to a liquid within tubes 65, and the gas passes through tubes 65, from one end 70 to the other 72, the pressure of the $CO_2$ gas within second heat exchanger 66 will tend to drop slightly by the time it becomes a cold liquid $CO_2$.

The cold liquid $CO_2$ 81 is then preferably fed into cryogenic pump 68 which increases the pressure of the cold $LCO_2$, such as up to 315 ATM, or close to 5,000 psia, although the actual amount will depend on a number of factors, as will be discussed. A typical cryogenic pump 68 is preferably able to deliver the required pressure for the discharged $LCO_2$ 82. If one needs 5,000 GPM, it may be necessary to use 25 pumps. However, larger volumetric flow cryogenic pumps can be used. Pressurizing the $CO_2$ also heats it up, resulting in warmer pressurized $LCO_2$. The extent to which the pressure of the liquid $CO_2$ is increased may depend on the depth of the strata, wherein, the deeper the strata, such as close to 5,000 feet deep, the more pressure will be exerted at the bottom due to the weight of the column of $LCO_2$ inside the injection pipe. For example, pump 68 could potentially be used to increase the pressure of the $LCO_2$ to about 2,600 psig, wherein, the additional pressure created within the pipe due to the weight of the column of $LCO_2$ above it can contribute to increasing the overall pressure to somewhere around 5,200 psig.

The goal here is to keep the cold $LCO_2$ cold enough and under enough pressure to keep the $LCO_2$ in liquid form, and prevent it from vaporizing into a gas prematurely when it is injected into the rock formation. For example, if the underground rock is warmer than the $LCO_2$, the pressure within the formation may have to be maintained above a certain minimum, or the initial starting temperature of the $LCO_2$ may have to be colder, to ensure that the $LCO_2$ remains a liquid as it is being injected into the pipe. Likewise, if the pressure of the liquid $CO_2$ within the rock formation drops (because the $CO_2$ is seeping into the cracks), the $LCO_2$ may have to start out even colder, or the initial pressure may have to be increased, in order to prevent the liquid from vaporizing prematurely within the pipe. For these reasons, the characteristics of each formation should be taken into account when determining the initial temperature and pressure of the $LCO_2$ injected into the pipes. Valves to prevent back pressure from the $LCO_2$ phase change that may occur in the formation should also be provided.

Figures 7, 8:
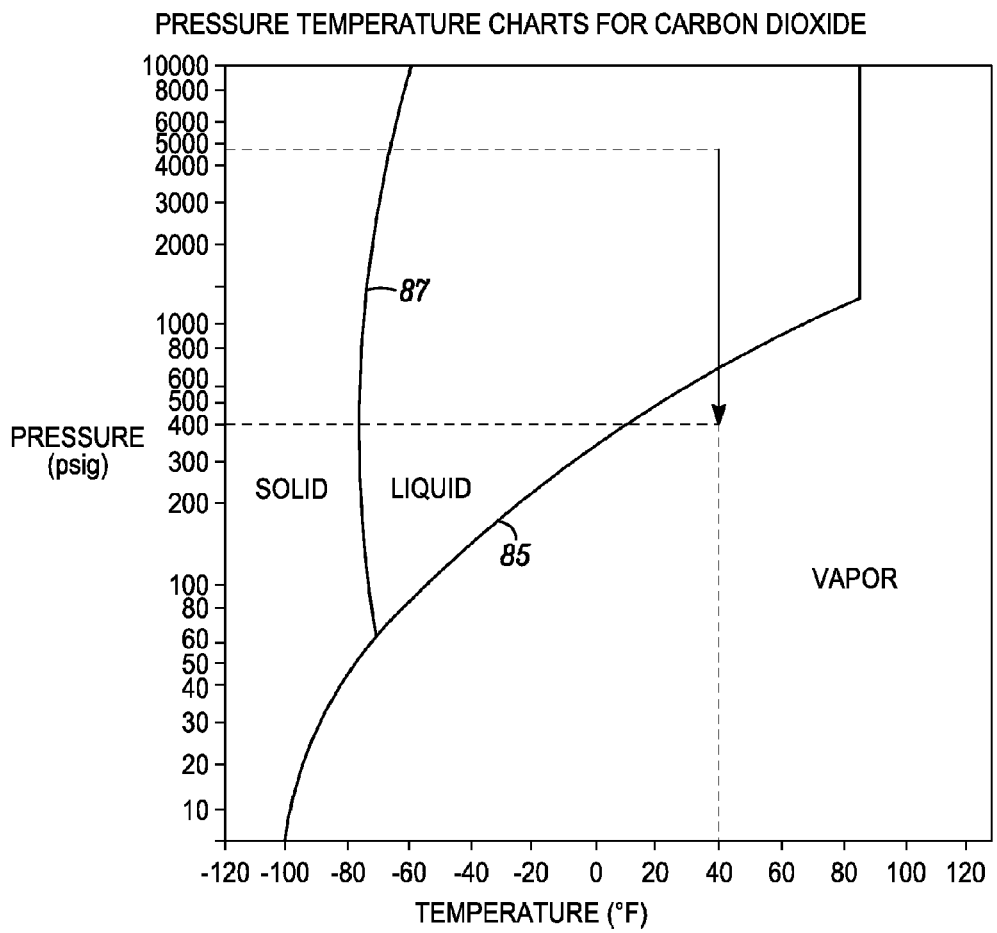
FIG. 7 is a phase chart for carbon dioxide in vapor, liquid and solid phases, showing the temperature and pressure amounts that are required for those phases.
FIG. 8 is a diagram showing the pressure and temperature of $CO_2$ at various stages within the method.

In this case, the temperature and pressure of the $LCO_2$ starting out preferably causes it to maintain its liquid state, as shown in the phase chart of FIG. 7—the temperature and pressure preferably follows left of the phase change line 85 and right of line 87. For example, if $GCO_2$ is reduced to minus 60 degrees F., the pressure will have to be increased to about 100 psig or more for the gas to change to a liquid. Likewise, if $GCO_2$ is only about 0 degrees F., the pressure will have to be increased to about 400 psig or more for the gas to change to a liquid. On the other hand, cooling the $GCO_2$ down to below minus 100 degrees F. can cause the CO2 to turn into a solid. The $CO_2$ will also become a solid at around minus 70 degrees F., provided the pressure is high enough, as shown by line 87.

Adsorption of $CO_2$ and Desorption of $CH_4$:

In gas shale, natural gas occurs as a free gas in the intergranular and fracture porosity, but is also adsorbed on clay and kerogen surfaces, very similar to the way methane is stored within coal beds. It has been demonstrated in gassy coals that $CO_2$ is preferentially adsorbed, displacing methane at a ratio of two for one or more. Black shale reservoirs react similarly, desorbing methane in the presence of adsorbing $CO_2$. If this is the case, black shale serves as an excellent sink for $CO_2$ and has the added benefit of serving to enhance natural-gas production.

Adsorption is the adhesion of atoms, ions, bio-molecules or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. The term sorption encompasses both processes, while desorption is the reverse of adsorption.

Similar to surface tension, adsorption is a consequence of surface energy. In a bulk material, all the bonding requirements (be they ionic, covalent, or metallic) of the constituent atoms of the material are filled by other atoms in the material. However, atoms on the surface of the adsorbent are not wholly surrounded by other adsorbent atoms and therefore can attract adsorbates.

The adsorption data for carbon dioxide on gas shale and on coal has been collected over a large range of pressures, but not often at very low temperatures. The collected data conforms to the Langmuir Isotherms for gaseous carbon dioxide. The adsorption data at cryogenic temperatures has been collected at sub-atmospheric pressure so that the $CO_2$ is still in the gaseous state ($GCO_2$). In all cases, the gas adsorption is enhanced as the temperature is reduced or the pressure is increased or a combination of the two. Adsorption of liquids also occurs but is not based on the theory developed by Langmuir decades ago. Cryogenic liquid adsorbates have been more recently applied to coal adsorbents and shale adsorbents.

Figure 9:
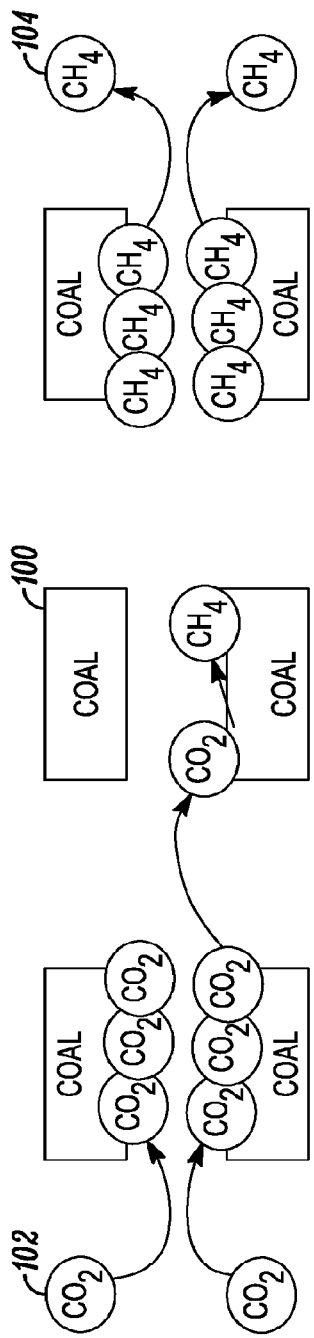
FIG. 9 is a schematic drawing showing $CO_2$ being adsorbed onto coal and $CH_4$ being desorbed.

If the underground coal or gas shale is exposed to $CO_2$ while it is holding the adsorbed natural gas (mostly methane, $CH_4$), it has a greater affinity for the $CO_2$ than the natural gas. Thus, the natural gas is released and the $CO_2$ is adsorbed. This is shown in FIG. 9 which depicts the coal 100 having a higher adsorption affinity to gaseous $CO_2$ molecules 102 at relatively high pressures (such as 200 to 500 psig or more) than for gaseous $CH_4$ molecules 104. In a given coal bed, for example, as the coal 100 is exposed to $CO_2$ molecules under pressure, because coal has a greater affinity for the $CO_2$ molecules than the $CH_4$ molecules, the $CH_4$ molecules 104 are naturally desorbed, thereby allowing the $CO_2$ molecules 102 to be adsorbed. This results in advantageously releasing the $CH_4$ molecules 104 so that natural gas can be recovered, while at the same time, adsorbing the $CO_2$ molecules 102 so that they can be sequestered in the coal bed. The same process occurs in gas shale.

Figure 10:
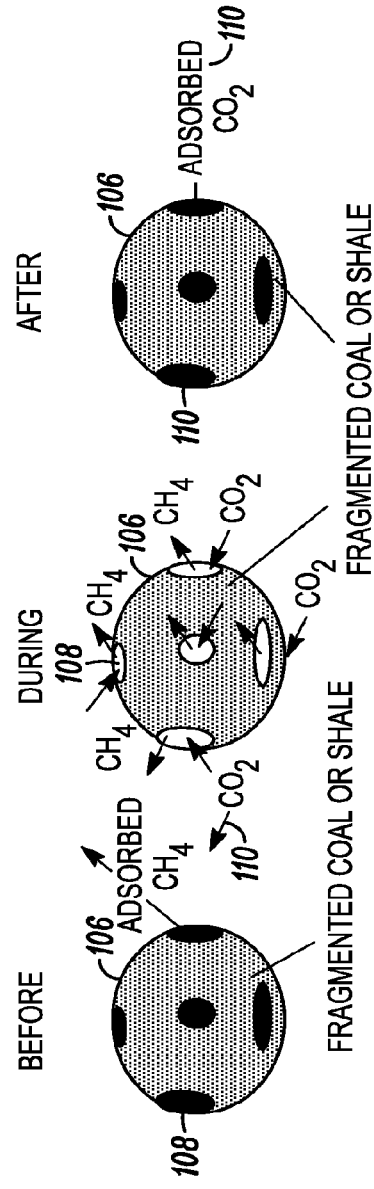
FIG. 10 is a schematic drawing showing the before, during and after steps relating to how $CO_2$ is adsorbed and $CH_4$ is desorbed and released from coal or shale.

FIG. 10 shows how the fragmented coal or gas shale fragments or pieces 106 are before, during and after the adsorption process. On the left hand side, before the process begins, a fragment of coal or gas shale 106 is shown with $CH_4$ 108 adsorbed onto its surface, which occurs over a period of time within the underground formation. Then, as shown in the middle drawing, during adsorption, the $CO_2$ molecules 110 have a greater affinity for the coal or gas shale fragments 106, and therefore, are adsorbed onto the fragments, while at the same time, the $CH_4$ molecules 108 are desorbed and released as natural gas. After the adsorption process, as shown in the right hand drawing, the adsorbed CO2 molecules 110 remain on the surface of the fragments 106, wherein, the $CH_4$ molecules 108 are released and can be recovered.

The rate at which $CO_2$ is adsorbed onto and $CH_4$ is desorbed from the fragments is determined based on the temperature and pressure levels and other factors existing in the formation. In this respect, the first mathematical fit to an isotherm was likely to have been published by Freundlich and Küster (1894) and is a purely empirical formula for gaseous adsorbates as follows:

$$\frac{x}{m} = kP^{\frac{1}{n}}$$

where x is the quantity adsorbed, m is the mass of the adsorbent, P is the pressure of adsorbate and k and n are empirical constants for each adsorbent-adsorbate pair at a given temperature. The function has an asymptotic maximum as pressure increases without bound. As the temperature decreases, the constants k and n change to reflect the empirical observation that the quantity adsorbed rises more quickly so that higher pressures are not required to saturate the surface.

The Langmuir equation or Langmuir isotherm or Langmuir adsorption equation or Hill-Langmuir equation relates to the coverage or adsorption of molecules on a solid surface to gas pressure or concentration of a medium above the solid surface at a fixed temperature. The following equation was developed by Irving Langmuir in 1916:

$$\theta = \frac{\alpha \cdot P}{1 + \alpha \cdot P}$$

where θ or theta is the fractional coverage of the surface, P is the gas pressure or concentration, and α alpha is a constant. The constant α is the Langmuir adsorption constant and increases with an increase in the binding energy of adsorption and with a decrease in temperature. Thus, the extent of adsorption depends on physical parameters such as temperature, pressure, concentration in the bulk phase, and the surface area of the adsorbent, as well as on chemical parameters such as the elemental nature of the adsorbate and adsorbent. Low temperatures, high pressures, high surface areas, and highly reactive adsorbates or adsorbents generally favor adsorption. Cryo-adsorption is a method used for hydrogen storage where gaseous hydrogen at cryogenic temperatures (150-60 K) is physically adsorbed on porous material, mostly activated carbon. The achievable storage density is between liquid hydrogen ($LH_2$) storage systems and compressed hydrogen ($CGH_2$) storage systems.

One of the objectives of the present method and apparatus is to enable the coal or gas shale formation to be exposed to $CO_2$ under the right conditions within the joints, cracks, fissures and fractures of a rock formation, so that the $CO_2$ molecules will be adsorbed onto the fragments, whereas, the $CH_4$ molecules will be desorbed and released, such that the released natural gas can then migrate toward the nearby recovery well bores along an imposed pressure gradient and buoy itself upward through the pipes to the surface. As a consequence, the $CO_2$ can be sequestered and stored in the underground formation, and $CH_4$ can be released and recovered.

Figure 11:
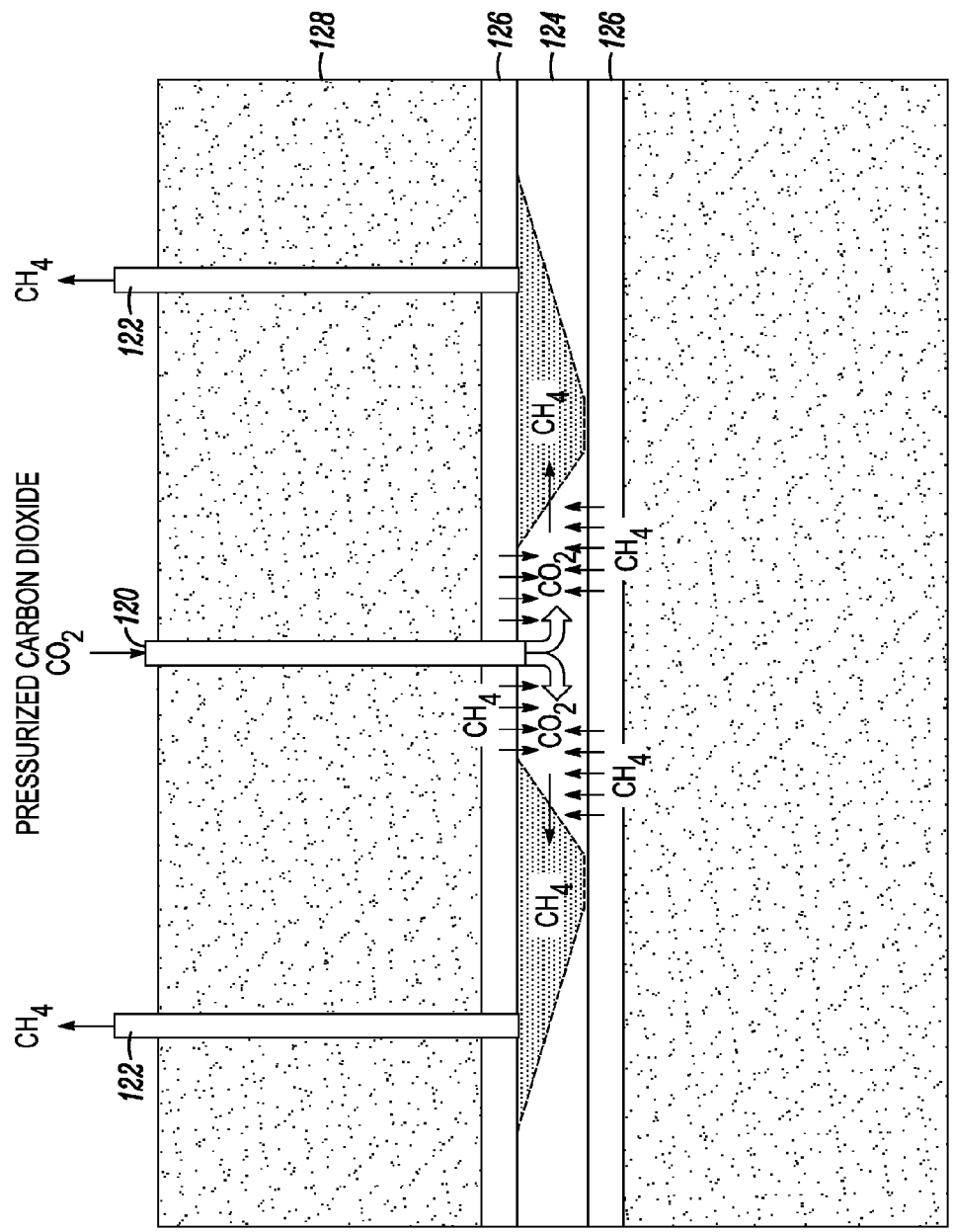
FIG. 11 shows a cross section of a typical abandoned coal mine showing how the input/injection pipes and output/recovery pipes are positioned within the underground strata.
Figure 12:
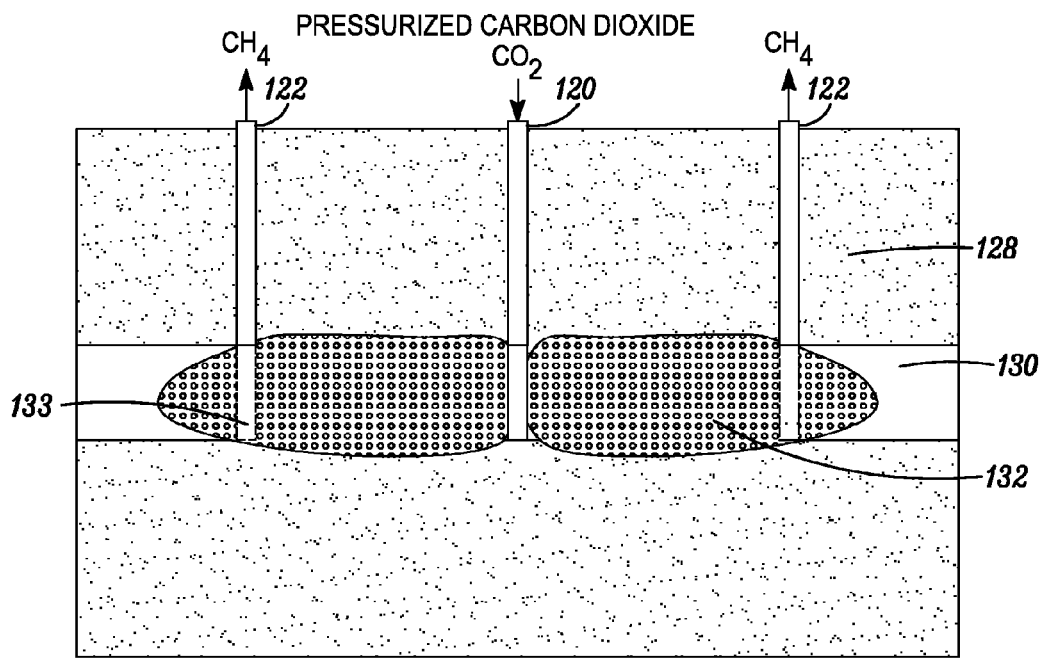
FIG. 12 shows a cross section of a typical coal or gas shale site showing how the input/injection and output/recovery pipes are positioned within the underground strata or layer.
Figure 13:
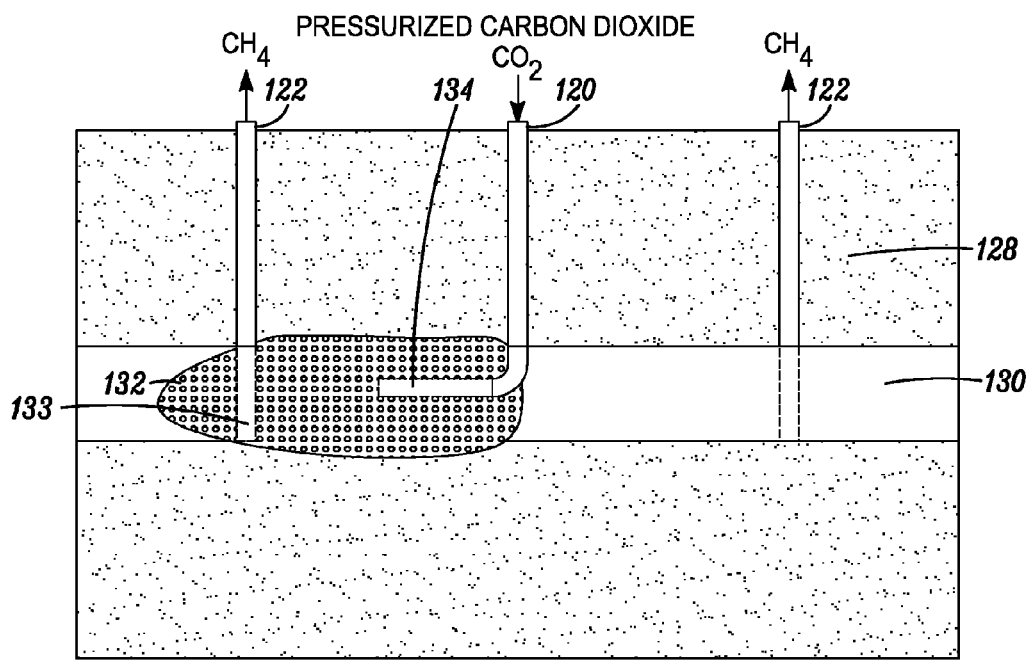
FIG. 13 shows a cross section of a typical coal or gas shale site showing how the input/injection and output/recovery pipes are positioned within the underground strata or layer, wherein the lower end of the input/injection pipe is extended horizontally.

The proposed approach to injecting $LCO_2$ into the underground formation is to use an array of injection pipes 120 that extend down through the geological layers of rock until the targeted coal or gas shale layer is reached, as diagrammatically shown in FIGS. 11, 12 and 13. The injection pipes, 120, that extend through the underground layers is preferably solid, whereas, the bottoms of the pipes 133 that extend down through the targeted coal or shale strata is preferably perforated.

Figure 24:
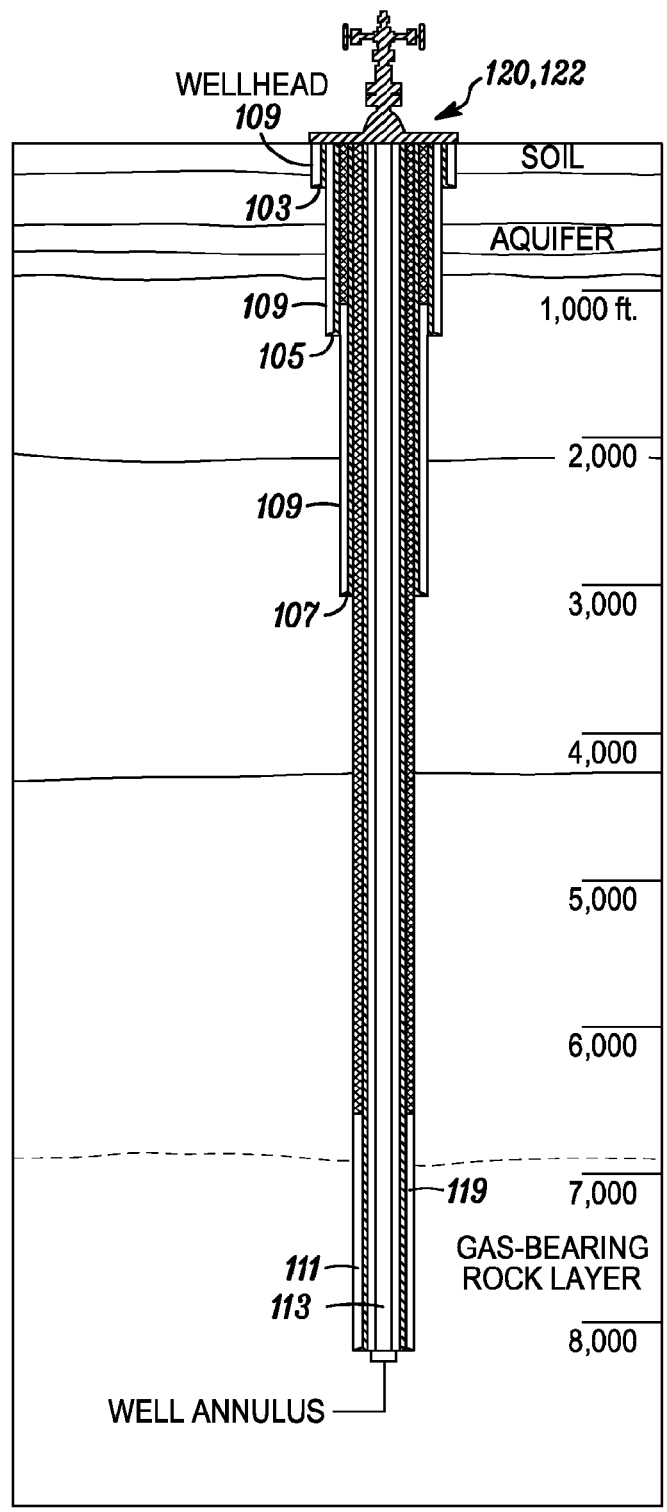
FIG. 24 shows a cross section of a typical pipe extending down into the gas bearing strata through the soil and layers above.

An example of the various layers of tubing that can be extended into the strata as part of pipe 120 is shown in FIG. 24. For example, at the top, there can be a conductor casing 103, followed by a surface casing 105, followed by an intermediate casing 107, with concrete 109 formed in between each layer, wherein these layers can be provided, depending on the type and nature of rock formation that is encountered. Layering and using multiple pipes help to allow the well bores to be safely drilled and the pipes to be safely descended down into the underground formation, by preventing unconsolidated materials, such as soil, sand and gravel, from caving in around the pipes during drilling, and allowing various pipes to be isolated relative to the different rocks and layers encountered, which helps to assure that there are no leaks in the pipe system. The various layers of pipes also act as insulators to help maintain the temperature of the surfaces through which the chilled liquid passes. The perforations 119 can then be located at or near the bottom of the pipe, such as in the production casing 111 and/or production tubing 113, which is preferably the smallest pipe within the layers, and preferably extends down within the coal or gas shale strata, which can be below layers of rock and mud. Perforations 119 are preferably substantially horizontal such that from a substantially vertically oriented injection pipe 120, the $LCO_2$ can be released substantially horizontally into the matrix.

The injection pipe 120 is preferably made of steel or other strong material and can be circular and of sufficient internal diameter and thickness depending on the length and pressures that are expected to be encountered. It can be much like the pipe shown in FIG. 24. The perforations 119 can be circular and of sufficient size to enable a sufficient flow of fluid into and out of the targeted rock formation, such as a gas bearing rock layer as shown in FIG. 24. For example, four perforations can be formed in the shape of a ring at a predetermined height along the length of the pipe. In this respect, the first ring of holes can be located close to the top of the targeted production layer or strata, such as about fifteen feet below the upper surface of the layer. Then, additional rings of holes can be extended down along the pipe 120, such as about once every fifteen feet or so, until the last ring of holes can be located at the bottom of the well bore.

The total cross sectional flow area of the perforations 119 is preferably designed to match the cross sectional flow area of the pipe itself. Thus, the design of each pipe will depend on the internal diameter of the pipe, the height or thickness of the rock formation it is being used to fracture, and the size or diameter of each perforation in the pipe. For example, consider a 250 feet vertically thick shale formation where the internal diameter of the pipe is eight inches, and the perforations are one inch in diameter (four perforations at each level). In such case, the optimal design might be 16 rings of four holes each (around the circumference), where the top ring will be 7 feet from the nearest layer interface, and each intermediate ring will be 14.7 feet apart from the other. Also consider a 50 feet vertically thick shale formation with the same internal diameter of pipe, and the same diameter perforations, wherein, in such case, the optimal design might be 16 rings of four holes each, where the top ring will be 1.5 feet from the nearest interface, and each intermediate ring will only be 3 feet apart. This allows for the maximum rate of flow through the perforations given the size and diameter of the pipe. If more perforations are provided around each ring, then the vertical spacing of the rings will have to be increased. Each pipe can be designed to accommodate the conditions that exist in each application.

To allow for proper recovery and release of gases that are produced within the formation, similar arrays of recovery pipes 122 that extend down into the same geological layers are preferably provided. Similar to the injection pipes 120, the upper portion of the recovery pipes 122 are preferably solid with various layers of pipes and concrete, wherein the bottoms of the pipes that extend down into the targeted formation is preferably perforated 119. These recovery pipes 122 can be substantially similar to the injection pipes 120, i.e., they can be made of steel or other strong material and can be circular and of sufficient diameter and thickness depending on the length and pressures that are expected. The perforations 119 can also be circular and of sufficient size and number to enable a sufficient flow of fluid into the pipe from the rock formation.

Figure 25:
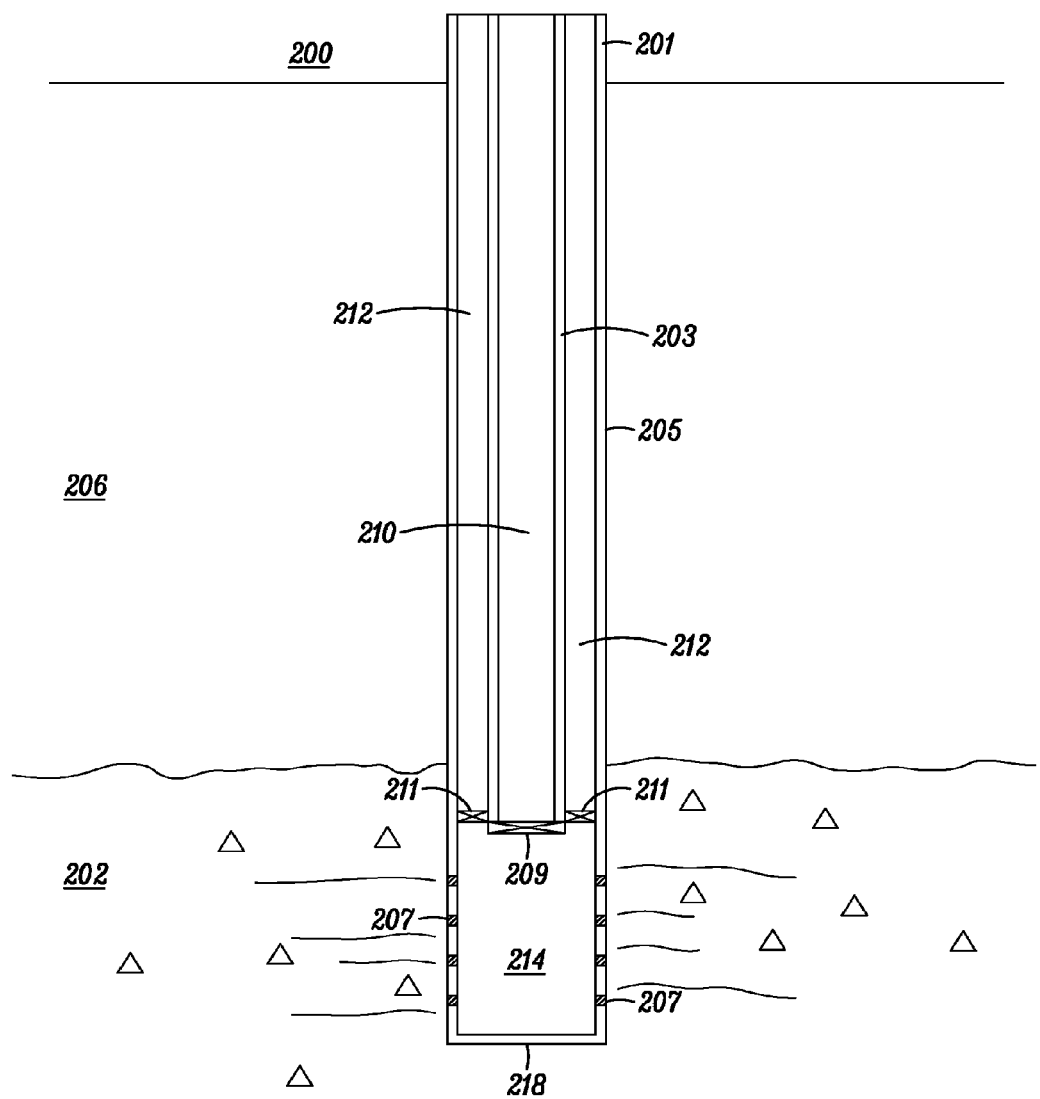
FIG. 25 shows a cross section of an alternate injection pipe embodiment having inner and outer pipes and valves at the bottom for injecting liquid $CO_2$ into a coal or shale formation.

FIG. 25 shows an embodiment of an injection pipe 201 that extends down through underground substrate 206 and into a stratum 202 having an inner pipe 203 and outer pipe 205 concentrically oriented in connection with each other. Inner pipe 203 is preferably shorter than outer pipe 205 and ends substantially before the bottom of outer pipe 205 within stratum 202, although not necessarily so, as shown in FIG. 24. Multiple perforations 207 are preferably provided on or near a bottom section 214 of outer pipe 205 within stratum 202, such that pressurized $LCO_2$ can be released through perforations 207 and into stratum 202, as discussed. This is different from the embodiment of FIG. 24 where the perforations are on the smallest inner pipe. Preferably valves 209, 211 are provided at or near the bottom of inner and outer pipe 203, 205 which are capable of sealing the openings therein, including the concentric space between inner pipe 203 and outer pipe 205. For example, space 210 within inner pipe 203 can be sealed with valve 209, and space 212 between inner pipe 203 and outer pipe 205 can be sealed with valve 211. Valves 209, 211 preferably help to seal the bottom openings in inner and outer pipes 203, 205 such that pressure inside space 210 and/or space 212 can build up within injection pipe 201 at the desired time. Valves 209, 211 also enable water and other substances found within stratum 202 from being sucked back into spaces 210 and 212, via perforations 207, and up through injection pipe 201 toward surface 200. Preferably, bottom distal end 218 of outer pipe 205 is sealed.

Figure 27:
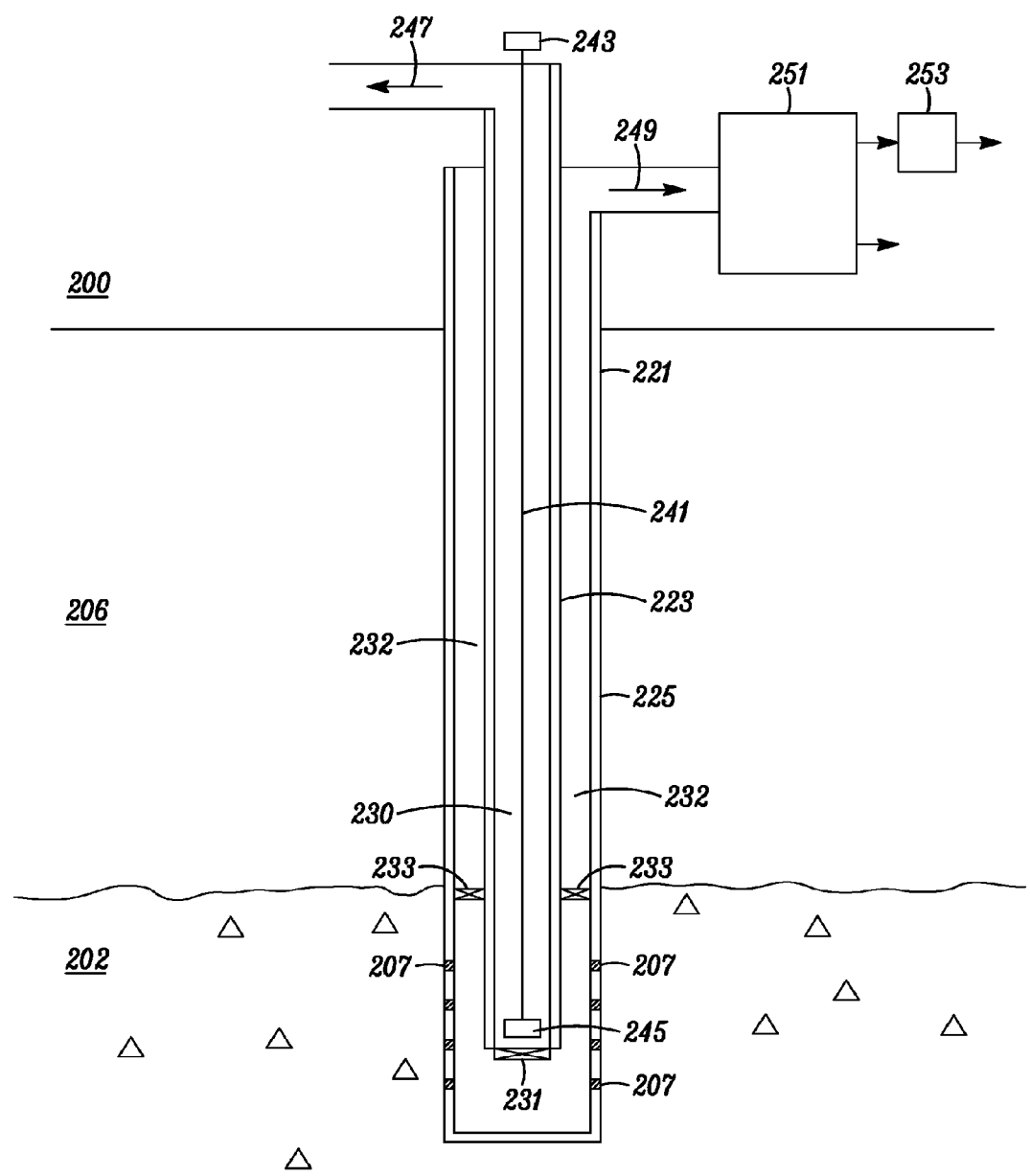
FIG. 27 shows a cross section of an alternate recovery pipe embodiment having inner and outer pipes and valves at the bottom for recovering methane from a coal or shale formation.

Within a given application, one injection pipe 201 is preferably located at the center of a number of recovery pipes 221 which fills the available acreage above the targeted formation. Like injection pipe 201, each recovery pipe 221 preferably consists of an inner pipe 223 surrounded concentrically by an outer pipe 225, wherein the inner pipe 223 is shorter than the outer pipe 225, as shown in FIG. 27, although recovery pipe 221 can be more like the pipe shown in FIG. 24. Recovery pipe 221 also preferably has multiple perforations 207 at the bottom extended down into matrix 202. A valve 231 is preferably provided at the bottom of inner pipe 223 to seal space 230 within inner pipe 223. An additional valve 233 is preferably provided to seal space 232 between inner pipe 223 and outer pipe 225. In this respect, preferably, using the valves, the bottom of each injection and recovery pipe 201, 221 can be opened and closed during the pressurized injection cycles. Recovery pipe 221 preferably enables methane and other natural gases to rise and be extracted and recovered from the matrix.

Figure 15:
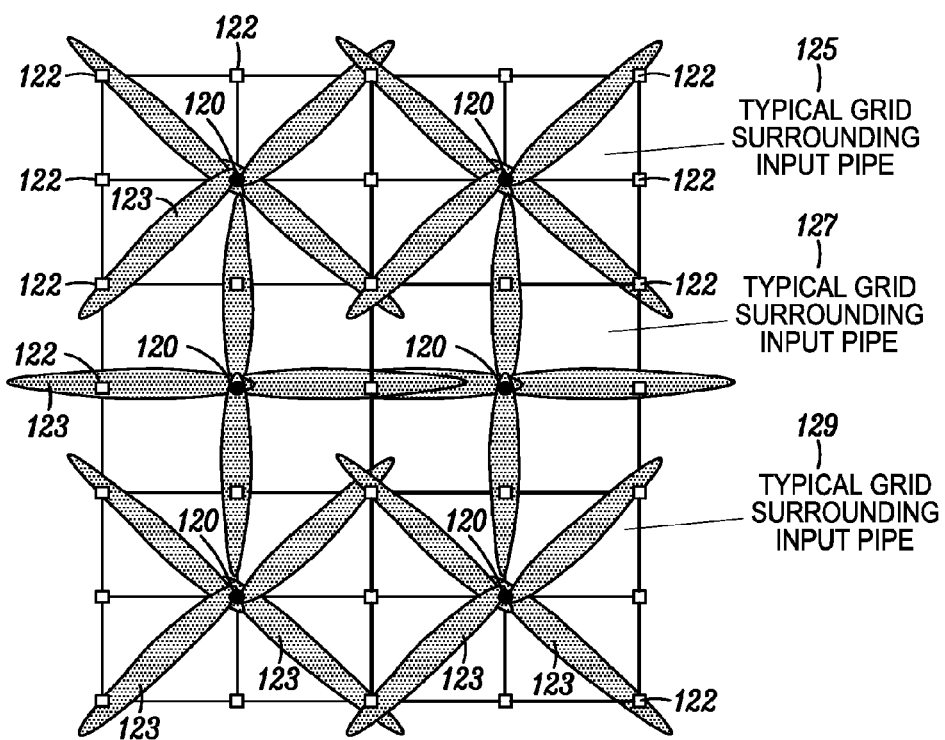
FIG. 15 shows in plan view a typical coal or gas shale site showing how the arrays of input/injection and output/recovery pipes are located relative to each other, and how the narrow voids created by the pressurized liquid $CO_2$ injections from each perforation in each input/injection pipe are oriented, wherein the different grids are offset to allow the voids to intermesh with each other, to allow more area to be covered by each input/injection pipe.
Figure 16:
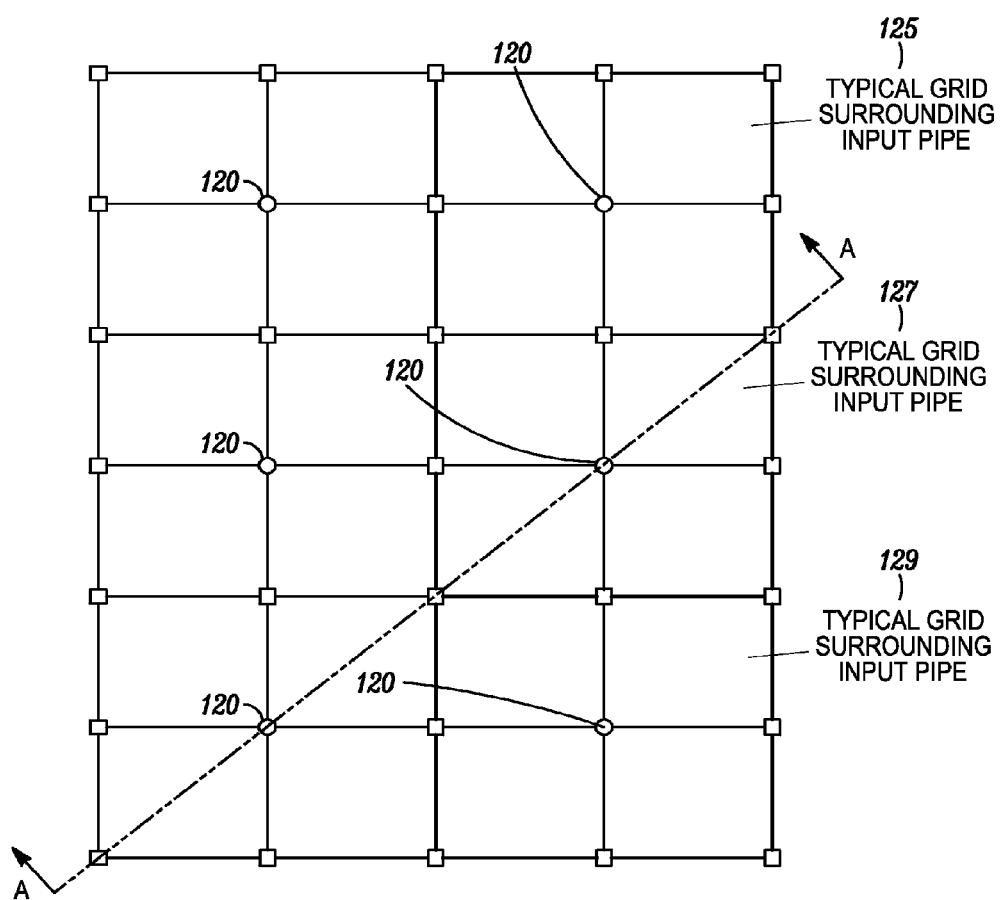
FIG. 16 shows another plan view of the coal or gas shale site shown in FIG. 15.
Figure 17:
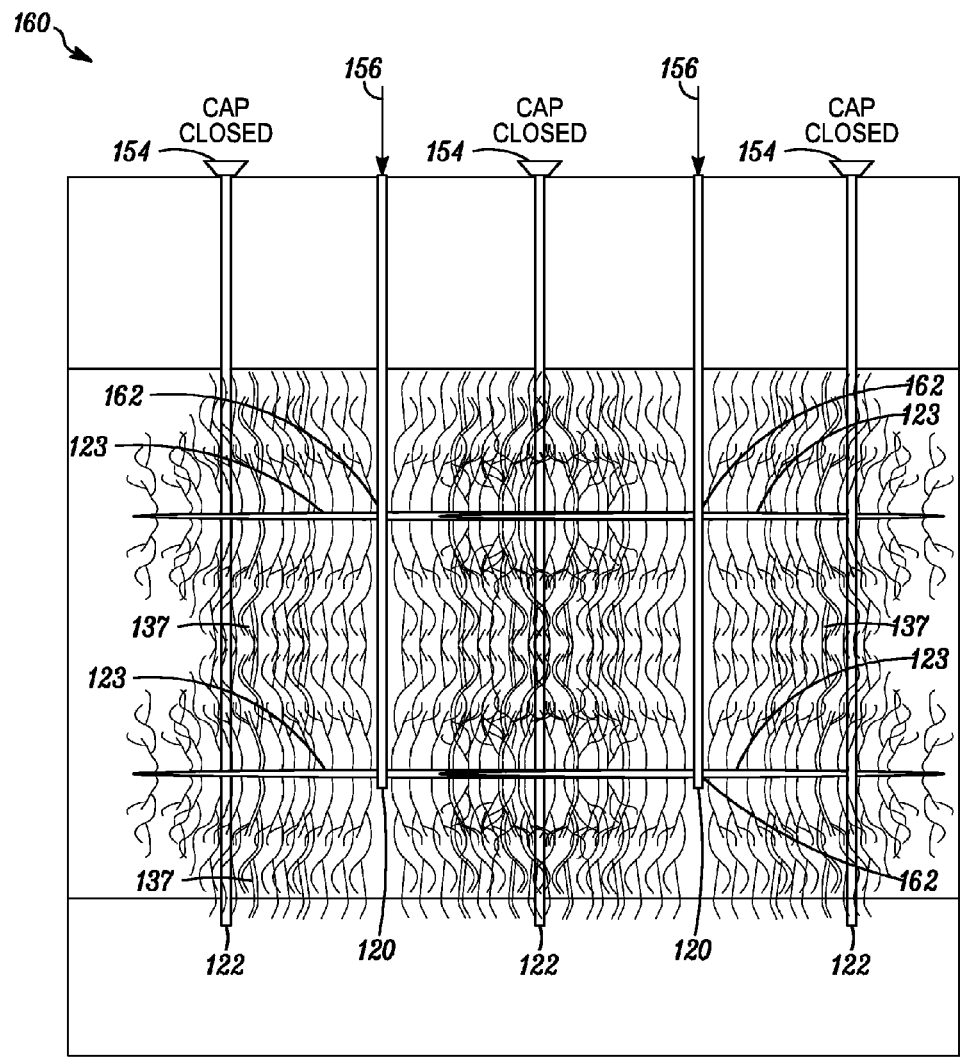
FIG. 17 shows a cross section of a typical coal or gas shale site showing how the input/injection and output/recovery pipes are positioned within the underground strata, wherein the pressurized cold liquid $CO_2$ injected through each perforation within each input/injection pipe forms horizontally directed voids that extend laterally through the formation, as well as extended web-like fractures extending above and below the voids throughout the formation.
Figure 18:
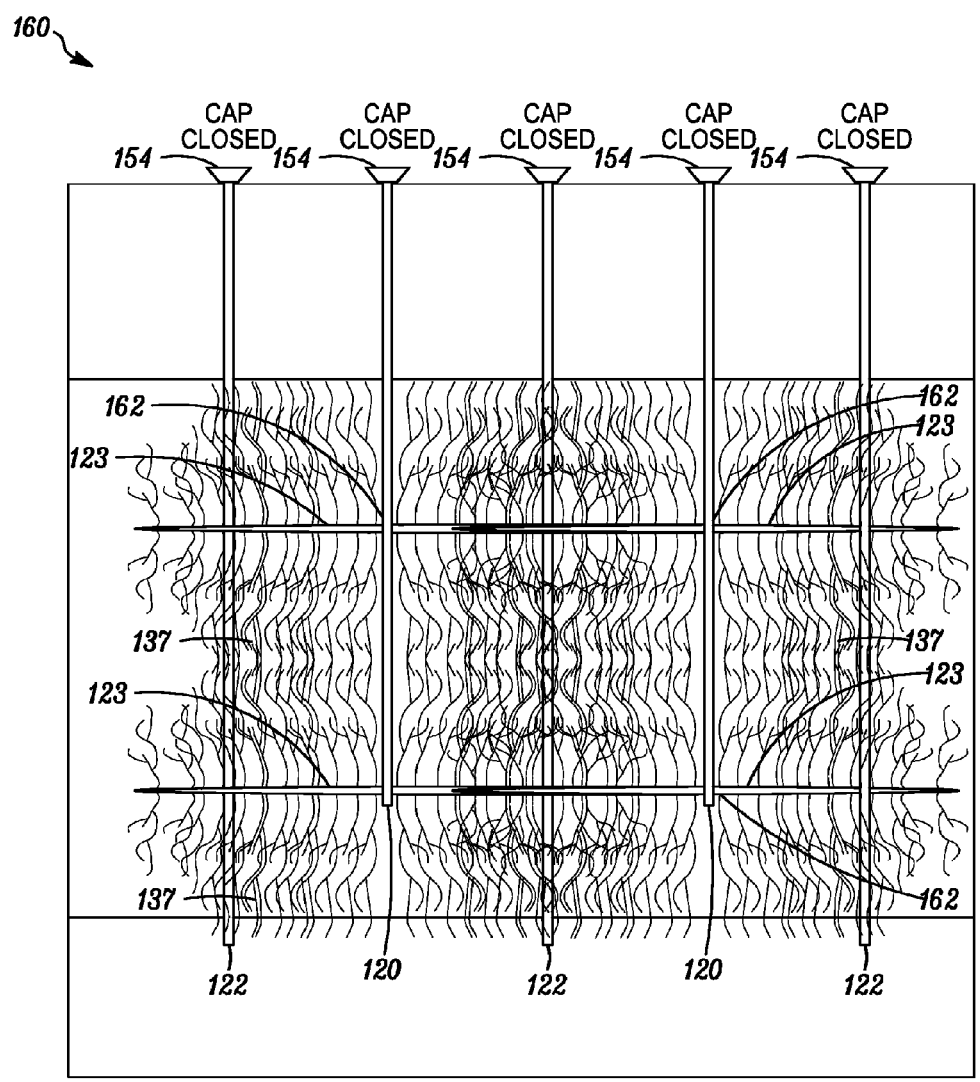
FIG. 18 shows a similar cross section of the site shown in FIG. 17, but in this drawing, the pipes are closed at the top.
Figure 19:
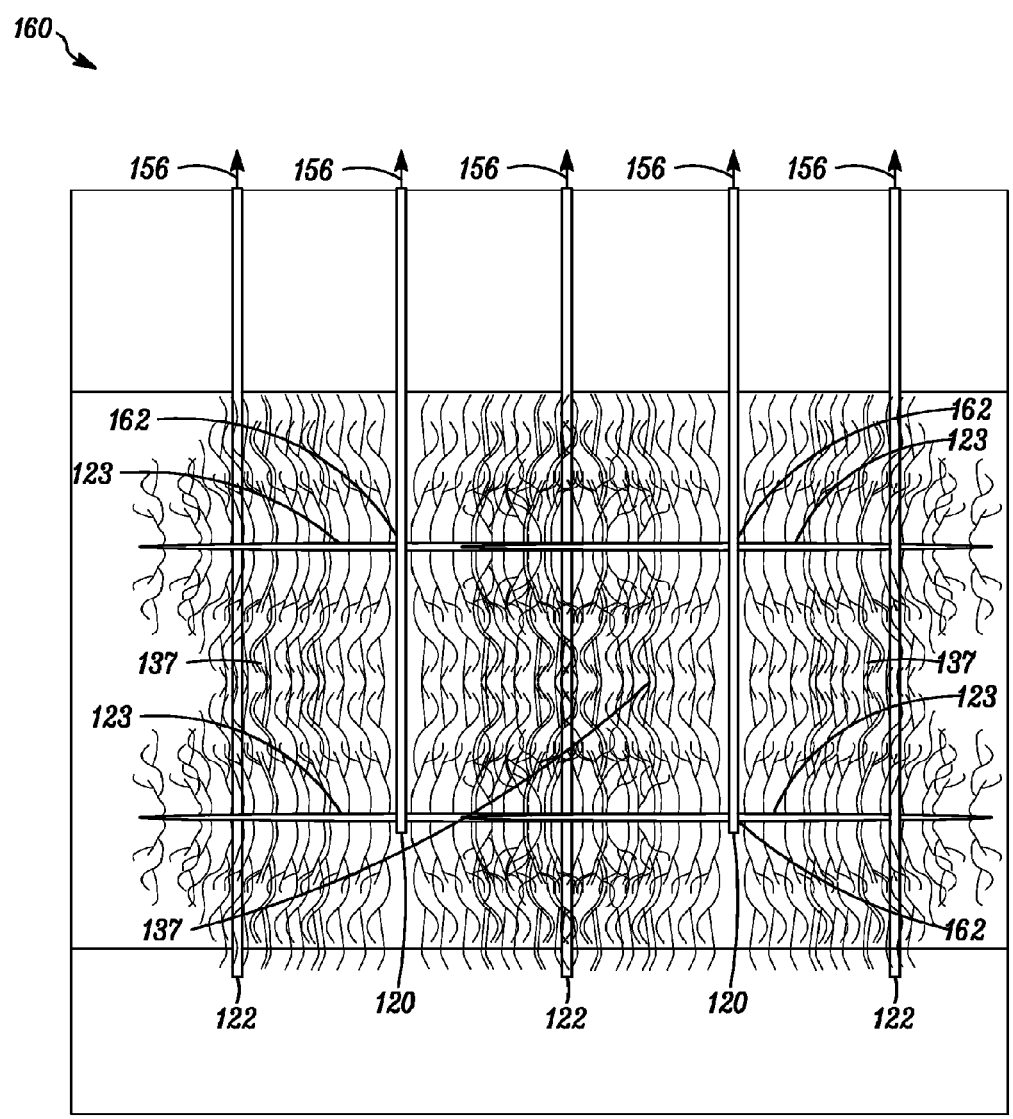
FIG. 19 shows a similar cross section of the site shown in FIG. 17, but in this drawing, the pipes are open.

Preferably, there are several recovery pipes 122, 221 for each injection pipe 120, 201, within a particular geographical area, such as concentrically surrounding the injection pipes 120, 201, as shown in FIGS. 15 and 16. That is, for every injection pipe 120, 201, there are preferably several recovery pipes 122, 221, such as four to eight, or more, in the form of a grid to enable a sufficient amount of gas or methane to be recovered from the formation that surrounds a single injection pipe 120, 201. Because the goal is to release the lower density natural gases and recover them from a large geographical area, there are preferably more recovery pipes 122, 221 than injection pipes 120, 201. Each recovery pipe 122, 221 is preferably extended deeper into the strata than the injection pipes 120, 201, as shown in FIGS. 17 to 19, which enables gases formed within the fractures that are formed in the deeper areas that are below the injection pipes 120, 201 to be readily recovered.

Preferably, injection pipes 120, 201, are spaced apart a sufficient distance relative to each other to enable the natural gases formed within the geographical area to be efficiently recovered. This can be based, for example, on the expected reach of the fracturing method, wherein the greater the reach, the greater the distance that can be extended between adjacent injection pipes 120, 201. Because the fracturing method can effectively reach great distances, the number of injection pipes 120, 201 within the same geographical area can be reduced. For example, in one embodiment, the distance between injection pipes 120, 201 and the surrounding recovery pipes 122, 221, as shown in FIG. 15, can be about 1,000 feet or more, and thus, the distance between adjacent injection pipes 120, 201 can be greater, such as every 2,000 feet or more. Relative to one injection pipe 120, 201, the surrounding recovery pipes 122, 221 are preferably used as receivers for gas recovery, wherein this layout can continue throughout the acreage, with no interference between adjacent sets of injection 120, 201 and recovery 122, 221 pipes.

FIG. 15 shows an example of an array of pipes that can be used on the surface of a geological formation, wherein injection pipes 120, 201 and recovery pipes 122, 221 are laid out in grid fashion, with the narrow void or fracture areas created by the high pressure injection jets of $LCO_2$ emanating from the injection pipes 120, shown by the fan-shaped configuration 123. It should be noted that because the perforations typically comprise four to eight holes spaced equidistance apart at 45 to 90 degrees at a predetermined level or height, each void or fracture 123 formed by each perforation will often form a pattern of voids 123 that are at angles relative to each other. Where there are more perforations, such as eight or more, there will be more voids 123.

FIG. 15 also shows a preferred pattern for rubblization by orienting the perforation holes on the injection pipes 120, 201 so that the voids 123 they create will mesh with each other. As shown in FIG. 15, one row or grid 125 of injection pipes 120, 201 is oriented with perforations (and therefore voids 123) at forty-five degrees relative to the grid pattern, wherein, the adjacent row or grid 127 is oriented with the perforations (and voids 123) extending ninety degrees relative to the grid pattern, wherein the perforations on one row 125 are at forty-five degrees relative to those of the adjacent row 127. The same is true between grids 127 and 129. This way, by aiming the injection in different directions, to create voids 123 extending at different angles, better coverage is possible using fewer injection pipes 120, 201. It can also be seen that more direct pressure can be applied in the direction of voids 123, whereas, less direct pressure is applied between the voids 123, and therefore, as shown in grids 125 and 129, it may be desirable to orient the perforations to direct the $LCO_2$ injections toward the furthest-away recovery pipes 122, 221.

FIG. 11 shows the present method used in an abandoned coal mine, wherein injection pipes 120 are positioned within soil 128 and down into an abandoned tunnel 124 where there are layers of coal 126. As can be seen, when the $LCO_2$ is injected into injection pipes 120, and released through perforations, the $LCO_2$ is injected into the tunnel 124 where the $CO_2$ can be adsorbed onto the coal surfaces, and $CH_4$ can be desorbed and released into tunnel 124. Pressure is preferably allowed to build by sealing recovery pipes 122, wherein the relatively high pressure and low temperature within the matrix can help cause the $CO_2$ to be adsorbed and the $CH_4$ to be desorbed, such that natural gas can be recovered through recovery pipes 122. In addition to recovery pipes 122, which can be opened for gas recovery, injection pipes 120 can also be opened once the injection has stopped, to allow for increased gas recovery. Injection pipes 120 can also remain closed at the bottom while the $LCO_2$ is being introduced, such that when the pressure has built up, the $LCO_2$ can be released to drive the $LCO_2$ directly into the coal stratum.

FIG. 12 shows the present method using injection pipes 120 positioned within soil 128 and down into an underground coal or gas shale stratum 130 where there are layers of coal or gas shale present. When the $LCO_2$ is injected into pipes 120, and released through perforations 207 at 133 under pressure, the coal or shale will begin to break up and form fractures therein, i.e., it will become rubblized, wherein long narrow passages can be created within the formation to increase its permeability, as shown in FIGS. 17 to 19. The broken fragments 132 created by this process then become more susceptible to adsorption of $GCO_2$ and desorption of $CH_4$. At this point, the recovery pipes 122 are preferably closed at the top, as shown in FIG. 17, to allow the pressure inside the formation to build up. Once the injection is stopped, injection pipes 120 are also preferably closed at the top, as shown in FIG. 18, such that the pressure within the stratum can be maintained at a predetermined amount, while adsorption and desorption continue.

FIG. 13 shows a similar method and apparatus using injection pipes 120 positioned within soil 128 and down into an underground coal or gas shale stratum 130, but in this case, injection pipes 120 have a bent horizontal portion 134 which is directed laterally within the targeted formation. When the $LCO_2$ is injected into pipes 120 (with the recovery pipes 122 closed) and released through the perforations, the $LCO_2$ will be injected through the horizontal pipe 134, and into the stratum, thereby causing the coal or shale to break up in various directions, i.e., again, it will become rubblized to increase the permeability of the formation. The broken fragments 132 created by this process are made susceptible to adsorption of $CO_2$ and desorption of $CH_4$. Once the injection is stopped, injection pipes 120 are preferably closed, such that the pressure within the stratum can be maintained.

When the targeted rock formation is a relatively thin strata, horizontally orienting the bottom portion 134 of injection pipe 120 and extending it horizontally through the formation as shown in FIG. 13 can enhance its ability to reach and fracture the formation. The horizontal portion 134 in such case is preferably provided with perforations that extend in various directions to allow the $LCO_2$ to be released and injected into the targeted rock formation radially outward. The distance that the horizontal portion 134 extends into the formation can be based on the nature and size of the targeted strata. For example, horizontal portion 134 can be extended about half or more of the distance from the injection pipe 120 to the nearest recovery pipe 122. Thus, if the distance to the nearest recovery pipe is 1,000 feet, the horizontal portion can be extended about 500 feet or more.

It should be noted that the amount of $LCO_2$ injected into layer 130 is based on the adsorption capacity of the zone around each injection pipe 120, and the thickness, density and hardness of the coal or shale layer 130, etc. Thus, after an appropriate amount of $LCO_2$ has been injected into the injection pipe 120, the valve is preferably opened (the valves of the surrounding recovery pipes 122 were closed previously). By forcing the high pressure liquid $CO_2$ into a shale or coal bed stratum via a pre-chilled vertical pipe with an end extension of perforations, the high pressure (>4,660 psia) liquid $LCO_2$ can be injected through each of the circular perforations in the pipe and create fractures forming a long cavity of small diameter (pencil-like) openings or voids 123 in all radial directions extending from the perforated pipe. The high pressure liquid $CO_2$ is preferably forced through each perforated hole and penetrates the shale or coal bed stratum, wherein, when the pressure exceeds the fracture strength of the rock formation, fractures are created in the rock.

The factors used to determine the formation fracturing pressure are a function of well depth in units of psi/ft. For example, a fracture gradient of F=0.823 psi/ft. in a well with a true vertical depth of 1,000 feet would predict a total fracturing pressure of 823 psi. At 5,000 feet depth, on the other hand, it would predict a fracture pressure of 4,115 psi (based on 5,000×0.823 psi/ft.). When the $LCO_2$ is delivered to the stratum at pressures above the stratum's fracture strength, the pressure is able to fracture and break up the rock formation, wherein the pressurized $LCO_2$ can produce long pencil-like fractures and additional openings that radiate from the main fracture. The $LCO_2$ then fills not only the main fracture but also the radiating voids.

The goal of this process is to create narrow fractures and fissures in the rock formations, such as those shown in FIGS. 17 to 19, which increases the formation's permeability. This allows more of the coal and/or gas shale fragments to be exposed to $CO_2$, such that more adsorption can take place, throughout a greater area within the geographic site, which means that more $CO_2$ can be sequestered, and greater amounts of natural gas can be desorbed, released and recovered.

Figure 14:
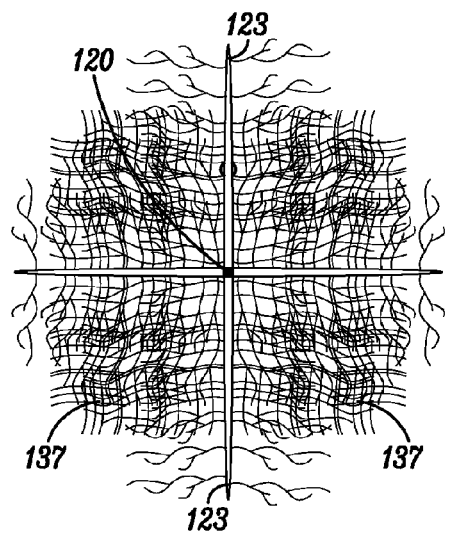
FIG. 14 shows in plan view a typical input/injection pipe within a coal or gas shale formation with four narrow directional voids created by the high pressure liquid $CO_2$ injected through four perforations in the pipe, and the web-like fractures they create.

FIG. 14 shows the web-like pattern of fractures in plan view that can be created by the present fracturing method. In particular, it shows a four-hole perforation configuration which can disperse the $LCO_2$ under pressure in four different directions to create a series of fracture voids 123, as well as a web-like pattern of fractures 137 extending in different directions. Even if the perforations are annularly located in four specific locations, and the $LCO_2$ is released as a jet stream through each of those perforations, i.e., corresponding to the voids 123, the pressure gradient created by releasing the $LCO_2$ under pressure can cause the surrounding areas to break up as well. The violent expansion of the $LCO_2$ to $GCO_2$ that occurs, as will be discussed, also helps to break up the formation in all directions. Thus, while FIG. 14 shows the four jet streams created by the pressurized $LCO_2$ injected into the formation, it also shows the long pencil-like horizontal openings 123 that are formed thereby, as well as the spreading of the surrounding cracks that are widened by the newly created field of stress. The length of the high stress field that is formed can extend to 2,500 feet or more in length.

FIG. 17 shows an initial phase wherein the recovery pipes 122 are closed at the top 154, whereas, the injection pipes 120 are open 156 to allow the $LCO_2$ to be injected into the rock formation 160. As can be seen, a fracture void 123 is preferably created in the direction of each perforation 162, wherein a web-like pattern of fractures 137 can be created that extends beyond each void 123. In particular, FIG. 17 shows how each perforation can disperse the $LCO_2$ under pressure in a horizontal direction to create a series of horizontally oriented fracture voids 123, while at the same time, the pressure gradient created by releasing the $LCO_2$ can cause the surrounding areas to break up and create a web-like pattern of fractures 137 extending in different directions.

FIG. 18 is similar to FIG. 17, but shows the next phase wherein both the injection pipes 120 and recovery pipes 122 are closed at the top 154, wherein, the pressure within the formation 160 can be maintained. Again, as can be seen, a fracture void 123 is preferably created in the direction of each perforation 162 as the pressure jet is released, but as the injection is stopped, and the pressure is maintained within the formation, the web-like pattern of fractures 137 can continue to be extended in different directions. This preferably continues for a predetermined amount of time, as the $LCO_2$ and $GCO_2$ is adsorbed, and the $CH_4$ is desorbed and released.

At some point, there can be a dramatic phase change within the formation 160, which can explosively cause the $LCO_2$ to transition into a gas, wherein its expansion can cause greater fracturing along the joints and fractures. This can further increase the size of the fractures 137 extending through the formation, thereby increasing its permeability.

FIG. 19 is similar to FIGS. 17 and 18, but shows the next phase wherein all the pipes 120 and 122 are opened to allow the $CH_4$ gas to be recovered at the surface. Preferably, the pressure is released slowly, or gradually, such that the pressure within the formation can be maintained for a predetermined period of time. That way, not only may the fracture voids 123 continue to form additional web-like patterns of fractures 137 within the formation, but more importantly, the $GCO_2$ will continue to be adsorbed, and the $CH_4$ will continue to be desorbed, such that a greater amount of $CO_2$ can be stored, and a greater amount of natural gas can be released and recovered.

FIG. 19 represents the time period after two weeks where it may be safe to recover the natural gas that has buoyed itself up toward the surface. In this respect, it is desired to open the natural gas relief valves slowly, i.e., to a small orifice area, to ensure that the pressure within the formation is still maintained in the production layers after the injection has stopped, and so that fracturing can continue and more $GCO_2$ can be adsorbed, and $CH_4$ can be desorbed.

It is also expected that the relief of gas pressure will cause the fractured openings and voids to close in, which in turn, will trap some of the $LCO_2$ or $GCO_2$ that has yet to be adsorbed, and the natural gas that has been desorbed but has yet to migrate to the recovery pipes. The timing of the valve opening thus preferably coincides with the recovery of the natural gas so that most of the $CO_2$ will have been adsorbed and most of the natural gas will have been recovered by the time the valves are opened and pressure is released.

As shown in FIGS. 17, 18 and 19, even though the rings of perforations are spaced vertically apart, and the $LCO_2$ is released only at the levels where the horizontal voids 123 are shown, by releasing the $LCO_2$ under sufficient pressure, the surrounding areas of rock, both above and below the perforations, are fractured and broken up, i.e., within a certain perimeter extending above and below each ring. Thus, a greater geographical area can be reached and fractured by using a single injection pipe 120, wherein the fractures can reach as far as 1,000 feet or more, but also extended above and below each void 123 by several feet, such that more $CO_2$ can be stored, and more natural gas can be released and recovered from the site.

Note that the fracture zone may only contain fractures that are about ½ inch in height, width or diameter, but nevertheless, the overall zone may extend horizontally to 2,500 feet or more in length parallel to the bottom and top surfaces of the layer and several feet above and below the void 123. The pressurized liquid not only forms a long cavity of small diameter (0.5 inch to 1 inch), but also causes fracturing to radiate all around the circumference from the horizontal cavity.

At these high pressures (>4,000 psi) and low temperatures the liquid $CO_2$ exchanges place through adsorption with the natural gas ($CH_4$) at each exposed site of the gas shale or coal particle surface. The high pressure cryogenic pump 68 at the surface continues to apply pressure to continue the fracturing process while the injection pipe 120 is open. When the cryogenic pump 68 is stopped and all valves are closed shut, fracturing will continue and the pressure in the liquids starts to decrease because of the continuous opening of additional fracture volumes. At these pressures and temperatures, however, the closed valves facilitate desorption of the natural gas ($CH_4$) and simultaneous adsorption of the $CO_2$ which continues for an extended period of time.

Preferred Pressure Cycling Method:

The preferred method involves using the above described processes to repeatedly inject the cold liquid $CO_2$ into the coal or shale matrix, but by increasing and decreasing the pressure of the liquid $CO_2$ injected into the formation, and therefore, the pressure within the matrix, as well as maintaining a substantially low temperature within the matrix, by regulating the temperature of the injection pipe and $LCO_2$ injection, which can enhance the ability of the $CO_2$ to be adsorbed and for $CH_4$ to be desorbed and released. The method preferably involves initially releasing the $LCO_2$ into the stratum under high pressure, such as preferably above the fracture gradient of the matrix, which helps break up the matrix to form fractures therein, and then, after a predetermined period of time, closing the injection pipe, which allows the pressure within the matrix to drop, which advantageously allows additional cleats to form within the stratum, and more $CO_2$ to be adsorbed and $CH_4$ to be desorbed. Meanwhile, the $LCO_2$ is allowed to warm up once it enters into the matrix, due to the higher temperatures that exist within the stratum at that level, such that it changes phase explosively from a liquid to a gas, wherein the force of expansion helps to further break up the matrix. Then, after the passage of sufficient time, which allows the pressure to drop back down, more $CO_2$ can be adsorbed and more $CH_4$ can be released, as these steps are repeated.

The orientation of the pipes preferably involves using an injection well bore located in the middle of a number of recovery well bores, such as at corners of a square, although any configuration that achieves the desired results is possible. This 5-Point field entity can then be repeated in all directions until the available acreage above the formation is filled. A 9-Point field entity as shown in FIG. 15 or other configuration can also be used.

Figure 26:
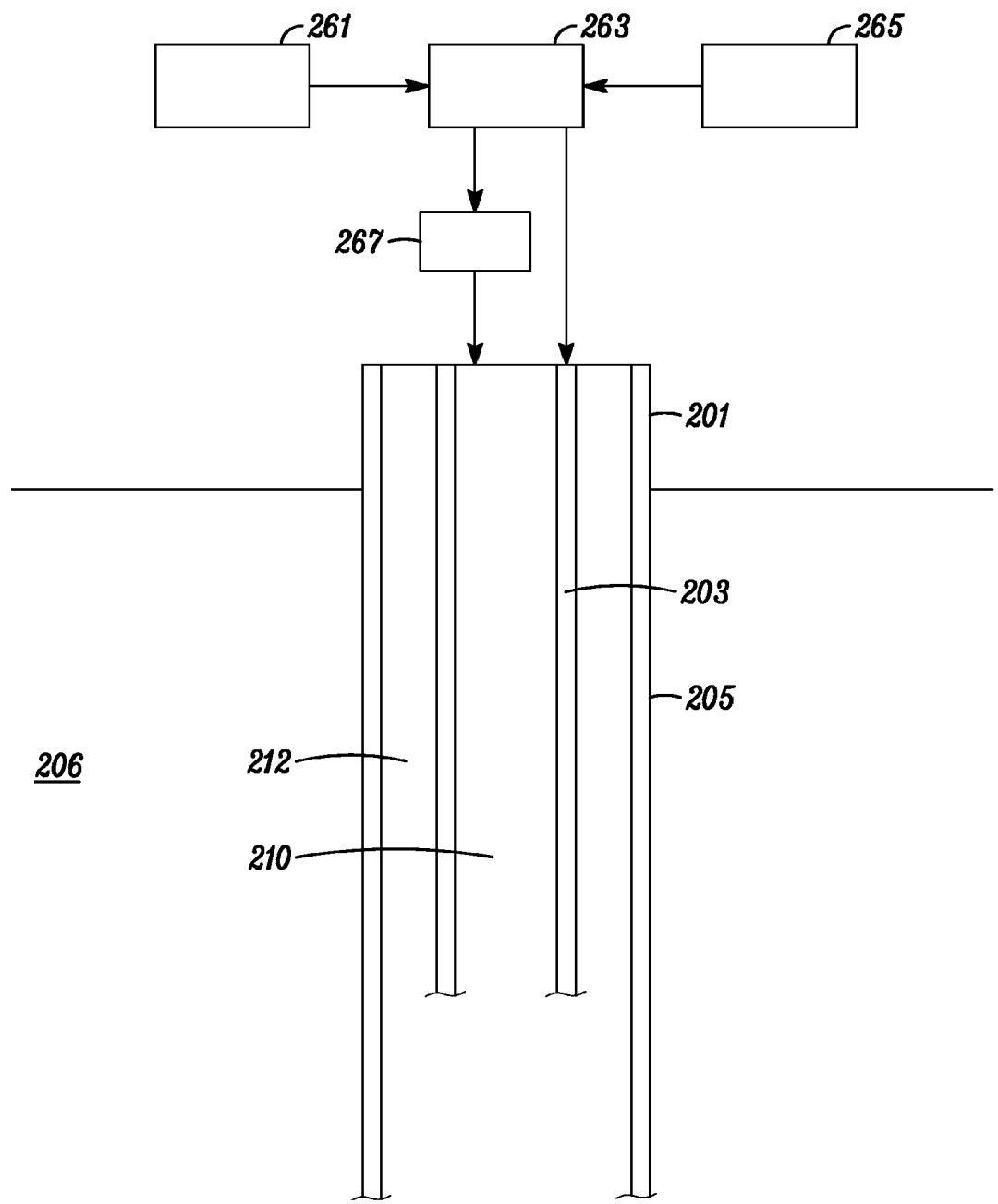
FIG. 26 shows the alternate injection pipe embodiment of FIG. 25 with tanks and devices for delivering the liquid nitrogen and $LCO_2$ into the injection pipe.

In this case, each well bore can be configured as shown in FIG. 24, with multiple layers, or as shown in FIGS. 25 to 27, wherein each injection pipe 201 consists of inner pipe 203 surrounded by outer pipe 205 with perforations 207 located at the bottom extended into the matrix, as shown in FIG. 25, and wherein each recovery pipe 221 consists of inner pipe 223 surrounded by outer pipe 225 with perforations 207 located at the bottom, as shown in FIG. 27. One or more valves, 209, 211, 231, 233, are preferably located at the bottom of each injection and recovery pipe which can be opened and closed during the pressurization and injection cycles, as will be discussed.

The well bores preferably have three operational modes. In the first mode they can be used to dewater the underground formation in its nearby contact area while the valves at the bottom of the well bores are opened, which is often necessary due to the existence of a significant amount of water below the water table. This can be accomplished, for example, by using one pump 243 located at the top of the well bore, and another pump 245 located at the bottom, as shown in FIG. 27, wherein a long rod 241 can be extended into the inner pipe 223, such that the pumps can be operated and used to force water up through the well bore.

It can be seen that water can be pumped up through inner pipe 223, using pumps 243, 245, with valve 231 open and valve 233 closed, wherein water can be extracted from the top 247 of well bore 221. Or, by reversing the flow of water using pumps 243, 245 down through inner pipe 223, and opening both valves 231, 233, a mixture of water and methane can be pumped up through space 232 between inner pipe 223 and outer pipe 225, wherein the mixture can then be extracted from the top 249 of well bore 221. The water/methane mixture at the top can then be introduced into a separator 251 which enables the methane to rise above the water and be recovered and distributed using a compressor 253, wherein the water at the bottom of separator 251 can also be removed.

The initial step of dewatering is helpful when the targeted rock formations are saturated or otherwise filled with water, such as from nearby water aquifers, which will otherwise interfere with the pressure cycling methods of the present invention. To remove water from the underground formation, a pump at the top and/or bottom of each well bore (both injection and recovery pipes) can be used to draw water out. After the well bores have been pumped clear of water (such as over several months), methane may appear at the top of the well bores, such as via the annulus between the inner and outer pipes, wherein the pumping out of water strongly reduces the local pressure within the matrix near the well bores, but only weakly reduces the pressure in the matrix further away from the well bores. This reduction in pressure creates a pressure gradient which causes the methane to desorb and migrate toward the well bores, wherein water and methane that appear at the top of the holes can be processed and the methane collected or burned off. When the dewatering is completed, the water pumps are preferably turned off. The same process can be used for both recovery and injection well bores.

Second, when the injection well bores have been dewatered, the next step preferably involves using liquid nitrogen and/or super cold gaseous nitrogen to pre-chill the injection pipes. It is normally desirable to inject a predetermined amount of liquid nitrogen into the injection pipes first, which helps to pre-chill the pipes, so that when the $LCO_2$ is injected, the pipe will be cold enough to avoid disadvantageously causing the $LCO_2$ to warm up and change phase to a gas prematurely. For example, injection pipes 120, 201 can be chilled with liquid nitrogen (such as at minus 321° F.) until the pipe attains a steady-state temperature of about minus 60° F. or less, i.e., via inner pipe 203, while the valve 209 at the bottom can remains closed. During this time, a change of phase may occur, turning the liquid nitrogen into cold gaseous nitrogen, until the desired temperature is obtained. Note space 212 in the annulus around inner pipe 203 along the length of inner pipe 203 and outer pipe 205 can serve to interrupt the radially inward heat transfer flow.

Because it is important for the temperature inside the pipe to remain substantially low, and because there will be heat transferred from the surrounding soil and rock to the $LCO_2$, a thermocouple (not shown) is preferably attached to the pipe at a predetermined depth to show when the injection pipe reaches a certain temperature and therefore is ready to accept the pressurized $LCO_2$ without flashing to $GCO_2$. It can be seen that the liquid nitrogen may continuously flash off to nitrogen vapor and vent upwards from the pipe to the surface during this process. Thus, it will be helpful to use the thermocouple to determine when the appropriate temperature has been reached and when the inflow of liquid nitrogen is completed.

Third, while the pipes are being pre-chilled in the manner described above, the cryogenic pump is preferably turned off, and the vent at the top of the injection pipe is preferably opened, while the bottom valve is preferably closed. This produces zero pressure within the injection pipe to start with. The steps involved over a period of time are designated as events T1 through T10 as shown in FIGS. 33 to 44 in connection with injection pipe 301, pump 303, top vent 305 and bottom valve 307. Although these figures refer to injection pipe 301, it should be noted that the same process can be used in connection with the other pipes, such as 120 and 201.

According to event T1, as shown in FIG. 33, which is prior to the operation of the process, pump 303 is turned off, top vent 305 is open and bottom valve 307 is closed. Then, after injection pipe 301 is chilled in the manner described above, pump 303 is preferably turned on, but set to low power, as shown in FIG. 34, and liquid $CO_2$ is preferably introduced gradually into injection pipe 301 while initially keeping bottom valve 307 closed.

The cold liquid $CO_2$ can also be delivered using the apparatus shown in FIG. 26. FIG. 26 shows a storage tank 261 for storing cold liquid $CO_2$ under pressure, such as at about 350 psig with a temperature of about minus 20° F. These amounts are for exemplary purposes only and by no means intended to be limiting. At the same time, a nearby storage tank 265 for storing liquid nitrogen can be provided, such as liquid nitrogen at 30 psig with a temperature of minus 320° F. A heat exchanger 263 can then be provided that communicates with both tanks 261, 265, wherein the liquid nitrogen can be used via heat exchanger 263 to reduce the temperature of the $LCO_2$ further. When the system is ready for the $LCO_2$ to be injected into the well bore, the $LCO_2$ can be reduced to a temperature of minus 60° F. using heat exchanger 263, and then, the $LCO_2$ can be introduced into injection pipe 201.

Figures 35, 36:
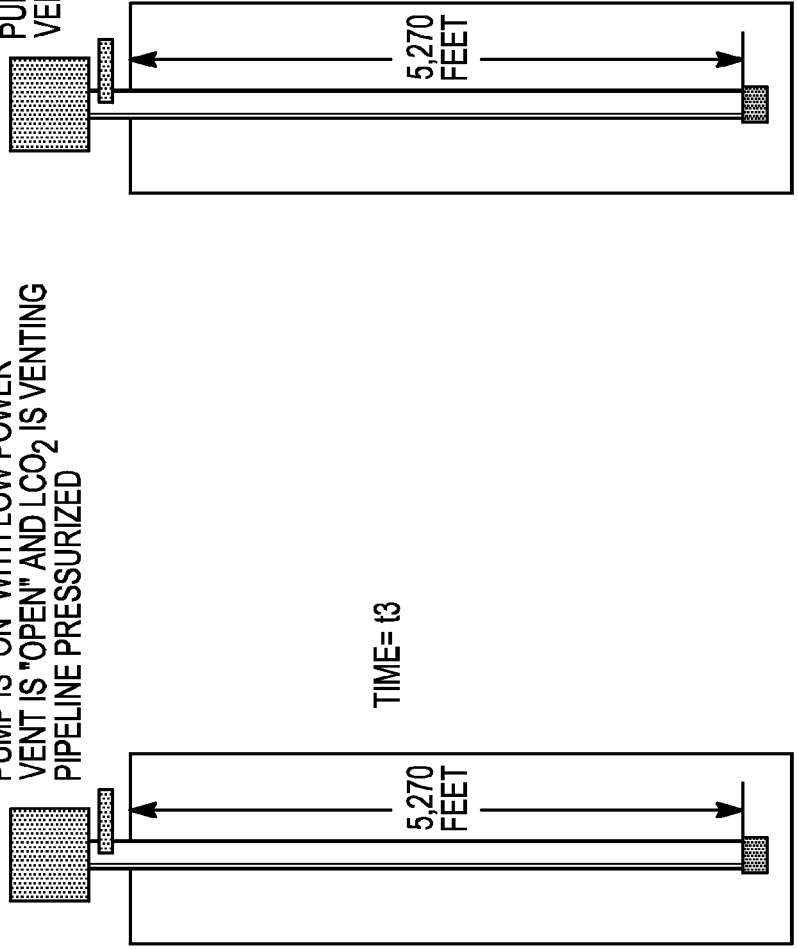
FIG. 35 is a schematic side elevation view showing an embodiment of an injection pipe extending down to a depth of 5,270 feet, with a pump and vent at the top, and a valve at the bottom, with the pump on, the vent open and the valve closed, showing 2,598 psig inside the pipe at the bottom, which is the pressure head of the liquid $CO_2$ column inside the pipe, which represents the status of the system at time T3.
FIG. 36 is a schematic side elevation view showing an embodiment of an injection pipe extending down to a depth of 5,270 feet, with a pump and vent at the top, and a valve at the bottom, with the pump on, the top vent closed and the bottom valve closed, showing 5,200 psig inside the pipe at the bottom, which is exerted by a combination of the pump pressure (of about 2,600 psig) and the pressure head of the liquid $CO_2$ column inside the pipe (of about 2,600 psig), which represents the status of the system at time T4.

Initially, each injection pipe 301 is preferably gravity-filled with $LCO_2$ without using pump 303, or with pump 303 set to low pressure, as shown in FIG. 35. At this point, the bottom valve 307 is preferably closed, but vent 305 at the top is open. This is because as the pipe 301 is being filled with $LCO_2$, gas bubbles will start coming up to the surface, indicating that liquid $CO_2$ is still changing phase, which indicates the pipe is still not cold enough. Then, when the $GCO_2$ bubbles stop coming to the surface, indicating that pipe 301 has reached a steady state temperature, and is ready for the introduction of pressurized $LCO_2$, pump 303 is preferably turned on to full power to begin pressurizing pipe 301 with $LCO_2$, as shown in FIG. 36. At this point, top vent 305 and bottom valve 307 are both preferably closed, to ensure that pressure inside pipe 301 can be increased.

Cryogenic pump 267 can be used to further increase the pressure of the $LCO_2$ as necessary. The operative pressure that can be released from the bottom of pipe 301 preferably takes into account the hydrostatic head pressure created inside the well bore due to the weight of the $LCO_2$ column inside injection pipe 301. For example, with a sufficient amount of $LCO_2$ inside injection pipe 301, such as to 5,000 feet below the surface, the weight of the $LCO_2$ column inside can create additional hydrostatic pressure, thus making it unnecessary to introduce the $LCO_2$ at the full rated 5,000 psig pressure. Instead, the $LCO_2$ can be introduced at a lower rate, such as 2,500 psig, by taking into account the additional hydrostatic pressure exerted at the bottom of the pipe by the weight of the $LCO_2$ column inside the pipe. For example, when the depth of the matrix is 5,000 feet, the $LCO_2$ within the pipe can create a total head pressure of about 2,500 psig, which means that to achieve a total pressure of 5,000 psig at the bottom of the pipe, the pump will only have to provide a pressure of 2,500 psig, since, the additional pressure will be provided by the head pressure of the $LCO_2$ in the pipe. For this reason, it is possible to use, for example, a 2,600 psig rated cryogenic pump even if the desired pressure within the pipe is 5,000 psig, since the weight of the liquid $CO_2$ column inside the pipe can help increase the pressure, i.e., the liquid $CO_2$ column can increase the pressure from 2,600 psig to 5,000 psig or more.

Then, at the appropriate time, with the injection pipe filled with $LCO_2$, which can raise the pressure at the bottom of the pipe to 5,000 psig, the bottom valve 307 is preferably opened and the pressurized liquid $CO_2$ is preferably allowed to flow through the perforations and into the rock formation. The injected liquid $CO_2$ pressure is preferably far above the fracture strength of the matrix so that the pressure can break up the rock formation and create cavities and openings and fill them with pressurized liquid $CO_2$ (at 5,000 psig) within the matrix. The high stresses that exist preferably create rubblized rock around the cavity, and fractures surrounding the solid matrix bed. Another consideration is making sure the pressure is sufficient despite the friction created by the walls of the pipe as the $LCO_2$ travels through the pipe when the $LCO_2$ is being released. And because the fracture gradient of the matrix is dependent on the depth of the matrix, it will be important to ensure that the pressure is sufficient to crush and break up the rock formation and create fractures in the matrix at that depth.

Preferably, at this point, the top vent is closed, to ensure that the pressurized $LCO_2$ is released at the bottom, rather than at the top, while the pump remains on. In this respect, it should be noted that when bottom valve 307 is opened with a certain pressure inside the injection pipe 301, the pressurized $LCO_2$ will be released through the perforations at a high velocity, such as 400 to 500 ft./sec. or more, which is based on the total pressure that exists inside the pipe 301, and the size and number of the small perforations through which the $LCO_2$ under pressure is allowed to pass, wherein the speed of flow is determined by the conservation of mass between them. As such, preferably, the pressure will drive a jet stream of $LCO_2$ into the matrix with a pressure greater than the fracture strength of the rock formation, wherein the length of penetration of the $LCO_2$ is determined by the pressure formed at the distal end of the proliferation, until it is no longer able to perforate the matrix.

The pressure is preferably maintained in the liquid $CO_2$ for a duration that is designed to create fractures and the craters extended radially outward toward the recovery well bores but not completely reach the recovery well bores. Eventually, once it is determined that the fracturing of the impact zone has been completed, the bottom valve is preferably closed, until no more liquid $CO_2$ is injected into the cavity and the pressure in the matrix eventually decays. It is important that the valve be closed slowly so that the damaging effects of a water hammer can be avoided. At that point, along with closing the bottom valve, the pump is preferably turned off, and the top vent is preferably opened, and the pressure inside the pipe is released.

During this time, the liquid $CO_2$ that has been introduced into the matrix will continue to proliferate into the cavity and form fractures, thereby helping to further break up the matrix, which also contributes to a decline in pressure, as the volume of space within the matrix expands. This also encourages the adsorption of $CO_2$ into the formation and desorption of $CH_4$, i.e., the $CO_2$ filling up the space will begin to adsorb into the formation and $CH_4$ will be desorbed. Eventually, with the bottom valve 307 closed, the relatively high temperature of the rock formation will eventually cause the extremely cold temperature of the liquid $CO_2$ to increase to the point where the $LCO_2$ will change phase explosively to $GCO_2$, which can occur when the pressure within the matrix drops down, such as to 400 psig. This causes the liquid $CO_2$ to flash and expand, to form $GCO_2$ which further helps to break up the matrix, and further expand the cavity and crush zones. With the bottom valve closed, the extra pressure created by this phase change can be up to 20,000 psig or more, which significantly enhances the break up and rubblization of the matrix, and then eventually, as the fractures and cracks continue to expand and grow, the pressure within the matrix will drop back down again over time.

Figure 31:
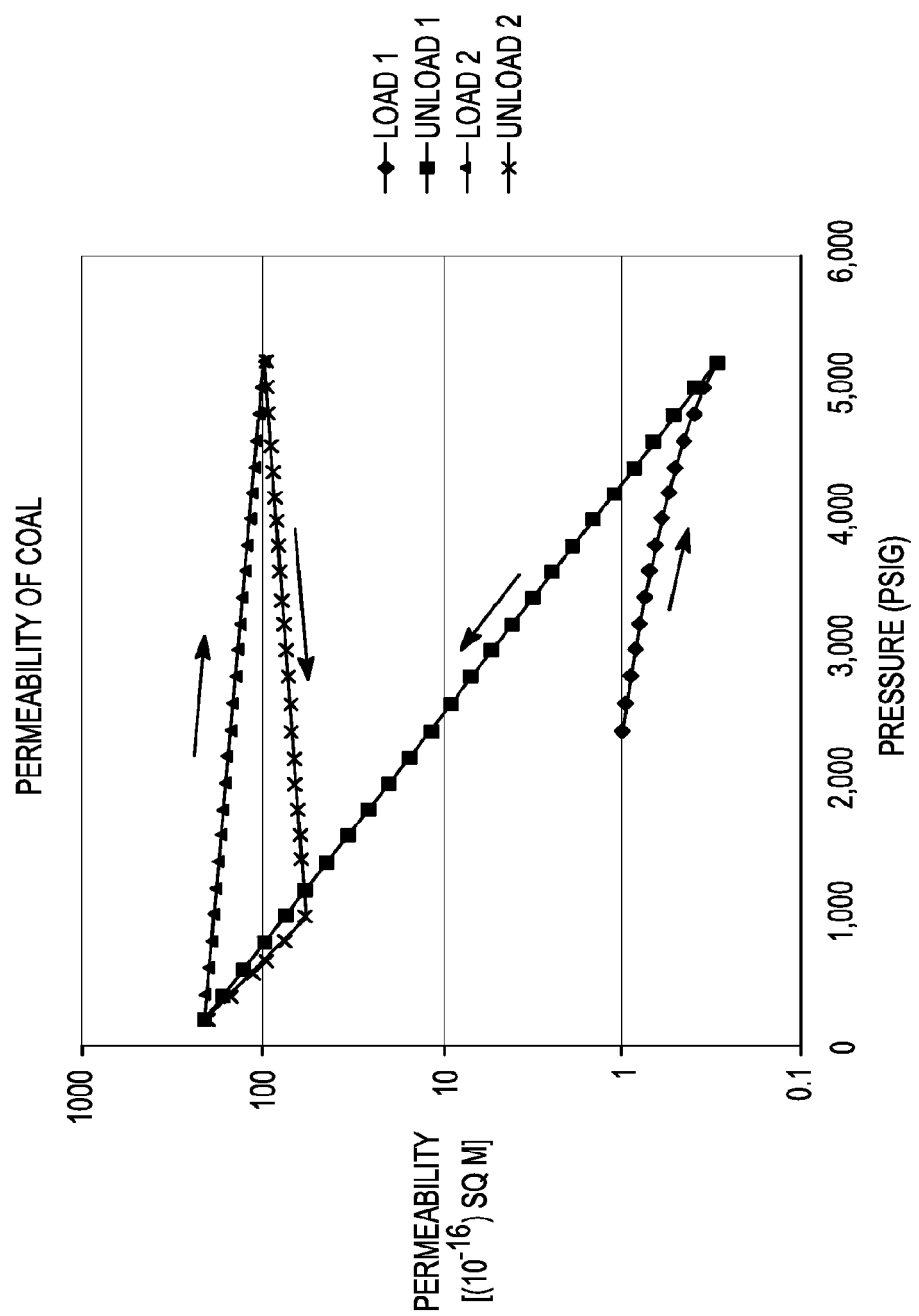
FIG. 31 is a chart showing the increased permeability of coal resulting from using the pressure cycling methods and processes described herein.

This increase in cleats within the matrix increases the matrix's permeability and causes the same mass of gas to fill a larger volume. This induces reduced pressure. The lower pressures will facilitate the adsorption of $CO_2$ and desorption of $CH_4$ in the substrate. While high pressure damages and fractures the matrix to allow the cleats to open up and expand, the reduction in pressure permits enhanced adsorption of $CO_2$ and desorption of $CH_4$. The increased permeability also causes the diffusion process to be accelerated. This is shown in FIG. 31, where the bottom row shows the extent of permeability achieved through one cycle under high pressure, and the second row shows how reducing the pressure actually enhances permeability. Then, the third row shows the effect of repeating the cycle under high pressure again. This indicates that a minimum of two cycles will be advantageous, and while additional cycles are contemplated, the chart indicates that performing more than two cycles may not always produce results commensurate with the number of attempts made. At the same time, the rubblization effect of repeated exposure of the matrix to high pressure jet streams will enhance the fracturing of the matrix, which makes the coal or shale surfaces more accessible.

At this point, it is worth noting that the methane in the matrix, and in particular, near the injection well bore will continue to be released and pushed out toward the recovery well bores, and then, over time, a cloud of gaseous $CO_2$ will begin to form around the injection area, wherein, the outer surface of the $CO_2$ cloud, which includes a mixture of $CO_2$ and methane, will move further toward the recovery well bores, wherein at the outside of the cloud there will remain a significant amount of methane that has not been swept up. In this respect, it can be seen that it will be helpful to monitor the pressure of the $CO_2$ cloud near the injection well bore, such as from 20,000 psig down to 5,000 psig, and then down to about 500 psig, and then, ultimately down to 200 psig, so that a sufficient amount of pressure can maintain a pressure gradient that will cause the released methane to continue to migrate toward the lower pressure areas near the recovery well bores. And, by allowing the pressure to drop down to 200 psig or less, this will help to enhance the ability of the $CO_2$ to be adsorbed into the formation and $CH_4$ to be desorbed and released.

To repeat the cycle, the pump can be turned back on and pressure within the injection pipe 301 can be increased again. Then, when sufficient pressure has built up inside the injection pipe 301, and at the appropriate time, such as when the pressure within the matrix near the injection pipe has dropped to below 200 psig, the bottom valve 307 can be opened again and pressurized $LCO_2$ can be released back into the matrix, wherein the matrix can be exposed to the high pressure liquid $CO_2$, thereby enabling continued compression crushing and fracturing to overcome the induced hoop stresses within the matrix. Because the second time around, there will already be cavities and openings formed within the matrix from the first pressurized flow of $LCO_2$, the high pressure $LCO_2$ will cause a longer and more sustained jet stream to be extended into the formation, which can reach the distal end of the cavity, thereby extending the crush zone further away from the injection well bores and toward the recovery well bores. Then, at the appropriate time, the bottom valve 307 can be closed again, wherein the pressure in the matrix can be allowed to drop and the temperature of the $LCO_2$ can be allowed to warm, and then, the liquid $CO_2$ will be allowed to flash explosively into gaseous $CO_2$ again and further penetrate into the more distal portions of the coal matrix. Then, as the $LCO_2$ changes phase to a gaseous $CO_2$, the further-away areas of the matrix will expand further, causing more $CO_2$ to proliferate into the formation, and extending the reach of the adsorption. Accordingly, the $CO_2$ will also spread throughout the crush zone and into the distal ends of the cavity, wherein the $CO_2$ will expand along the perforation length and also radially outward. This additional injection extends the fracture zone ahead of the $CO_2$ cloud and mixture of $CO_2$ and $CH_4$, and will continue to break up additional areas toward the recovery pipes.

This cycle can be repeated multiple times, such as over the course of a multiple year period, to further break up the coal formation and further enhance the ability of the coal or shale to release methane gas. This way, more of the matrix can be exposed to the $CO_2$ due to higher permeability, which in turn, enables greater adsorption of $CO_2$ and desorption of methane.

This induced pressure cycling preferably forms cleats and momentarily compresses the cleat spaces, but then relieves the cleats when the pressure is reduced, thereby allowing them to expand. This pressure cycling has the advantage of using relatively high pressure to fracture the matrix to create new cleats and the advantage of using low pressure to allow the cleats to expand and enhance adsorption of $CO_2$ and desorption of $CH_4$.

Figure 28:
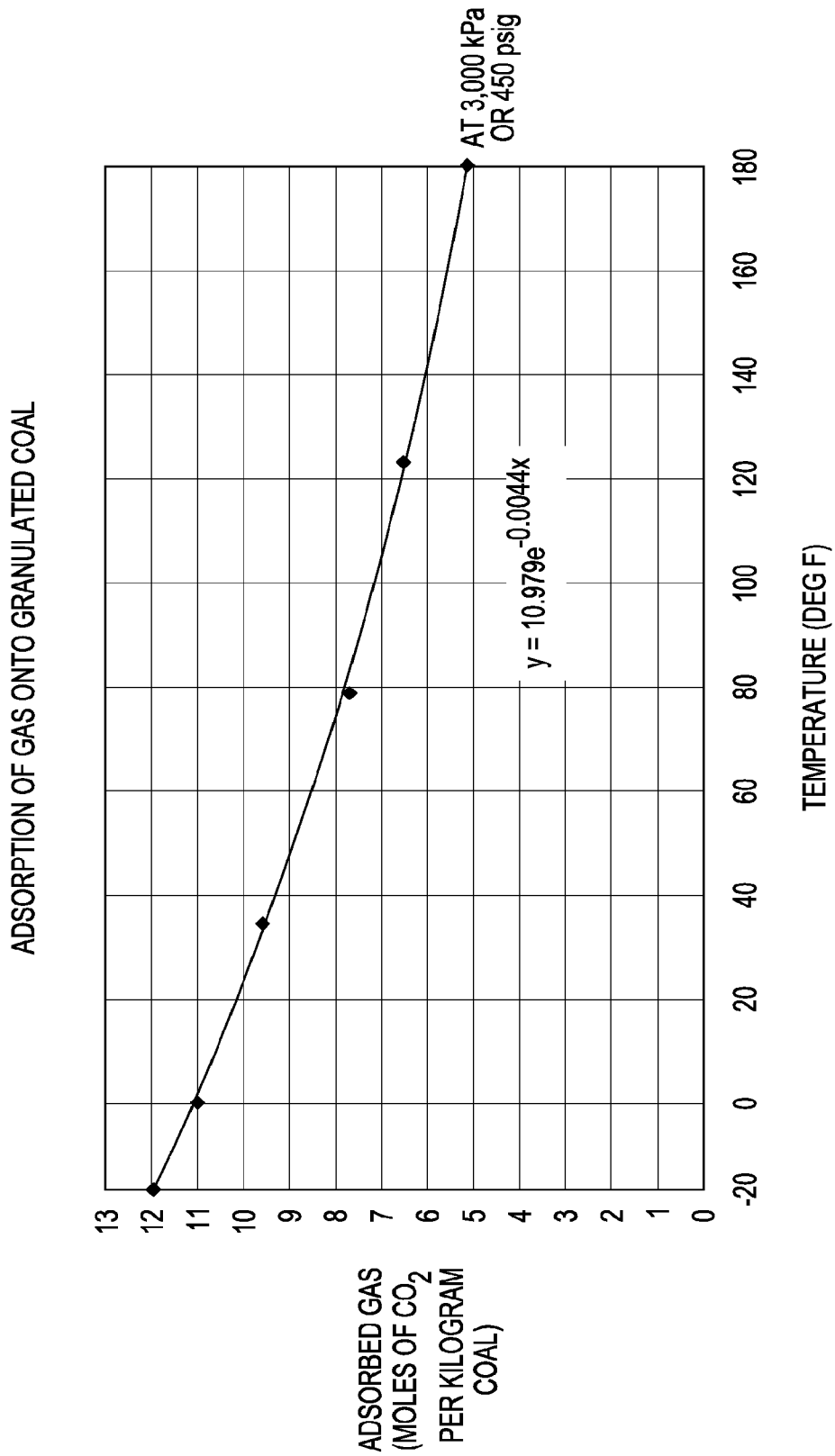
FIG. 28 is a chart showing the greater efficiency that results in adsorption of $CO_2$ onto granulated coal and desorption of $CH_4$ resulting from exposing the coal matrix to lower temperatures of $CO_2$.

The cold temperature of the $CO_2$ (preferably kept to below +10° F.) also enhances the rate at which the $CO_2$ is adsorbed onto the exposed surfaces that simultaneously displaces the $CH_4$ into the volume within the cleats and pores. In this respect, FIG. 28 shows that the degree to which molecular adsorption and desorption is exchanged within the coal matrix is more efficient at lower temperatures, wherein adsorption/desorption becomes accelerated thereby. Note that a $CO_2$ molecule will adsorb onto a coal surface more than twice as effectively when the temperature is minus 20° than when the temperature is at plus 180° F. And given the lithostatic temperatures that exist underground at various depths, it can be seen that a matrix located at a depth of 7,000 feet underground will normally be at a temperature of about 180° F., i.e., the ground temperature normally ranges from an average temperature of about 70° F. at ground level to about 100° F. at a depth of 2,000 feet to about 150° F. at a depth of 5,000 feet. Thus, depending on the depth of the matrix, and the existing temperatures found underground, the system will have to be adapted to ensure that the $LCO_2$ injected into the stratum will be released at the appropriate temperature, i.e., preferably below plus 10° F.

Figure 29:
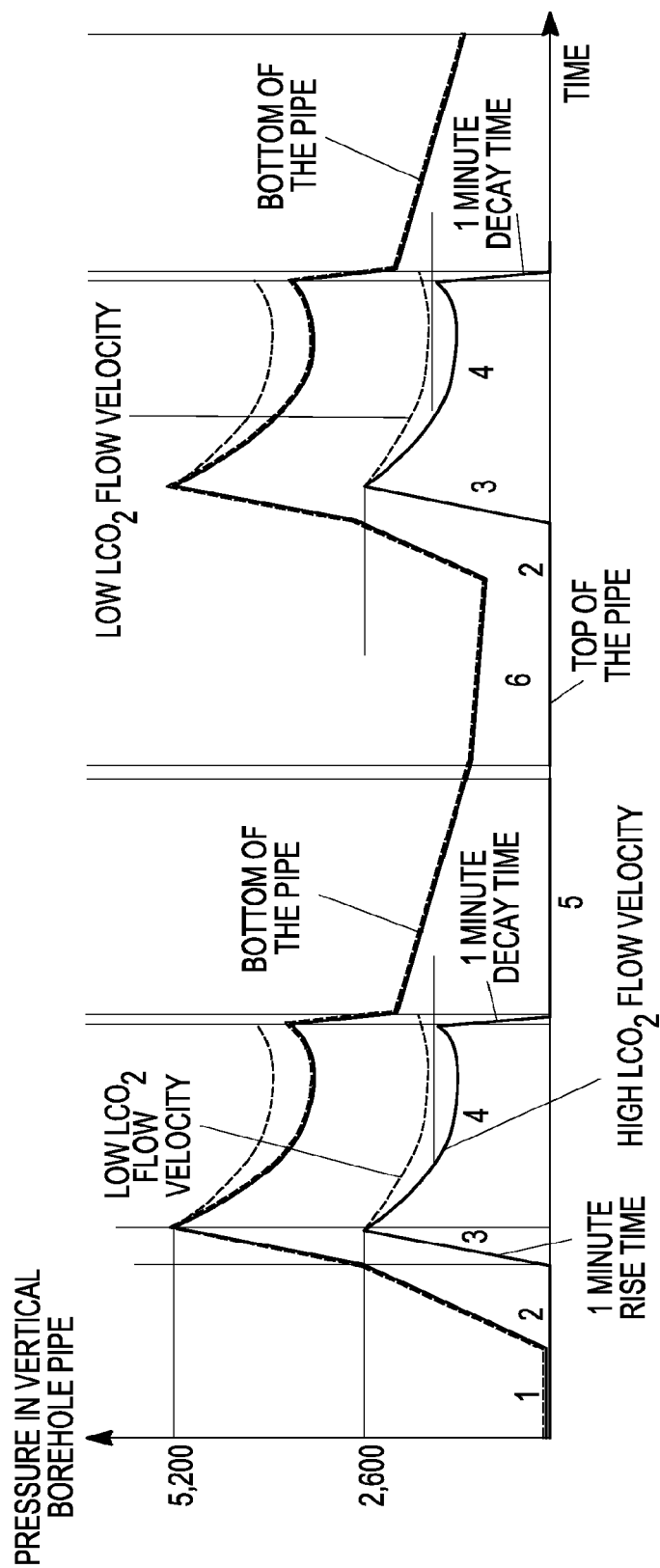
FIG. 29 is a chart showing the amount of pressure that exists inside the injection pipe over time, at the top and at the bottom of the pipe, during the pressure cycling steps, including when the pump is turned on, when the top vents are opened and closed, and when the bottom valves are opened and closed.
Figure 30:
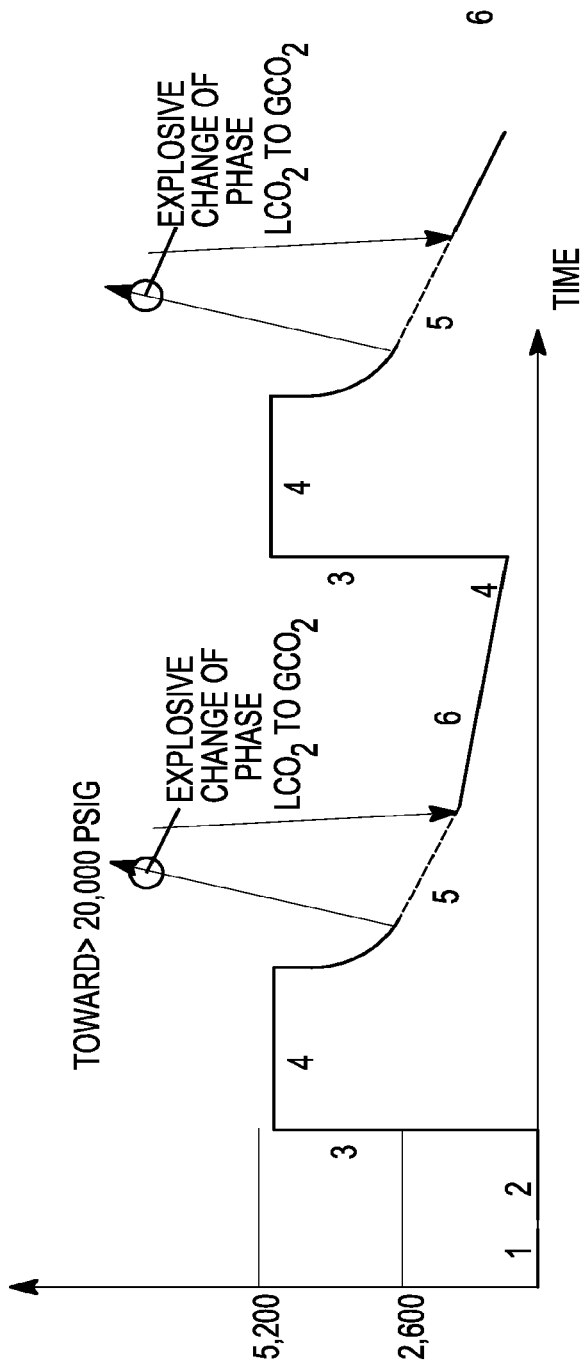
FIG. 30 is a chart showing the amount of pressure that exists inside the coal or shale gas matrix just outside the injection pipe over time during the pressure cycling steps, including when the bottom valves are opened and closed, and when the liquid $CO_2$ changes phase into a gaseous $CO_2$.

FIGS. 29 and 30 show how the pressure in the injection pipe and in the matrix shift up and down as the pressure of the $LCO_2$ is increased and decreased, which coincides with the opening and closing of the bottom valve, and the various cycling steps that are taken. For example, FIG. 29 shows the pressure within the injection pipe of the well bore (pressure over time at the top is shown by the dark black line on the bottom and pressure over time at the bottom is shown by the dashed gray line on the top). According to that chart, the pressure of the $LCO_2$ in the pipe begins at zero in phase 1, which corresponds to step T1 in FIG. 33, in which pump 303 is off, top vent 305 is open and bottom valve 307 is closed. Phase 2 as shown in FIGS. 29 and 30 is the chill-down period that corresponds to steps T2 through T3 of FIGS. 34 and 35, wherein the pump is on, the top vent is open and the bottom valve is closed. During this phase, the pump begins operating under low power, which allows the $LCO_2$ to gradually begin filling up the well bore, wherein, as shown in FIG. 29, the pressure at the bottom of the injection pipe begins to increase as the pipe is filled with $LCO_2$, due to the increase in head pressure created by the $LCO_2$ filling the pipe. At this point, while the pressure at the bottom of the pipe reaches 2,600 psig, the top vent is still open, so the pressure at the top of the pipe (shown by the gray dashed line) remains zero. Also, because the bottom valve is closed, the pressure exerted into the matrix, as shown in FIG. 30, also remains zero.

The next phase, phase 3, corresponds to T4 in FIG. 36, in which the top vent and bottom valve are closed, but now, the pump is operating at full power and the pressure inside the pipe begins to increase substantially, at the top and bottom of the pipe. This can be seen by the steep line on the curves shown in FIG. 29 which indicates that the pressure at the top of the pipe increases from zero to about 2,600 psig, and the pressure at the bottom of the pipe increases from about 2,600 to about 5,200 psig. Again, the reason there is more pressure at the bottom is due to the head pressure created by the weight of the $LCO_2$ column filling up the well bore. Because the bottom valve is closed, there is no pressure within the matrix, as shown in FIG. 30, during phase 3.

Figure 37:
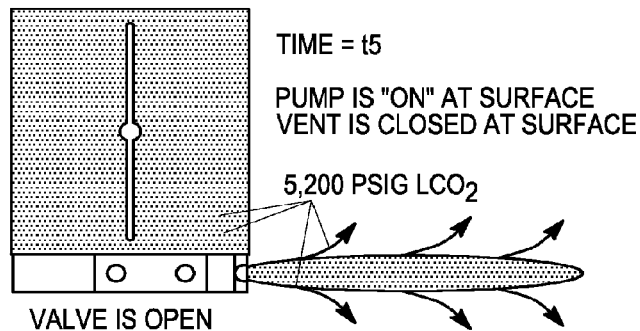
FIG. 37 is a schematic elevation view showing the bottom of an injection pipe extending down into a coal or shale matrix, with the pump on, the top vent closed and the bottom valve opened, showing liquid $CO_2$ being injected through the perforations, wherein a jet stream of liquid $CO_2$ is injected into the matrix, which represents the status of the system at time T5.

The next phase, phase 4, corresponds to T5 in FIG. 37, which shows the bottom valve is now open, and the top vent is now closed, but with the pump still on. The pump continues to operate at full power and continues applying pressure inside the pipe, but now, with the bottom valve open, the $LCO_2$ is released under high pressure into the matrix. Note that in FIG. 29 the curves showing the pressure inside the pipe gradually declines and as the $LCO_2$ pressure fills up the matrix spaces near the end of phase 4, there is a slight increase in back pressure, just before the pump is turned off. This occurs at both the top and bottom of the pipe. At the same time, the pressure of the $LCO_2$ exerted into the matrix from the pipe is preferably held constant at about 5,200 psig, by the continued application of pressure from the pump, as shown in FIG. 30.

Figure 38:
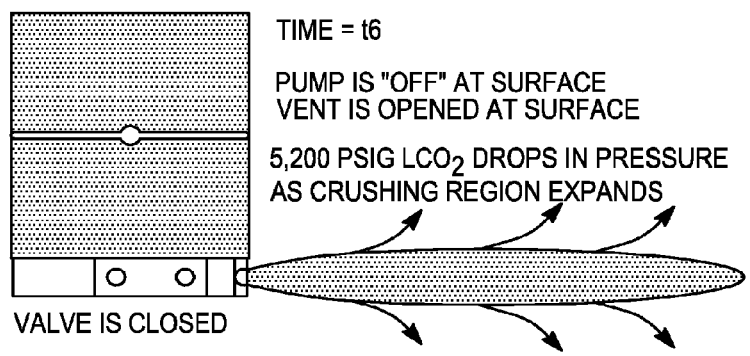
FIG. 38 is a schematic elevation view showing the bottom of an injection pipe extending down into a coal or shale matrix, with the pump off, the top vent opened and the bottom valve closed, showing the dissemination and proliferation of liquid $CO_2$ that continues into the matrix even after the bottom valve is closed, wherein the liquid $CO_2$ continues to flow through the matrix, but wherein the pressure within the matrix begins to drop as the crushing region expands, which represents the status of the system at time T6.
Figure 39:
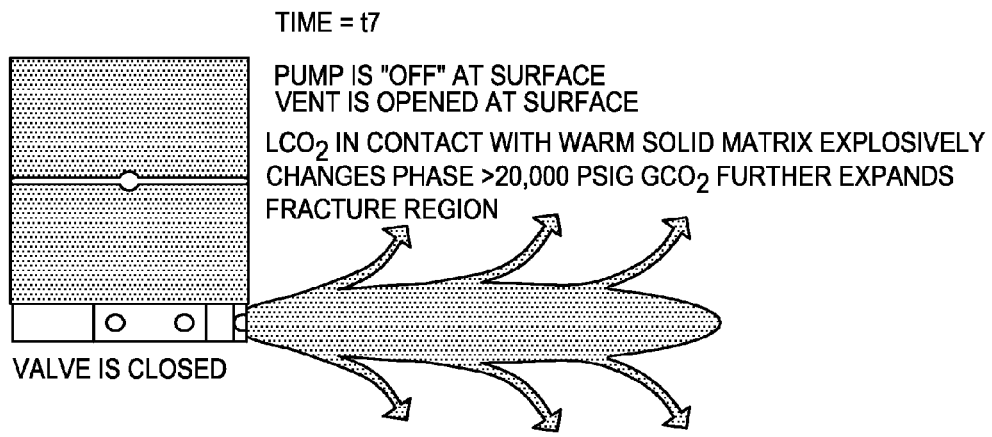
FIG. 39 is a schematic elevation view showing the bottom of an injection pipe extending down into a coal or shale matrix, with the pump off, the top vent open and the bottom valve closed, showing the liquid $CO_2$ being warmed and changing phase explosively into a gaseous $CO_2$, creating pressure within the matrix of up to 20,000 psig, wherein the gaseous $CO_2$ further penetrates and expands into the fracture region, which represents the status of the system at time T7.
Figure 40:
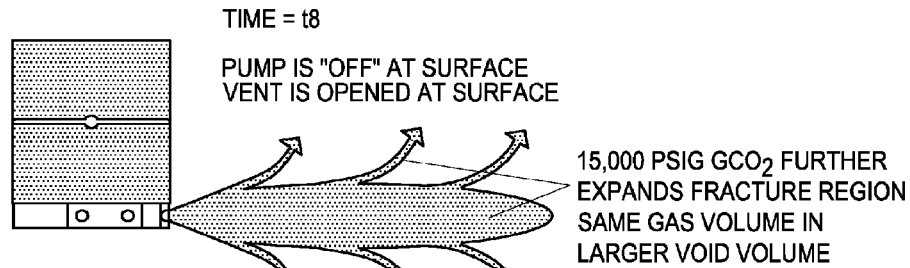
FIG. 40 is a schematic elevation view showing the bottom of an injection pipe extending down into a coal or shale matrix, with the pump off, the top vent open and the bottom valve closed, showing the pressure within the matrix dropping, such as down to 15,000 psig, as the gaseous $CO_2$ further penetrates and expands into the fracture region, which represents the status of the system at time T8.

Once a sufficient amount of $LCO_2$ is released into the matrix, during the next phase, phase 5, which corresponds to T6, T7 and T8, in FIGS. 38 to 40, the pump is turned off, and the bottom valve is closed, and the top vent is open. Note that FIG. 29 shows a dramatic drop in pressure inside the pipe which occurs because no more pressure is applied by the pump, and the top vent is open, and soon, the pressure becomes zero. Also, since the bottom valve is closed, the pressure inside the matrix also dramatically drops, although, as the cold $LCO_2$ temperatures are warmed by the surrounding formation, and changes phase to $GCO_2$, there is a sudden and tremendous pressure increase, such as all the way up to 20,000 psig, which is temporarily created by the explosive vaporization of the liquid $CO_2$ to a gaseous $CO_2$, which helps to further break up the matrix.

Figure 41:
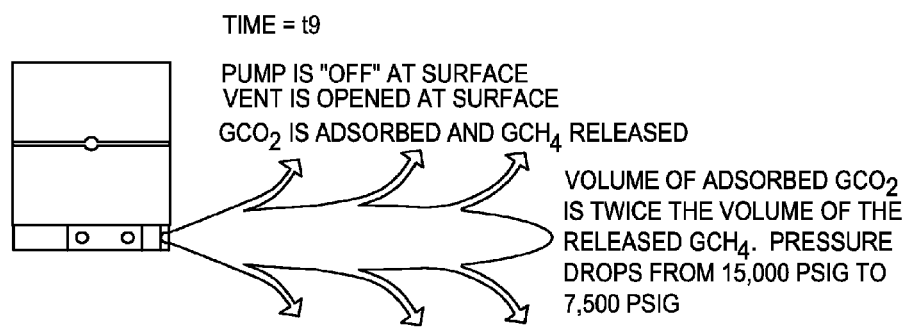
FIG. 41 is a schematic elevation view showing the bottom of an injection pipe extending down into a coal or shale matrix, with the pump off, the top vent open and the bottom valve closed, showing the pressure within the matrix continuing to drop, such as down to 7,500 psig, as the gaseous $CO_2$ further penetrates and expands into the fracture region, wherein the $GCO_2$ is adsorbed and $GCH_4$ is desorbed, which represents the status of the system at time T9.
Figure 42:
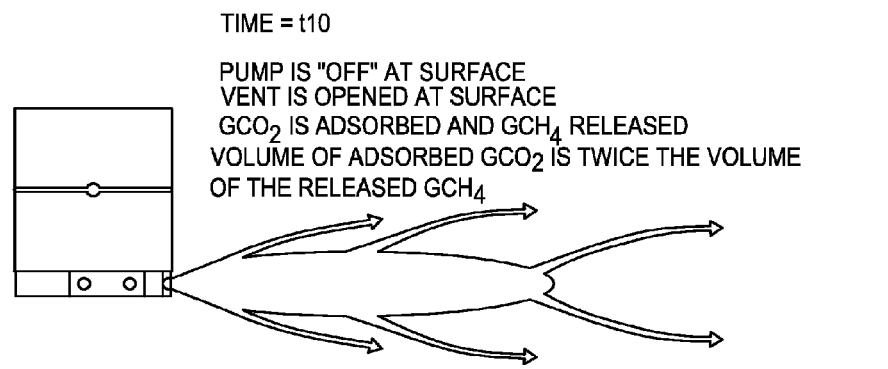
FIG. 42 is a schematic elevation view showing the bottom of an injection pipe extending down into a coal or shale matrix, with the pump off, the top vent open and the bottom valve closed, showing the pressure within the matrix continuing to drop, such as all the way down to 200 psig, as the gaseous $CO_2$ further penetrates and expands into the fracture region, wherein the $GCO_2$ continues to be adsorbed and the $GCH_4$ continues to be desorbed, wherein twice as much $GCO_2$ is adsorbed than $GCH_4$ is desorbed, which represents the status of the system at time T10.
Figure 43:
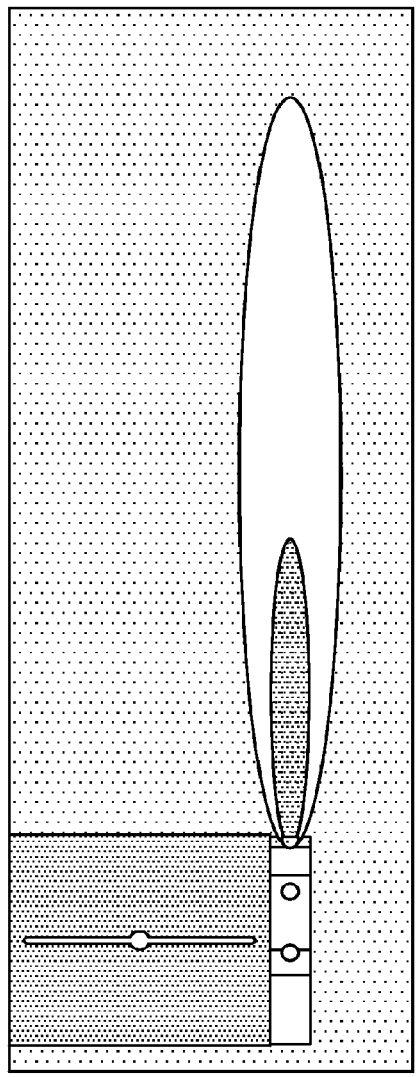
FIGS. 43 to 44 are two schematic elevation views showing the bottom of an injection pipe extending down into a coal or shale matrix, at a later time, such as after the pressure cycles have been repeated, wherein cavities and fractures have already been formed within the matrix, wherein these views show the penetration of an additional volume of liquid $CO_2$ stream (finite length, free flying liquid slug) being injected into the matrix through the perforations, by opening and closing the valves again, wherein the stream further penetrates into and expands the fracture region by reaching further into the existing cavities and fractures toward and against their distal ends.
Figure 44:
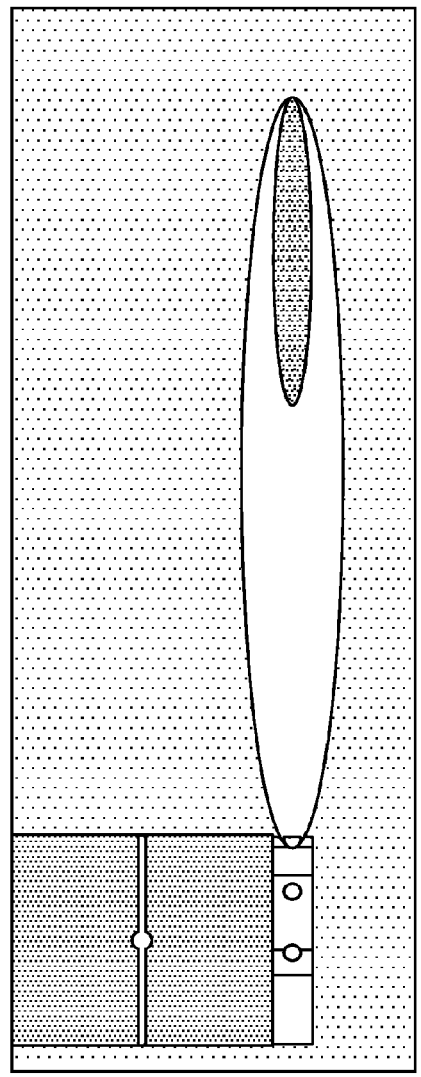

In the final phase of the first cycle, phase 6, the pump stays off, the top vent continues to be open, and the bottom valve continues to be closed, which correlates to steps T9 to T10 in FIGS. 41 and 42. During this phase, it can be seen that the pressure in the matrix continues to decline gradually, because no pressure is being added, and the $CO_2$ continues to seep into the open cracks and fissures formed by the fracturing processes described herein. The pressure at the top of the pipe however remains zero because the top vent is open. The pressure at the bottom of the pipe continues to fall as the $LCO_2$ is vented through the top of the pipe.

As the cycle is completed, and as more $CO_2$ is adsorbed and $CH_4$ desorbed, the pressure gradient exerted within the matrix (with more pressure near the injection well bores than the recovery well bores) preferably causes the $CH_4$ released from the coal or shale formation to travel to the recovery well bores, wherein the $CH_4$ can be drawn through the pipes and collected at the top. Also, because $CO_2$ is heavier, i.e., the molecular weight of $CH_4$ is 16 while the molecular weight of $GCO_2$ is 44, any encounter between $GCO_2$ and $GCH_4$ within the matrix will advantageously cause the $CH_4$ to travel upward through the cracks and fissures. Then, as the $CH_4$ is extracted and recovered, it is preferably transported via pipe or truck.

The cycle is preferably repeated when the pressure inside the matrix drops down to about 500 psig, wherein the pump is preferably turned on again, similar to phase 2 of the first cycle, with the top vent open and the bottom valve closed, which causes the pressure at the bottom of the pipe to increase again due to the head pressure created by the column of $LCO_2$ filling the pipe. Then, phase 3 is repeated again, by turning the pump on to full power, and closing the top vent, wherein the pressure at the top and bottom of the pipe increase again, preferably until the pressure at the bottom reaches about 5,200 psig and the pressure at the top reaches about 2,600 psig. Then, when the pressure at the bottom of the pipe has reached its intended maximum amount, which in this example, is 5,200 psig, and when the pressure in the matrix has dropped down a sufficient amount, such as down to about 200 psig, phase 4 is preferably repeated again, wherein the bottom valve is opened, and the pump continues to operate at full power, thereby causing the $LCO_2$ to be injected into the matrix in the form of jet streams, wherein the pressure in the matrix suddenly and dramatically rises, such as to 5,200 psig. During phase 4, the pressure in the pipe gradually declines again as pressurized $LCO_2$ is released through the bottom valve, until it rises slightly, and then, the bottom valve is closed, and the pump is turned off, and the top vent is opened again. Then, during phase 5, as the pressure of $LCO_2$ in the matrix declines, it changes phase again, causing a sudden increase in pressure, such as up to 20,000 psig or more, causing further breakup of the matrix.

When the injection of $LCO_2$ into the matrix is repeated, there will already be cavities and openings formed within the matrix from the first cycle, such that when the high pressure $LCO_2$ is injected again, the jet streams will travel further and be sustained longer as they extend further into the formation, until they reach the distal end of the cavity, wherein they will expand the crush zone further toward the recovery well bores. Although the pressure at the farthest distal end will be reduced, the explosive vaporization of the $LCO_2$ into a gas will nevertheless cause the far end to expand further, which will help to break up the formation even more. This helps to avoid the need to use horizontal pipelines extended through the formation as discussed previously in connection with FIG. 13. This additional injection extends the fracture zone ahead of the $CO_2$ cloud and continues to break up additional areas toward the recovery pipes.

These figures show that there are significant pressure changes that are experienced in the matrix, as the bottom valve is opened and closed, and as the $LCO_2$ released into the formation changes phase to a gaseous $CO_2$, wherein the increase and decrease in pressure causes additional fractures and cleats to form, and the fractures and cleats to expand, wherein the combination of the pressure increasing and decreasing back and forth helps to rubblize and further break up the matrix, such that more $CO_2$ can be adsorbed, and more $CH_4$ can be desorbed and released. Thus, the method of the present invention, including the pressure cycling steps, helps to increase the productivity of the $CO_2$ sequestration and methane recovery in coal and shale gas formations.

In latter cycles, or after the final cycle, the bottom valves can be opened and closed and configured to release high speed liquid slugs of $LCO_2$ that can fly through the $GCO_2$ vapor, such as within the substantially horizontal cavities and spaces that were previously formed by the earlier cycles, to impact the distal ends of the cavities and create over 20,000 psig of impact pressure, which helps create a longer fracture zone that can be expanded over time. In this respect, the repeated injection of liquid $CO_2$ as jet streams and/or high speed slugs helps to break down the structure of the matrix, creating long narrow proliferation zones, which in the past had to be accomplished by extending long horizontal pipes through the formation.

These same steps and phases can be accomplished using the various injection pipe embodiments discussed herein including those with dual pipes 201, including an inner pipe 203 and outer pipe 205, wherein the $LCO_2$ can be injected into the inner pipe 203, while the outer valve 211 is closed, and valve 209 can be operated much like the bottom valve 307 of injection pipe 301.

The processes and method steps described herein are provided for exemplary purposes only and are not intended to be limiting, including the various pressure amounts which can be adapted to suit the circumstances in each application. For example, when the underground formation is only 2,000 feet deep, the pump will have to exert more pressure, since there will be less head pressure exerted by the $LCO_2$ column in the pipe. The relative differences in pressure between the top and bottom of the pipe will also change. Likewise, if the fracture gradient of the coal or shale found in the formation is greater or less, the pressure released into the matrix will have to be modified to ensure that there is sufficient pressure to break up the formation.

The same processes can be repeated multiple times, or the pump and tanks can be connected to another injection pipe, so that the process can be performed in a new location. The extraction process can take several years, i.e., up to 5 or more, wherein the process can be repeated until the maximum amount of methane is recovered and appropriate amount of $CO_2$ is stored.

The cycling method described above helps to increase permeability of the matrix and therefore helps to quicken the delivery and arrival time of the $CH_4$ at the recovery well bores, so that the process can be completed for any given area more efficiently. Alternatively, this enables the injection well bores to be spaced further apart so that while the arrival time may not be enhanced, the cost of having to install additional well bores can be reduced. This method can be used to extract methane from a coal bed, which can then be left in place, or, in other circumstances, the method can be used to remove dangerous $CH_4$ from the coal bed, such that it can then be mined more effectively and safely, with a reduced risk of explosions occurring.

Figure 32:
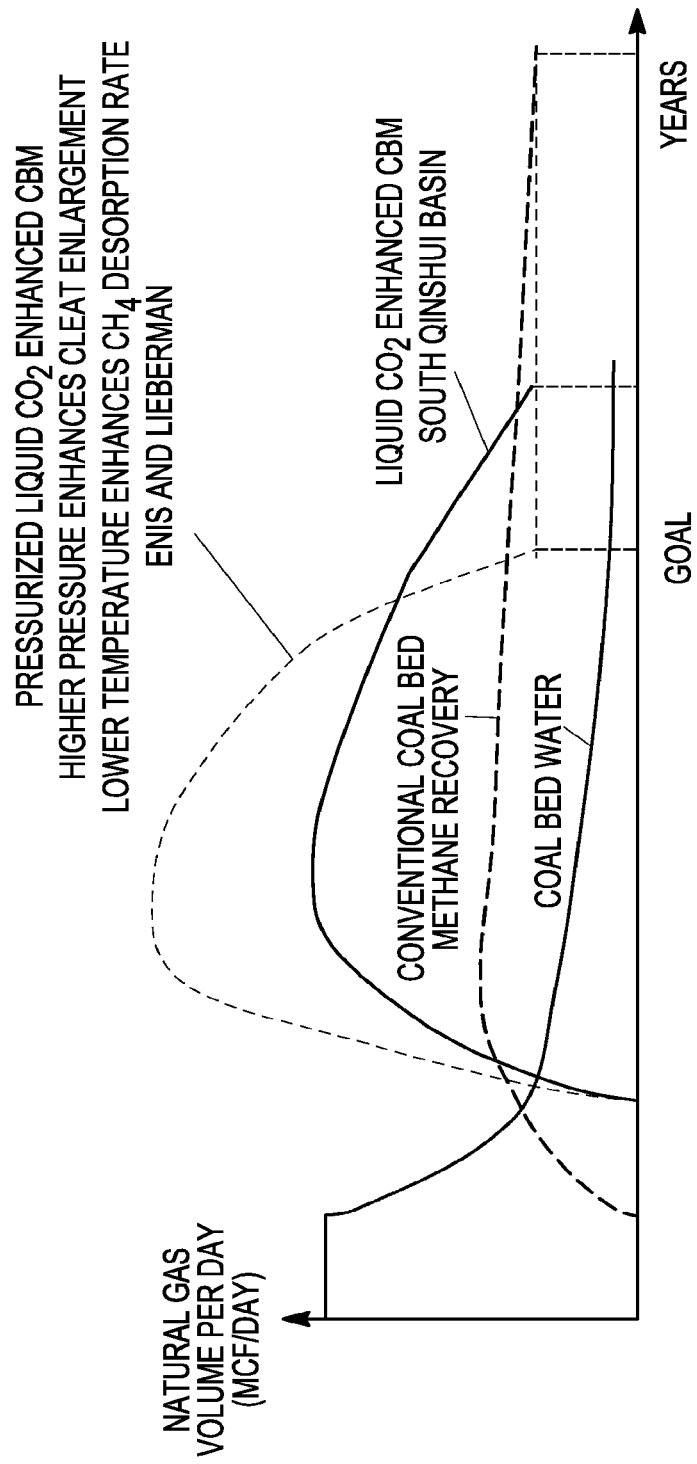
FIG. 32 is a chart showing the enhanced ability of the methods and processes described herein to recover natural gas from a coal bed compared to other methods and processes.

FIG. 32 shows the level of natural gas output enhanced by using the above described processed, including 1) introducing the injected $LCO_2$ at pressures higher than the fracture strength of the matrix, 2) introducing pressure cycles for injecting $LCO_2$ between 5,000 psig and 200 psig to enhance the permeability of the matrix at least one to three orders of magnitude, and 3) maintaining the $CO_2$ in the matrix at relatively low temperatures to speed up the $CO_2$ adsorption that displaces $CH_4$. In particular, FIG. 32 shows the increase in volume of natural gas produced as volume per day that can be expected by using various methods, wherein the top line represents the enhanced effects produced by using the present methods and processes described above (including pressure cycling through repeatedly injection of $LCO_2$ under pressure at greater than the fracture strength of the matrix, and using lower temperatures for the $LCO_2$), the middle line represents using liquid $CO_2$ as an injection with pressure under the fracture strength of the coal matrix, and the bottom line represents conventional methods of coal bed methane recovery. It can be seen that the saturation point of maximum recovery is achieved more quickly using the methods and processes described herein.

In the present invention, unlike previous hydraulic fracturing methods, there is no need for a proppant to maintain the width of the fractures and openings created within the formation. This is because the main goal is to adsorb $CO_2$ onto the coal or gas shale fragments, which will occur when the fractures are open, and once the adsorption occurs, the $CO_2$ will be stored and sequestered within the formation, despite what happens when the pressure is released and the fractures are closed. Subsequent pressurization and depressurization cycles further enhance the migration of the $CH_4$ previously released to work its way toward the receiver borehole. That is, once the $CO_2$ has been adsorbed, and the $CH_4$ has been desorbed and released, half the goal of the present invention has been completed, i.e., the $CO_2$ has been sequestered, and thus, at that point, even if not all of the $CH_4$ has been released, so long as a sufficient amount of $CH_4$ has been released and recovered to offset the cost of the $CO_2$ capture method, then, the present invention is useful. That is, during the time the fractures are open, natural gas will be released from the fragments and flow from the rock formation to the well bore, such that a sufficient amount of natural gas will be recovered to offset the cost of capturing the $CO_2$ gas. Since the goal of sequestering $CO_2$ is as important as collecting natural gas, the method is useful even if some of the natural gas released from the coal and/or shale remains trapped within the formation.

Indeed, the pressurized $LCO_2$ within the cracks can act as proppants when they are yet to be adsorbed onto the surfaces they are propping. In this case, no proppant is needed to keep the existing fractures and newly formed fractures from closing to recover the natural gas, but rather, because the $GCO_2$ adsorption is increased by high pressure and low temperature, $GCO_2$ can be adsorbed in greater quantities onto the surfaces of the rubblized layer of coal or shale, which occurs before the pressure is released and the openings are closed.

The newly created surfaces within the drill hole and radiating cracks can cause the $LCO_2$ to warm up, although at great depth where there is higher pressure the $LCO_2$ will likely remain a liquid despite the warming. Nevertheless, as the cracks form, and pressure is reduced, at some point, the $LCO_2$ will turn into $GCO_2$, which breaks up the matrix even more. When the cryogenic pump is shut down, and the pressure decreases, and when it decreases a sufficient amount, along with a sufficient temperature increase, the liquid $LCO_2$ can suddenly change phase explosively and the gaseous $GCO_2$ can reach into the cracks and create more exposed surfaces within the stratum, thereby creating additional sites for $CO_2$ sequestration and more natural gas desorption and release. When the high pressure $LCO_2$ eventually warms up and explosively expands there will be cracks formed that extend radially as far as, in some cases, 2,500 feet or more. This process of rubblization exposes the material in the product zone by forming a multitude of smaller particles and a huge sum of exposed surfaces that are made available for the capture of $GCO_2$ and release of $CH_4$.

While it is preferable that this phase change occurs after the pump is turned off, and the valves in the pipes are closed, because the $LCO_2$ is warmed by the temperature of the surrounding rock, there is a possibility that the phase change could occur before the valves are closed. Indeed, because of the lower pressures that exist at shallower depths, this may be more likely to occur in a shallower formation. Thus, at shallower depths, natural ambient warming in the coal or shale layer may cause an explosive change of phase to occur from liquid $LCO_2$ to gas $GCO_2$ early on, wherein the $LCO_2$ or $GCO_2$ adsorption can further displace the methane $CH_4$. Thus it is vital to install a check valve in the pipeline just above the valve to protect the pipeline and the pump.

In any event, this sudden phase change radiates fractures in all directions to further rubblize the stratum. The proposed approach will attain the explosive rubblization effect by introducing high pressure liquid $CO_2$ into the pipe and releasing it through the holes to create a high pressure liquid $CO_2$ jet. It will be necessary for the cryogenic pump to sustain the pressure of the $LCO_2$ in ever increasing volumes of fractures when the ambient shale or coal is at greater depth (high ambient stress) where the fractures occur to prevent premature vaporization. On the other hand, when the local warm shale or coal at shallow depth (low ambient stress) causes the liquid $CO_2$ to flash into gaseous $CO_2$, an even higher pressure can be achieved and further fragmentation occurs. At a depth of 1,000 feet, for example, in a coal bed or shale layer that has a 0.823 psi/ft. fracture gradient, only 823 psi $LCO_2$ forced through a one inch diameter hole in the pipe is needed to fracture and create a substantially horizontal 1,250 feet long, pencil-like cavity. Then, when the pressure drops to 400 psi, and the temperature warms to plus 40° F., for example (or elsewhere along the phase change line 85 in FIG. 7), the $LCO_2$ will flash off and explosively increase its specific volume to form $GCO_2$. This explosive effect causes more micro-fractures to occur, which facilitates the simultaneous desorption of $CH_4$ and the adsorption of $LCO_2$ or $GCO_2$.

In another example, at a depth of 5,000 feet, in a coal bed or shale layer that has a 0.9 psi/ft. fracture gradient, 4,500 psi is needed to fracture and create a 1,250 feet long, horizontal pencil-like cavity. In such case, there will be no flashover to a gas even if the layer is warmer than plus 60° F. because of the greater pressures involved—the $CO_2$ will remain a liquid although it will require the action of the surface level pump to continuously supply the rated 4,500 psi to cause more and more fracturing and penetration of the $LCO_2$ into the natural cracks. Then, when all the required $LCO_2$ is supplied to meet the capacity of the layer to adsorb the $CO_2$, the pumping is stopped. Then, when the pressure in the layer drops a sufficient amount (such as by virtue of more cracks being created), the $LCO_2$ will explosively flash to $GCO_2$ and cause more micro-cracks to occur. This $GCO_2$ will continue to be adsorbed onto the large surface area of the rubblized layer material.

Figures 20, 21:
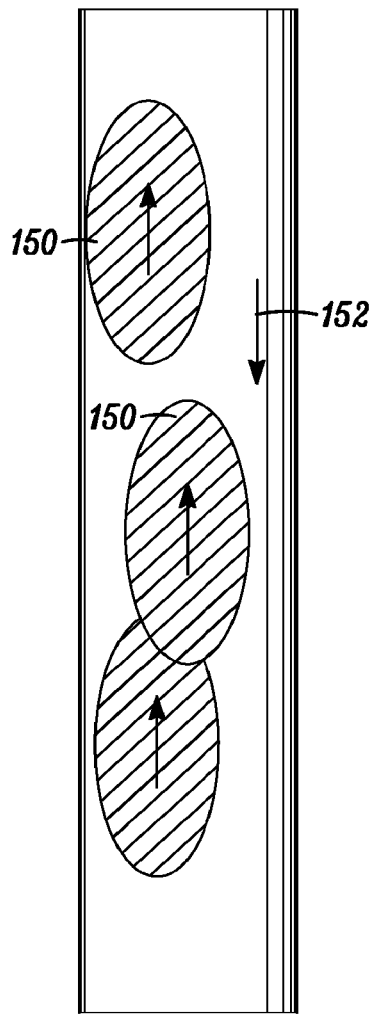
FIG. 20 shows a cross section of a pipe showing how the $CH_4$ rises and the $CO_2$ falls due to their relative densities.
FIG. 21 is a chart showing the relative densities of $CH_4$ and $CO_2$ at different pressures and at 40 degrees F.

The hugely increased fragmentation exposes more surface area of the shale or coal to the gaseous $CO_2$, and because there is more affinity for the surface to adsorb the $CO_2$ than to continue holding onto the natural gas adsorbed previously, the natural gas is desorbed and released. Then, because the released methane is light weight compared to the carbon dioxide that was introduced into the formation, the methane tends to migrate horizontally over the methane in the horizontal matrix and buoy vertically above the methane when it flows upwards through the pipes, as shown in FIG. 20.

With all vents of the $LCO_2$ injection pipe and the natural gas recovery pipes closed, the pressurization of the shale or coal bed is allowed to be maintained or continued, and thus, the fracturing can continue, and $CH_4$ continues to be desorbed from the surface of each fracture in the presence of the high pressure gaseous $CO_2$, and $CO_2$ continues to be adsorbed into the available surfaces just made free by desorption of the $CH_4$. This containment is preferably sustained for as long as needed to permit the $LCO_2$ to be completely vaporized to $GCO_2$ and the $GCO_2$ to be completely adsorbed and the released lower density natural gas to migrate into the perforated vertical collection pipes and flow upward to be recovered. At these low temperatures the $CH_4$ is less dense than the $LCO_2$, so the $CH_4$ naturally rises.

The residence time for all the $LCO_2$ to convert to $GCO_2$ is preferably followed to ensure maximum conversion. The $GCO_2$ is adsorbed onto the surfaces of the rubblized production zone material and the natural gas is released. The present method contemplates waiting for the completion of the residence time wherein the exchange of $LCO_2$ to $GCO_2$ and then the $GCO_2$ exchange with natural gas ($LCH_4$) at each coal grain or shale grain site continues to occur. High pressure is preferably sustained during this process to reduce the required residence time.

After the waiting period, which can be about two weeks, the pipe valves are preferably opened, wherein the natural gas collection can proceed, although the rate of collection should be sufficiently slow to retain the necessary high pressure within the stratum. That is, if the] $CH_4$ withdrawal pipe vents are opened too early, or too quickly, pressurized methane will begin rising to the top, but at the expense of a large amount of liquid $CO_2$ remaining within the formation that has yet to be adsorbed. By slowly opening the valves, and slowly reducing the pressure within the formation, this allows the low density $CH_4$ to buoy past the $LCO_2$ and allow the $CH_4$ to migrate to the recovery pipes, while at the same, allowing the $CO_2$ stream to continue to drop below the $CH_4$ stream and be adsorbed, and $CH_4$ to continue to be desorbed. Once the cycle is complete, which can be ten to fourteen days, and most if not all of the natural gas has risen, the process can be complete. Then, the recovered $CH_4$ from the site can be transported via pipe or truck after it has been pressurized. And the same process can be repeated at another site, or within a predetermined amount of time, the same process can be repeated at the same site, to further increase the permeability and withdraw greater amounts of natural gas.

There will be a period when some of the $LCO_2$ or $GCO_2$ will mix with the natural gas, but during this period, the relative densities of the $GCH_4$ and $GCO_2$ will cause the $GCH_4$ 150 to rise and the $GCO_2$ 152 to return downward into the rubblized coal or shale, as shown in FIG. 20, for further adsorption and capture. FIG. 21 shows the relative densities of $CO_2$ and $CH_4$ within the various pressures at 40 degrees F.

Figure 22:
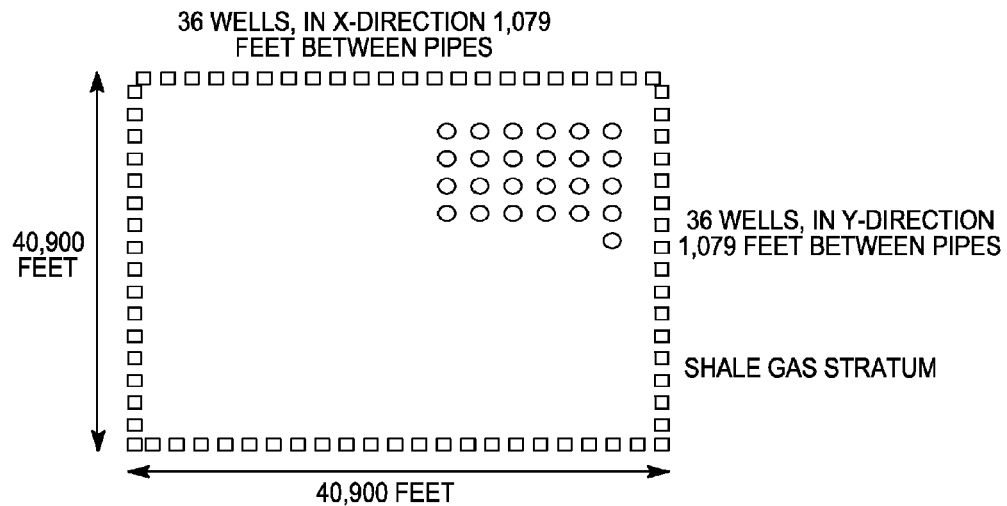
FIGS. 22 and 23 show in plan view two different patterns of arrays of input and output pipes for a single location, where the top one has 36 wells in each direction, and the bottom one has 22 wells in each direction.
Figure 23:
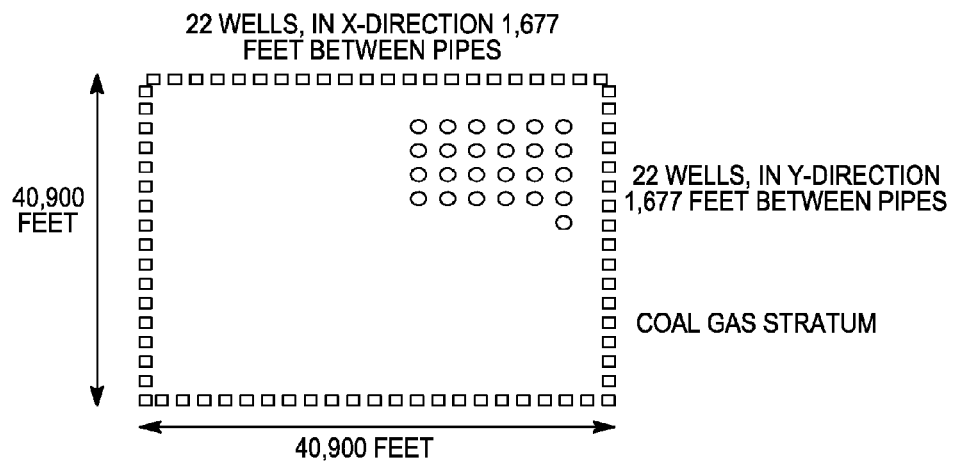

FIGS. 22 and 23 show two field patterns for well bores located at the same geographical site. FIG. 22 is a representation of the site with 36 wells in one direction and 36 wells in another direction, for a total of 1,236 wells, wherein there is a span of 1,079 feet between each well bore. This results in the field being 40,900 feet square in size. FIG. 23 is a representation of the same site with 22 wells in one direction, and 22 wells in another direction, for a total of 484 wells, wherein there is a span of 1,677 feet between each well bore. This results in the field being 40,900 feet square as well. Either pattern, or any variation of patterns, including square, rectangular or other configuration, can be used depending on the needs of the site.

What is claimed is:

1. A method of sequestering carbon dioxide and recovering natural gas from a coal or gas shale reservoir, comprising:
    capturing or producing carbon dioxide gas from coal or from flue gases of a power plant, incinerator or chemical processing plant;
    cooling the carbon dioxide gas to create liquid carbon dioxide;
    injecting the liquid carbon dioxide into an injection pipe extended into said reservoir, wherein said injection pipe has perforations that allow the carbon dioxide to be released into said reservoir, using the following steps:
    1) introducing said liquid carbon dioxide into said injection pipe gradually with a top vent of said injection pipe open and a bottom valve of said injection pipe closed;
    2) turning on a pump to pressurize said liquid carbon dioxide;
    3) closing said top vent of said injection pipe and injecting said pressurized liquid carbon dioxide into said injection pipe until the pressure within said injection pipe reaches a predetermined amount which is above the fracture strength of said coal or shale in said reservoir;

4) opening said bottom valve of said injection pipe and allowing said liquid carbon dioxide to be released under pressure through said perforations and into said coal or shale reservoir and causing the coal or shale in said reservoir to break up;

5) closing said bottom valve and allowing said liquid carbon dioxide in said reservoir to change phase into a gaseous carbon dioxide;

6) allowing the gaseous carbon dioxide to adsorb onto the coal or shale and allowing natural gas to be desorbed and released from the coal or shale;

7) recovering the natural gas released from the coal or shale through one or more recovery pipes; and 8) repeating steps 1) through 7).

2. The method of claim 1, comprising introducing liquid nitrogen into said injection pipe to pre-chill said injection pipe prior to injecting said liquid carbon dioxide into said injection pipe and allowing the liquid nitrogen to change phase to a gas until a steady state temperature is reached.

3. The method of claim 2, wherein a dewatering step is performed before the liquid nitrogen is introduced into said injection pipe.

4. The method of claim 1, wherein the step of introducing said liquid carbon dioxide into said injection pipe comprises allowing gases formed as the liquid carbon dioxide changes phase to a gas to vent from the top vent of said injection pipe and doing so until a steady state temperature of the carbon dioxide is achieved in said injection pipe, which is when the gases stop coming to the surface.

5. The method of claim 1, wherein the predetermined pressure within said injection pipe measured at the bottom exceeds the fracture strength of the coal or shale reservoir, taking into account the depth of the reservoir, and the friction that exists along the length of said injection pipe, such that the liquid carbon dioxide is released with sufficient speed and pressure to form jet streams of liquid carbon dioxide that help to produce fractures and openings within said reservoir.

6. The method of claim 1, wherein after the liquid carbon dioxide is released into said reservoir, and the bottom valve is closed, the carbon dioxide is allowed to warm up, or its pressure is allowed to drop, such that a sudden phase change from a liquid to a gas occurs within said reservoir, wherein the transition of the liquid carbon dioxide to a gas causes the carbon dioxide to expand and create additional fractures and openings within said reservoir.

7. The method of claim 1, wherein after the liquid carbon dioxide has been released into said reservoir, and said bottom valve is closed, the carbon dioxide is allowed to be adsorbed into the coal or shale, and methane gas is allowed to be desorbed, wherein after a predetermined amount of time, said recovery pipes are opened gradually in small increments to create a pressure gradient between the injection pipe and recovery pipes, which in turn, allows the natural gas to flow through the reservoir toward the recovery pipes, and then eventually rise to the surface, but at the same time, for the pressure of the gas or liquid within said reservoir to be maintained above a predetermined minimum for a predetermined amount of time.

8. The method of claim 1, wherein injecting the liquid carbon dioxide comprises using multiple arrays of injection and recovery pipes wherein said arrays are oriented such that the perforations of the injection pipes extend substantially horizontally into said reservoir.

9. A method of sequestering carbon dioxide and recovering natural gas from a coal or gas shale reservoir, comprising the following steps:

1) cooling carbon dioxide gas to create liquid carbon dioxide;

2) providing an injection pipe extended into said reservoir, wherein said injection pipe has perforations that allow the carbon dioxide to be released into said reservoir;

3) introducing said liquid carbon dioxide into said injection pipe with a top vent of said injection pipe open and a bottom valve of said injection pipe closed;

4) turning on a pump to increase the pressure of said liquid carbon dioxide;

5) closing said top vent of said injection pipe and injecting said pressurized liquid carbon dioxide into said injection pipe until the pressure within said injection pipe reaches a predetermined amount which is above the fracture strength of said coal or shale in said reservoir;

6) opening said bottom valve of said injection pipe and allowing said liquid carbon dioxide to be released under pressure through said perforations and into said coal or shale reservoir and causing the coal or shale in said reservoir to break up;

7) closing said bottom valve and allowing said liquid carbon dioxide in said reservoir to change phase into a gaseous carbon dioxide;

8) allowing the gaseous carbon dioxide to adsorb onto the coal or shale and natural gas to be desorbed and released from the coal or shale; and 9) recovering the natural gas released from the coal or shale through one or more recovery pipes.

10. The method of claim 9, comprising capturing or producing carbon dioxide gas from coal or from the flue gases of a power plant, incinerator or chemical processing plant before the step of cooling said carbon dioxide gas.

11. The method of claim 10, comprising introducing liquid nitrogen into said injection pipe to pre-chill said injection pipe prior to injecting said liquid carbon dioxide into said injection pipe and allowing the liquid nitrogen to change phase to a gas until a steady state temperature is reached.

12. The method of claim 11, wherein the step of introducing said liquid carbon dioxide into said injection pipe comprises allowing gases formed as the liquid carbon dioxide changes phase to a gas to vent from the top vent of said injection pipe and doing so until a steady state temperature of the carbon dioxide is achieved in said injection pipe, which is when the gases stop coming to the surface.

13. The method of claim 12, wherein the predetermined pressure within said injection pipe measured at the bottom exceeds the fracture strength of the coal or shale reservoir, taking into account the depth of the reservoir, and the friction that exists along the length of said injection pipe, such that the liquid carbon dioxide is released with sufficient speed and pressure to form jet streams of liquid carbon dioxide that help to produce fractures and openings within said reservoir.

14. The method of claim 13, wherein after the liquid carbon dioxide has been released into said reservoir, and said bottom valve is closed, the carbon dioxide is allowed to be adsorbed into the coal or shale, and methane gas is allowed to be desorbed, wherein after a predetermined amount of time, said recovery pipes are opened gradually in small increments to create a pressure gradient between the injection pipe and recovery pipes, which in turn, allows the natural gas to flow through the reservoir toward the recovery pipes, and then eventually rise to the surface, but at the same time, for the pressure of the gas or liquid within said reservoir to be maintained above a predetermined minimum for a predetermined amount of time.

15. The method of claim 11, wherein a dewatering step is performed before the liquid nitrogen is introduced into said injection pipe.

16. The method of claim 10, wherein injecting the liquid carbon dioxide comprises using multiple arrays of injection and recovery pipes wherein said arrays are oriented such that the perforations of the injection pipes extend substantially horizontally into said reservoir.

17. The method of claim 9, wherein steps 1 through 9 are repeated.

* * * * *